United States Patent
Choi et al.

(10) Patent No.: US 12,472,228 B2
(45) Date of Patent: Nov. 18, 2025

(54) USE OF EXOSOME-BASED DELIVERY OF NF-κB INHIBITORS

(71) Applicant: Ilias Biologics Inc., Daejeon (KR)

(72) Inventors: Chulhee Choi, Daejeon (KR); Kyungsun Choi, Daejeon (KR); Jae-Kwang Yoo, Daejeon (KR)

(73) Assignee: ILIAS BIOLOGICS INC., Daejeon (KR)

( * ) Notice: Subject to any disclaimer, the term of this patent is extended or adjusted under 35 U.S.C. 154(b) by 1104 days.

(21) Appl. No.: 17/227,359

(22) Filed: Apr. 11, 2021

(65) Prior Publication Data

US 2021/0299215 A1    Sep. 30, 2021

Related U.S. Application Data

(63) Continuation-in-part of application No. PCT/IB2021/052708, filed on Mar. 31, 2021.

(60) Provisional application No. 63/112,155, filed on Nov. 11, 2020, provisional application No. 63/112,154, filed on Nov. 10, 2020.

Foreign Application Priority Data

Mar. 31, 2020 (KR) .................. 10-2020-0039011
Apr. 11, 2020 (KR) .................. 10-2020-0044363

(51) Int. Cl.
| | |
|---|---|
| A61K 38/00 | (2006.01) |
| A61K 38/17 | (2006.01) |
| A61K 45/06 | (2006.01) |
| A61K 47/62 | (2017.01) |
| A61P 13/12 | (2006.01) |

(52) U.S. Cl.
CPC .......... *A61K 38/1709* (2013.01); *A61K 45/06* (2013.01); *A61K 47/62* (2017.08); *A61P 13/12* (2018.01)

(58) Field of Classification Search
CPC .... A61K 38/1709; A61K 45/06; A61K 47/62; A61P 13/12
See application file for complete search history.

(56) References Cited

FOREIGN PATENT DOCUMENTS

| | | |
|---|---|---|
| JP | 2019-528674 A | 10/2019 |
| KR | 10-2018-0036134 A | 4/2018 |
| WO | 2017/203260 A1 | 11/2017 |
| WO | 2018/062973 A1 | 4/2018 |
| WO | 2018/102397 A1 | 6/2018 |

OTHER PUBLICATIONS

Office Action issued in corresponding Chinese Patent Application No. 2021800240997 dated Oct. 28, 2023.
Sanz et al., "NF-KB in Renal Inflammation", Journal of the American Society of Nephrology, J Am Soc Nephrol, vol. 21, Aug. 2010, pp. 1254-1262.
Zhang et al., "NF-KB in inflammation and renal diseases", Cell & Bioscience, vol. 5, No. 63, 2015, pp. 1-12.
Office Action issued in corresponding Korean Patent Application No. 10-2022-7034736, dated Dec. 9, 2024.
Li, et al., "Exosomes Derived From Mesenchymal Stem Cells Ameliorate Renal Ischemic-Reperfusion Injury Through Inhibiting Inflammation and Cell Apoptosis", 2019, Frontiers in Medicine, vol. 6, Article 269, XP 093134229, p. 1-8.
Abulizi, et al., "Growth Differentiation Factor-15 Deficiency Augments Inflammatory Response and Exacerbates Septic Heart and Renal Injury Induced by Lipopolysaccharide", 2017, Scientific Reports, vol. 7, Issue 1, XP 055845343, p. 1-10.
Makris, et al., "Acute Kidney Injury: Definition, Pathophysiology and Clinical Phenotypes", 2016, Clinical biochemist reviews, vol. 37, Issue 2, XP 093134310, p. 85-98.
Yim, et al., "Exosome engineering for efficient intracellular delivery of soluble proteins using optically reversible protein-protein interaction module", 2016, Nature Communications, vol. 7, Issue 1, XP 055783136, p. 1-34.
Liu, et al., "NF-κB activation as a pathological mechanism of septic shock and inflammation", 2006, American Journal of Physiology—Lung Cellular and Molecular Physiology, vol. 290, Issue 4, XP 055854713, p. L622-L645.
Extended European Search Report issued Mar. 5, 2024 for European Patent Application No. 21781109.0.
Song et al., "NFκB and Kidney Injury," Frontiers in Immunology, 10, Article 815, p. 1-12 (2019).
Hu et al., "Licochalcone A Attenuates Lipopolysaccharide-Induced Acute Kidney Injury by Inhibiting NF-κB Activation," Inflammation, 39 (2): 569-574 (2016).
Zhao et al., "Milk fat globule-epidermal growth factor 8 (MFG-E8) attenuates sepsis-induced acute kidney injury by inhibiting NF-κB signaling pathway," Acta Cir. Bras. 34 (2): e201900209, 1-10 (2019).
Examination Report issued Apr. 19, 2024 for Australian Patent Application No. 2021247253.

*Primary Examiner* — Jeanette M Lieb
(74) *Attorney, Agent, or Firm* — Morgan, Lewis & Bockius LLP

(57) ABSTRACT

The present disclosure relates to methods for treating acute kidney injury using exosome containing NF-κB inhibitors. The present disclosure relates to methods for treating diseases induced by sepsis using exosome containing NF-κB inhibitor. The present disclosure also is related to methods for treating respiratory diseases, such as viral respiratory diseases, using exosome containing NF-κB inhibitor.

16 Claims, 23 Drawing Sheets

Specification includes a Sequence Listing.

a

A

SEQUENCE LISTING

```
<160> NUMBER OF SEQ ID NOS: 34

<210> SEQ ID NO 1
<211> LENGTH: 317
<212> TYPE: PRT
<213> ORGANISM: Homo sapiens

<400> SEQUENCE: 1

Met Phe Gln Ala Ala Glu Arg Pro Gln Glu Trp Ala Met Glu Gly Pro
1               5                   10                  15

Arg Asp Gly Leu Lys Lys Glu Arg Leu Leu Asp Asp Arg His Asp Ala
                20                  25                  30

Gly Leu Asp Ala Met Lys Asp Glu Glu Tyr Glu Gln Met Val Lys Glu
            35                  40                  45

Leu Gln Glu Ile Arg Leu Glu Pro Gln Glu Val Pro Arg Gly Ser Glu
        50                  55                  60

Pro Trp Lys Gln Gln Leu Thr Glu Asp Gly Asp Ser Phe Leu His Leu
65                  70                  75                  80

Ala Ile Ile His Glu Glu Lys Ala Leu Thr Met Glu Val Ile Arg Gln
                85                  90                  95

Val Lys Gly Asp Leu Ala Phe Leu Asn Phe Gln Asn Asn Leu Gln Gln
                100                 105                 110

Thr Pro Leu His Leu Ala Val Ile Thr Asn Gln Pro Glu Ile Ala Glu
            115                 120                 125

Ala Leu Leu Gly Ala Gly Cys Asp Pro Glu Leu Arg Asp Phe Arg Gly
        130                 135                 140

Asn Thr Pro Leu His Leu Ala Cys Glu Gln Gly Cys Leu Ala Ser Val
145                 150                 155                 160

Gly Val Leu Thr Gln Ser Cys Thr Thr Pro His Leu His Ser Ile Leu
                165                 170                 175

Lys Ala Thr Asn Tyr Asn Gly His Thr Cys Leu His Leu Ala Ser Ile
                180                 185                 190

His Gly Tyr Leu Gly Ile Val Glu Leu Leu Val Ser Leu Gly Ala Asp
            195                 200                 205

Val Asn Ala Gln Glu Pro Cys Asn Gly Arg Thr Ala Leu His Leu Ala
        210                 215                 220

Val Asp Leu Gln Asn Pro Asp Leu Val Ser Leu Leu Lys Cys Gly
225                 230                 235                 240

Ala Asp Val Asn Arg Val Thr Tyr Gln Gly Tyr Ser Pro Tyr Gln Leu
                245                 250                 255

Thr Trp Gly Arg Pro Ser Thr Arg Ile Gln Gln Gln Leu Gly Gln Leu
                260                 265                 270

Thr Leu Glu Asn Leu Gln Met Leu Pro Glu Ser Glu Asp Glu Glu Ser
            275                 280                 285

Tyr Asp Thr Glu Ser Glu Phe Thr Glu Phe Thr Glu Asp Glu Leu Pro
        290                 295                 300

Tyr Asp Asp Cys Val Phe Gly Gly Gln Arg Leu Thr Leu
```

<210> SEQ ID NO 2
<211> LENGTH: 317
<212> TYPE: PRT
<213> ORGANISM: Homo sapiens

<400> SEQUENCE: 2

```
Met Phe Gln Ala Ala Glu Arg Pro Gln Glu Trp Ala Met Glu Gly Pro
1               5                   10                  15

Arg Asp Gly Leu Lys Lys Glu Arg Leu Leu Asp Asp Arg His Asp Ser
            20                  25                  30

Gly Leu Asp Ser Met Lys Asp Glu Glu Tyr Glu Gln Met Val Lys Glu
        35                  40                  45

Leu Gln Glu Ile Arg Leu Glu Pro Gln Glu Val Pro Arg Gly Ser Glu
    50                  55                  60

Pro Trp Lys Gln Gln Leu Thr Glu Asp Gly Asp Ser Phe Leu His Leu
65                  70                  75                  80

Ala Ile Ile His Glu Glu Lys Ala Leu Thr Met Glu Val Ile Arg Gln
                85                  90                  95

Val Lys Gly Asp Leu Ala Phe Leu Asn Phe Gln Asn Asn Leu Gln Gln
            100                 105                 110

Thr Pro Leu His Leu Ala Val Ile Thr Asn Gln Pro Glu Ile Ala Glu
        115                 120                 125

Ala Leu Leu Gly Ala Gly Cys Asp Pro Glu Leu Arg Asp Phe Arg Gly
    130                 135                 140

Asn Thr Pro Leu His Leu Ala Cys Glu Gln Gly Cys Leu Ala Ser Val
145                 150                 155                 160

Gly Val Leu Thr Gln Ser Cys Thr Thr Pro His Leu His Ser Ile Leu
                165                 170                 175

Lys Ala Thr Asn Tyr Asn Gly His Thr Cys Leu His Leu Ala Ser Ile
            180                 185                 190

His Gly Tyr Leu Gly Ile Val Glu Leu Leu Val Ser Leu Gly Ala Asp
        195                 200                 205

Val Asn Ala Gln Glu Pro Cys Asn Gly Arg Thr Ala Leu His Leu Ala
    210                 215                 220

Val Asp Leu Gln Asn Pro Asp Leu Val Ser Leu Leu Leu Lys Cys Gly
225                 230                 235                 240

Ala Asp Val Asn Arg Val Thr Tyr Gln Gly Tyr Ser Pro Tyr Gln Leu
                245                 250                 255

Thr Trp Gly Arg Pro Ser Thr Arg Ile Gln Gln Gln Leu Gly Gln Leu
            260                 265                 270

Thr Leu Glu Asn Leu Gln Met Leu Pro Glu Ser Glu Asp Glu Glu Ser
        275                 280                 285

Tyr Asp Thr Glu Ser Glu Phe Thr Glu Phe Thr Glu Asp Glu Leu Pro
    290                 295                 300

Tyr Asp Asp Cys Val Phe Gly Gly Gln Arg Leu Thr Leu
305                 310                 315
```

<210> SEQ ID NO 3
<211> LENGTH: 13
<212> TYPE: PRT
<213> ORGANISM: Artificial Sequence
<220> FEATURE:
<223> OTHER INFORMATION: Synthetic construct

<400> SEQUENCE: 3

Asp Arg His Asp Ala Gly Leu Asp Ala Met Lys Asp Glu
1               5                   10

<210> SEQ ID NO 4
<211> LENGTH: 228
<212> TYPE: PRT
<213> ORGANISM: Artificial Sequence
<220> FEATURE:
<223> OTHER INFORMATION: Synthetic construct

<400> SEQUENCE: 4

Met Pro Val Lys Gly Gly Thr Lys Cys Ile Lys Tyr Leu Leu Phe Gly
1               5                   10                  15

Phe Asn Phe Ile Phe Trp Leu Ala Gly Ile Ala Val Leu Ala Ile Gly
                20                  25                  30

Leu Trp Leu Arg Phe Asp Ser Gln Thr Lys Ser Ile Phe Glu Gln Glu
            35                  40                  45

Thr Asn Asn Asn Ser Ser Phe Tyr Thr Gly Val Tyr Ile Leu Ile
    50                  55                  60

Gly Ala Gly Ala Leu Met Met Leu Val Gly Phe Leu Gly Cys Cys Gly
65                  70                  75                  80

Ala Val Gln Glu Ser Gln Cys Met Leu Gly Leu Phe Phe Gly Phe Leu
                85                  90                  95

Leu Val Ile Phe Ala Ile Glu Ile Ala Ala Ala Ile Trp Gly Tyr Ser
                100                 105                 110

His Lys Asp Glu Val Ile Lys Glu Val Gln Glu Phe Tyr Lys Asp Thr
            115                 120                 125

Tyr Asn Lys Leu Lys Thr Lys Asp Glu Pro Gln Arg Glu Thr Leu Lys
    130                 135                 140

Ala Ile His Tyr Ala Leu Asn Cys Cys Gly Leu Ala Gly Gly Val Glu
145                 150                 155                 160

Gln Phe Ile Ser Asp Ile Cys Pro Lys Lys Asp Val Leu Glu Thr Phe
                165                 170                 175

Thr Val Lys Ser Cys Pro Asp Ala Ile Lys Glu Val Phe Asp Asn Lys
            180                 185                 190

Phe His Ile Ile Gly Ala Val Gly Ile Gly Ile Ala Val Val Met Ile
        195                 200                 205

Phe Gly Met Ile Phe Ser Met Ile Leu Cys Cys Ala Ile Arg Arg Asn
    210                 215                 220

Arg Glu Met Val
225

<210> SEQ ID NO 5
<211> LENGTH: 20
<212> TYPE: DNA
<213> ORGANISM: Artificial Sequence
<220> FEATURE:
<223> OTHER INFORMATION: Synthetic construct

<400> SEQUENCE: 5
cccgtcctta aagctgtctg                                              20

<210> SEQ ID NO 6
<211> LENGTH: 20
<212> TYPE: DNA
<213> ORGANISM: Artificial Sequence
<220> FEATURE:
<223> OTHER INFORMATION: Synthetic construct

```
<400> SEQUENCE: 6
aattggaatc cagggggaaac                                                  20

<210> SEQ ID NO 7
<211> LENGTH: 20
<212> TYPE: DNA
<213> ORGANISM: Artificial Sequence
<220> FEATURE:
<223> OTHER INFORMATION: Synthetic construct

<400> SEQUENCE: 7
gcccatcctc tgtgactcat                                                   20

<210> SEQ ID NO 8
<211> LENGTH: 20
<212> TYPE: DNA
<213> ORGANISM: Artificial Sequence
<220> FEATURE:
<223> OTHER INFORMATION: Synthetic construct

<400> SEQUENCE: 8
aggccacagg tattttgtcg                                                   20

<210> SEQ ID NO 9
<211> LENGTH: 20
<212> TYPE: DNA
<213> ORGANISM: Artificial Sequence
<220> FEATURE:
<223> OTHER INFORMATION: Synthetic construct

<400> SEQUENCE: 9
cccacttcaa gctccacttc                                                   20

<210> SEQ ID NO 10
<211> LENGTH: 20
<212> TYPE: DNA
<213> ORGANISM: Artificial Sequence
<220> FEATURE:
<223> OTHER INFORMATION: Synthetic construct

<400> SEQUENCE: 10
atcctgggga gtttcaggtt                                                   20

<210> SEQ ID NO 11
<211> LENGTH: 20
<212> TYPE: DNA
<213> ORGANISM: Artificial Sequence
<220> FEATURE:
<223> OTHER INFORMATION: Synthetic construct

<400> SEQUENCE: 11
cctcacagca acgaagaaca                                                   20

<210> SEQ ID NO 12
<211> LENGTH: 20
<212> TYPE: DNA
<213> ORGANISM: Artificial Sequence
<220> FEATURE:
<223> OTHER INFORMATION: Synthetic construct

<400> SEQUENCE: 12
atcgaaaagc ccgaaagagt                                                   20

<210> SEQ ID NO 13
<211> LENGTH: 20
```

```
<212> TYPE: DNA
<213> ORGANISM: Artificial Sequence
<220> FEATURE:
<223> OTHER INFORMATION: Synthetic construct

<400> SEQUENCE: 13
agttgccttc ttgggactga                                            20

<210> SEQ ID NO 14
<211> LENGTH: 20
<212> TYPE: DNA
<213> ORGANISM: Artificial Sequence
<220> FEATURE:
<223> OTHER INFORMATION: Synthetic construct

<400> SEQUENCE: 14
tccacgattt cccagagaac                                            20

<210> SEQ ID NO 15
<211> LENGTH: 20
<212> TYPE: DNA
<213> ORGANISM: Artificial Sequence
<220> FEATURE:
<223> OTHER INFORMATION: Synthetic construct

<400> SEQUENCE: 15
tgctatgctg cctgctctta                                            20

<210> SEQ ID NO 16
<211> LENGTH: 20
<212> TYPE: DNA
<213> ORGANISM: Artificial Sequence
<220> FEATURE:
<223> OTHER INFORMATION: Synthetic construct

<400> SEQUENCE: 16
tcatttccga taaggcttgg                                            20

<210> SEQ ID NO 17
<211> LENGTH: 20
<212> TYPE: DNA
<213> ORGANISM: Artificial Sequence
<220> FEATURE:
<223> OTHER INFORMATION: Synthetic construct

<400> SEQUENCE: 17
tccagaaggc cctcagacta                                            20

<210> SEQ ID NO 18
<211> LENGTH: 20
<212> TYPE: DNA
<213> ORGANISM: Artificial Sequence
<220> FEATURE:
<223> OTHER INFORMATION: Synthetic construct

<400> SEQUENCE: 18
agcatcttct cgaccctgaa                                            20

<210> SEQ ID NO 19
<211> LENGTH: 20
<212> TYPE: DNA
<213> ORGANISM: Artificial Sequence
<220> FEATURE:
<223> OTHER INFORMATION: Synthetic construct

<400> SEQUENCE: 19
```
aggtccctgt catgcttctg                                       20

<210> SEQ ID NO 20
<211> LENGTH: 20
<212> TYPE: DNA
<213> ORGANISM: Artificial Sequence
<220> FEATURE:
<223> OTHER INFORMATION: Synthetic construct

<400> SEQUENCE: 20
tctggaccca ttccttcttg                                       20

<210> SEQ ID NO 21
<211> LENGTH: 20
<212> TYPE: DNA
<213> ORGANISM: Artificial Sequence
<220> FEATURE:
<223> OTHER INFORMATION: Synthetic construct

<400> SEQUENCE: 21
cctctgtcac ctgctcaaca                                       20

<210> SEQ ID NO 22
<211> LENGTH: 20
<212> TYPE: DNA
<213> ORGANISM: Artificial Sequence
<220> FEATURE:
<223> OTHER INFORMATION: Synthetic construct

<400> SEQUENCE: 22
gatgaattgg cgtggaatct                                       20

<210> SEQ ID NO 23
<211> LENGTH: 20
<212> TYPE: DNA
<213> ORGANISM: Artificial Sequence
<220> FEATURE:
<223> OTHER INFORMATION: Synthetic construct

<400> SEQUENCE: 23
ccctcaccat catcctcact                                       20

<210> SEQ ID NO 24
<211> LENGTH: 20
<212> TYPE: DNA
<213> ORGANISM: Artificial Sequence
<220> FEATURE:
<223> OTHER INFORMATION: Synthetic construct

<400> SEQUENCE: 24
gagcacttgc tgctggtgta                                       20

<210> SEQ ID NO 25
<211> LENGTH: 20
<212> TYPE: DNA
<213> ORGANISM: Artificial Sequence
<220> FEATURE:
<223> OTHER INFORMATION: Synthetic construct

<400> SEQUENCE: 25
agtgaactgc gctgtcaatg                                       20

<210> SEQ ID NO 26
<211> LENGTH: 20
<212> TYPE: DNA
<213> ORGANISM: Artificial Sequence

```
<220> FEATURE:
<223> OTHER INFORMATION: Synthetic construct

<400> SEQUENCE: 26
tccaggtcag ttagccttgc                                                    20

<210> SEQ ID NO 27
<211> LENGTH: 20
<212> TYPE: DNA
<213> ORGANISM: Artificial Sequence
<220> FEATURE:
<223> OTHER INFORMATION: Synthetic construct

<400> SEQUENCE: 27
aagactgtga ttgcggggtt                                                    20

<210> SEQ ID NO 28
<211> LENGTH: 20
<212> TYPE: DNA
<213> ORGANISM: Artificial Sequence
<220> FEATURE:
<223> OTHER INFORMATION: Synthetic construct

<400> SEQUENCE: 28
gcaccaggtg tcaagtctct                                                    20

<210> SEQ ID NO 29
<211> LENGTH: 19
<212> TYPE: DNA
<213> ORGANISM: Artificial Sequence
<220> FEATURE:
<223> OTHER INFORMATION: Synthetic construct

<400> SEQUENCE: 29
tatggctcag ggtccaatc                                                     19

<210> SEQ ID NO 30
<211> LENGTH: 20
<212> TYPE: DNA
<213> ORGANISM: Artificial Sequence
<220> FEATURE:
<223> OTHER INFORMATION: Synthetic construct

<400> SEQUENCE: 30
ctccctttgc agaactcagg                                                    20

<210> SEQ ID NO 31
<211> LENGTH: 20
<212> TYPE: DNA
<213> ORGANISM: Artificial Sequence
<220> FEATURE:
<223> OTHER INFORMATION: Synthetic construct

<400> SEQUENCE: 31
ttcacactga atgccagctc                                                    20

<210> SEQ ID NO 32
<211> LENGTH: 20
<212> TYPE: DNA
<213> ORGANISM: Artificial Sequence
<220> FEATURE:
<223> OTHER INFORMATION: Synthetic construct

<400> SEQUENCE: 32
gtctgctgag accctcttg                                                     20
```

```
<210> SEQ ID NO 33
<211> LENGTH: 20
<212> TYPE: DNA
<213> ORGANISM: Artificial Sequence
<220> FEATURE:
<223> OTHER INFORMATION: Synthetic construct

<400> SEQUENCE: 33
cgcttcctta cctggttgat                                              20

<210> SEQ ID NO 34
<211> LENGTH: 20
<212> TYPE: DNA
<213> ORGANISM: Artificial Sequence
<220> FEATURE:
<223> OTHER INFORMATION: Synthetic construct

<400> SEQUENCE: 34
ggccgtgcgt acttagacat                                              20
```

USE OF EXOSOME-BASED DELIVERY OF NF-κB INHIBITORS

FIELD OF THE INVENTION

The present disclosure is related to methods for treating acute kidney injury (AKI) using exosome containing NF-κB inhibitors. The present disclosure is related to methods for treating diseases induced by sepsis using exosome containing NF-κB inhibitor. The present disclosure also is related to methods for treating respiratory diseases, such as viral respiratory diseases, using exosome containing NF-κB inhibitor.

BACKGROUND OF THE INVENTION

AKI not only contributes to short-term adverse outcomes, but the survivors may suffer from chronic kidney (CKD) and even end-stage renal disease (ESRD). As one of the most important components of the pathogenesis, systematic inhibition of NF-κB affects the severity of AKI. In a disease model induced by folic acid, inhibition of NF-κB mitigates AKI-injury by reduction of RelA and NF-κB2 activation.

More than 800 synthetic and natural materials are known to be partly involved in modulating NF-κB activation. Several studies have shown that NF-κB signaling blockades, such as the renin-angiotensin-aldosterone system (RAAS) blockade or tumor necrosis factor-α (TNF-α) blocker, can alleviate kidney damage. However, their mechanisms of action are pleiotropic and lack specificity. Recent advancements in nano-technology made it feasible to produce specific gene sequences or nanoparticles to target NF-κB signaling. However, no NF-κB inhibitor has been commercially approved for human use yet.

Uncontrolled inflammation is a prominent feature of the septic response. Host-pathogen interactions mediated by Toll-like receptors (TLRs) stimulate the production of pro-inflammatory cytokines, chemokines, and immune-activating molecules. This pro-inflammatory response is followed by a compensatory immunosuppressive response that involves various quantitative and functional defects of immune cells. Pathogen-induced cellular modification is accompanied by marked changes in host gene expression, with nuclear factor kappa-B (NF-κB) transcription factors playing a pivotal role in modulating these changes. Several cytokines under the regulatory control of NF-κB, including tumor necrosis factor (TNF)-α and interleukin (IL)-1, can induce further activation of this transcriptional factor, leading to potentiation of the inflammatory response and septic shock. In addition, NF-κB is involved in the apoptotic response, primarily through enhancing the transcription of antiapoptotic genes such as Bcl-$x_L$, A1 and A20. Inflammation associated with NF-κB activation can thus be exacerbated by two interacting mechanisms, increased expression of pro-inflammatory mediators and prolongation of the life spans of cell populations such as neutrophils, which are activated to produce pro-inflammatory molecules and participate directly in acute inflammatory processes.

There are a variety of diseases, such as pneumonia, cytokine storm syndrome, respiratory distress syndrome, and organ failure that are caused by sepsis. Sepsis is a systemic inflammatory syndrome caused by activation of the innate immune system due to acute microbial infection and continues to be the main cause of mortality in intensive care units. Moreover, there are various diseases caused by sepsis that have vastly different symptoms, some of which are fatal. Unfortunately, the common treatment for Sepsis (i.e., antibiotics) may not be effective to treat the different diseases caused by sepsis, such as cytokine syndrome or damaged organs. Currently, there are no treatments available for clinical usage for diseases caused by sepsis. Thus, the development of effective alternative therapies is urgently needed. Although more than 700 inhibitors have been reported for NF-κB, no inhibitors have been approved as therapeutic agents to date. Moreover, various steroidal and nonsteroidal anti-inflammatory agents are known to block NF-κB, but their effects are not specific for inhibiting NF-κB.

Representative acute upper respiratory infections caused by respiratory viruses can be classified into acute nasopharyngitis, commonly referred to as a cold, acute rhinitis, acute sinusitis, acute sore throat, acute tonsillitis, and laryngitis. Diseases include flu (influenza), acute bronchitis, acute bronchiolitis and pneumonia. The most common viruses that cause colds through respiratory infections are rhinovirus (rhinovirus), coronavirus (coronavirus), and respiratory syncytial virus (RSV, respiratory syncytial virus), and Influenza A and B (flu type A, B) parainfluenza (parainfluenza), adenovirus (adenovirus), echovirus (ecovirus), and coxsackie virus (coxsackie virus). Although the types of viruses are different, it is not easy to distinguish them from each other because the respiratory symptoms caused by the virus infection are the same. The cold is not immune, so it is often caught again. In the case of reinfection by the virus, it is often lighter and shorter than the first. Influenza is a flu virus, and at the time the flu alarm is issued, the patient shows typical symptoms such as sudden high fever, headache, systemic muscle pain, and dry cough, and adenovirus may also accompany flu-like symptoms in addition to sore throat.

Coronavirus (CoV) is known to be the cause of most seasonal colds that cause humans, and its subtypes include Corona 229E and OC43. The emergence of corona variants has been reported several times since the 2000s, and these variants can cause bronchitis, including more severe viral pneumonia or secondary bacterial pneumonia, not common cold symptoms. Coronaviruses can be divided into four categories, alpha, beta, gamma and delta. In particular, beta-corona virus is SARS-CoV, which causes severe acute respiratory syndrome (SARS), which was prevalent in 2003, MERS-CoV, which causes Middle East respiratory syndrome (MERS), and novel coronavirus infection (COVID-19). SARS-Cov-2, which causes the disease, are included, and these are characterized by causing respiratory infections such as the upper respiratory tract (mouth and nose).

COVID-19 causes acute viral pneumonia by infecting the upper respiratory system through coronavirus infection through the upper respiratory system (nose and mouth), but reports to date have shown that the heart, Kidney, liver, and central nervous system that leads to multiple organ failure, and by acting on immune cells of infected tissues, cytokine storms are caused by excessive immune activity, resulting in symptoms similar to sepsis. In particular, Acute Respiratory distress syndrome (ARDS) is considered one of the causes of death in critically ill patients among COVID-19 infected patients.

Cellular modifications induced by pathogens cause significant changes in the expression of host genes, such as the nuclear factor kappa-B (NF-κB) transcription factor, which plays a pivotal role in regulating these changes. Several cytokines under the regulatory control of NF-κB, including tumor necrosis factor (TNF)-α and interleukin (IL)-1, can induce further activation of this transcription factor, enhancing excessive inflammatory response and septic shock. In addition, NF-κB is mainly involved in the apoptosis response by enhancing the transcription of anti-apoptosis genes, such as Bcl-xL, A1 and A20. Thus, inflammation associated with NF-κB activation may increase the expression of pro-inflammatory mediators or may be exacerbated by two mechanism of interaction, such as prolonging the lifespan of a population of immune cells such as neutrophils that produce pro-inflammatory molecules and are activated to participate directly in the acute inflammatory process.

Successful gene and drug delivery require the selection of an appropriate vector for delivering target molecules stably to the site of action, without causing adverse effects to the recipient. Various types of vectors, including recombinant adenoviruses, liposomes, ligand-conjugated nanoparticles, and ultrasound microbubbles, are reportedly efficient for drug delivery, because of their stability and high loading capacity. However, certain concerns and limitations were associated with their use. Though they were rapidly recognized and cleared by the reticuloendothelial system, their non-uniform particle size and non-specific uptake pattern limited their use as bio-carriers. The high immunogenicity of adenoviral vectors could provoke an immune response after administration and the virus itself can be toxic at high doses. The use of liposomes can also induce adverse immunogenic and non-IgE-mediated hypersensitivity reactions.

Current conventional strategies to deliver the therapeutic proteins include enveloping the proteins within synthetic nanoparticles. The most preferred protein delivery systems are liposomes and polymeric nanoparticles (PNPs). A liposome is a synthetic vesicle with a phospholipid membrane that self-assembles into various sizes and shapes in an aqueous environment. A PNP is a solid colloidal particle with the size between 10-1000 nm, and is made up of biodegradable polymers, in which the cargo proteins can be entrapped, encapsulated or attached to a nanoparticle matrix. However, liposomes tend to fuse or aggregate with each other resulting in premature release of the liposome cargo over time. PNPs may have better stability than liposomes, but their biocompatibility and long-term potential safety are still a concern. In addition, encapsulating proteins to liposomes and PNPs requires generation of synthetic or recombinant proteins and ex vivo encapsulation processes, whereas EXPLOR technology requires generation and maintenance of stable cells that can produce cargo-loaded exosomes via natural exosome biogenesis. In addition, exosomes have many desirable features of an ideal protein delivery system, such as biocompatibility, minimal or no inherent toxicity, long half-life in the circulation, and intrinsic ability to target tissues.

Recently, exosomes have received significant attention as novel bio-carriers for gene/drug delivery. Exosomes are extracellular vesicles (EVs) that play an important role in cell-to-cell communication, by transferring bioactive materials to recipient cells or affecting signaling pathways of target cells. Exosomes are easier to store and exhibit greater stability than other bioactive agents. Exosomes have a high capacity to overcome biological barriers, and can carry surface molecules targeting specific cell types, thus causing fewer off-target effects.

SUMMARY OF THE INVENTION

The present disclosure provides methods for treating acute kidney injury (AKI) in a subject in need thereof, comprising: administering an effective amount of a composition comprising an exosome comprising an NF-κB inhibitor to the subject.

The present disclosure also provides methods for treating a disease caused by sepsis in a subject in need thereof, comprising: administering an effective amount of a composition comprising an exosome comprising an NF-κB inhibitor to the subject.

(A) Whole kidney lysates from each experimental group were used for qRT-PCR, to measure expression levels of pro-inflammatory cytokines, including Il-1β, Il-6, Tnf-α, Ccl2, Ccl5, and Cxcl2. The mRNA levels of those genes increased significantly after IR damage in the kidney, and this effect was alleviated with Exo-srIκB treatment (Pre-treatment 24-h, n=5-8; pre-treatment 48-h, n=4-5; post-treatment 24-h, n=5-10; post-treatment 48-h, n=4-11). (B) Multiplex cytokine studies using serum from each experimental group also showed a similar tendency of reduction in pro-inflammatory cytokine levels in the post-ischemic mouse group with Exo-srIκB treatment. (C) qRT-PCR data show increased levels of Icam-1 mRNA in post-ischemic Exo-naïve treatment group and significant reduction of Icam-1 mRNA with Exo-srIκB treatment. (D) Western blot analysis results of whole kidney lysates from each group demonstrated decreased expression of ICAM-1 in IR-injured kidneys with Exo-srIκB treatment. (E) Representative kidney sections exhibiting ICAM-1 IHC staining (Left) and the graphical representation of ICAM-1 IHC (Right) show that Exo-srIκB treatment reduced ICAM-1 expression in post-ischemic kidneys of C57BL/6J mice. Scale bar, 50 μM (B-E: Pre-treatment 24-h, n=5; pre-treatment 48-h, n=4-5; post-treatment 24-h, n=5; post-treatment 48-h, n=3-6). Comparisons between groups were assessed using one-way ANOVA with Bonferroni post hoc test. Data were represented as mean±SD values. *P<0.05, P<0.01, *P<0.001, upon comparing Exo-Naïve-Sham and Exo-Naïve-IRI surgery groups. #P<0.05, ##P<0.01, ###P<0.001 upon comparing Exo-Naïve-IRI and Exo-srIκB-IRI surgery groups.

Figure 5:
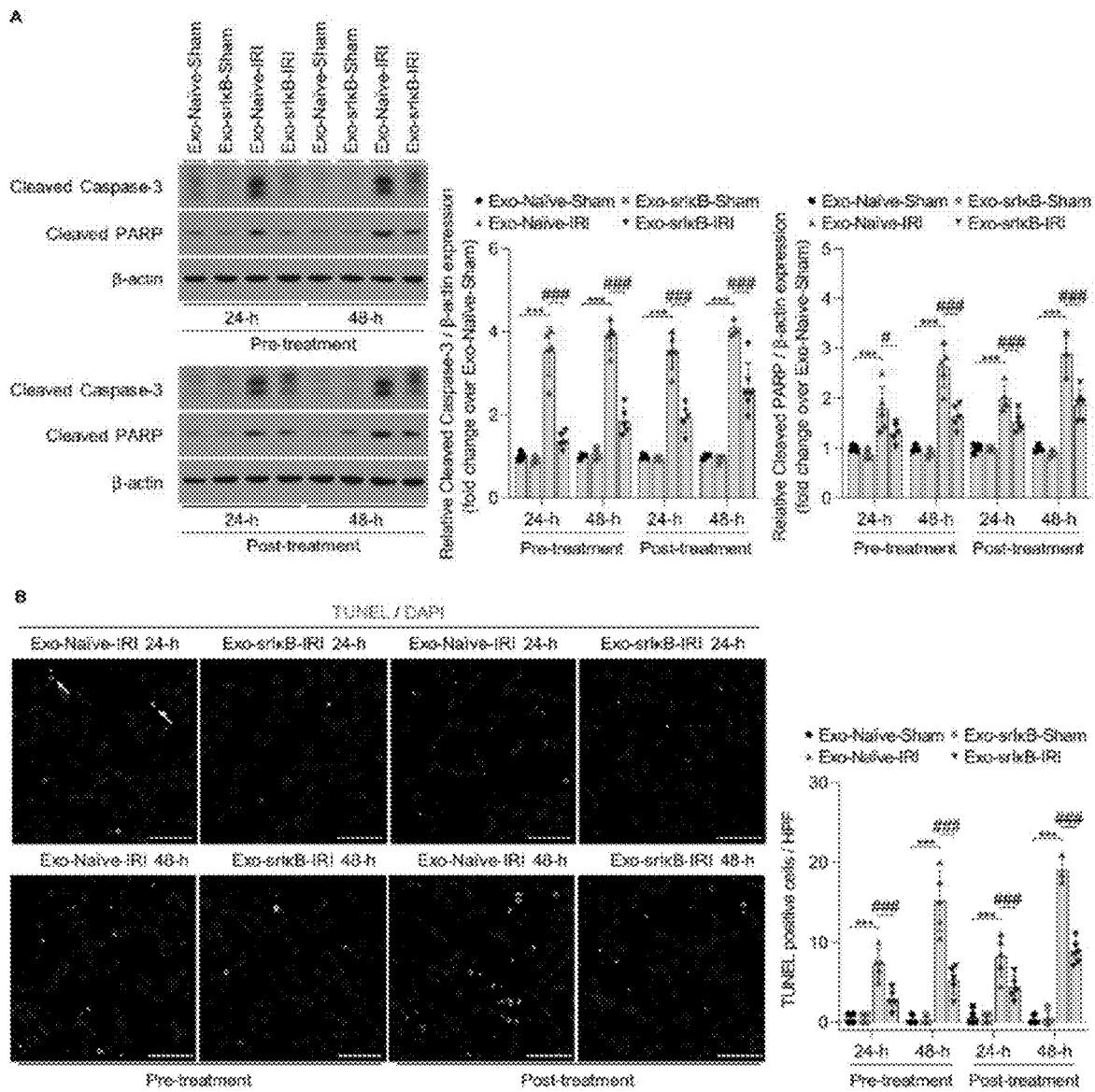

FIG. 5. Exo-srIκB treatment improves IR-induced kidney apoptosis.

(A) Left: Western blot analysis results that compare the expression of cleaved caspase-3 and cleaved PARP protein in kidneys from each experimental group. Right: Graphical representation shows that Exo-srIκB treatment lowered cleaved caspase-3 levels and cleaved PARP as compared with the Exo-Naïve treatment. (B) Left: Representative images of TUNEL staining (FITC-labelled) are shown. Apoptotic cells are green (White arrows) and DAPI was used as a counterstain. Scale bar, 50 μM. Right: A bar graph showing TUNEL positive cells in kidney sections from each group. Exo-srIκB treatment induced a lower number of apoptotic cells (Pre-treatment 24-h, n=5; pre-treatment 48-h, n=4-5; post-treatment 24-h, n=5; post-treatment 48-h, n=3-6). Comparisons between groups were assessed using one-way ANOVA with the Bonferroni post hoc test. Data were represented as mean±SD values. ***P<0.001, upon comparing Exo-Naïve-Sham and Exo-Naïve-IRI surgery groups. #P<0.05, ##P<0.01, and ###P<0.001, upon comparing Exo-Naïve-IRI and Exo-srIκB IRI surgery groups.

Figure 6:
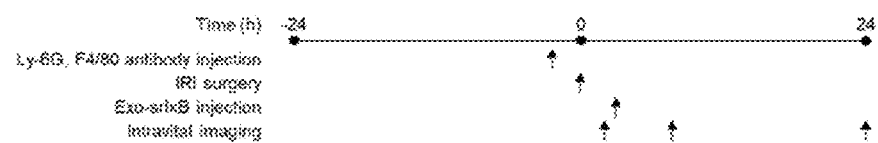
Figure 6:
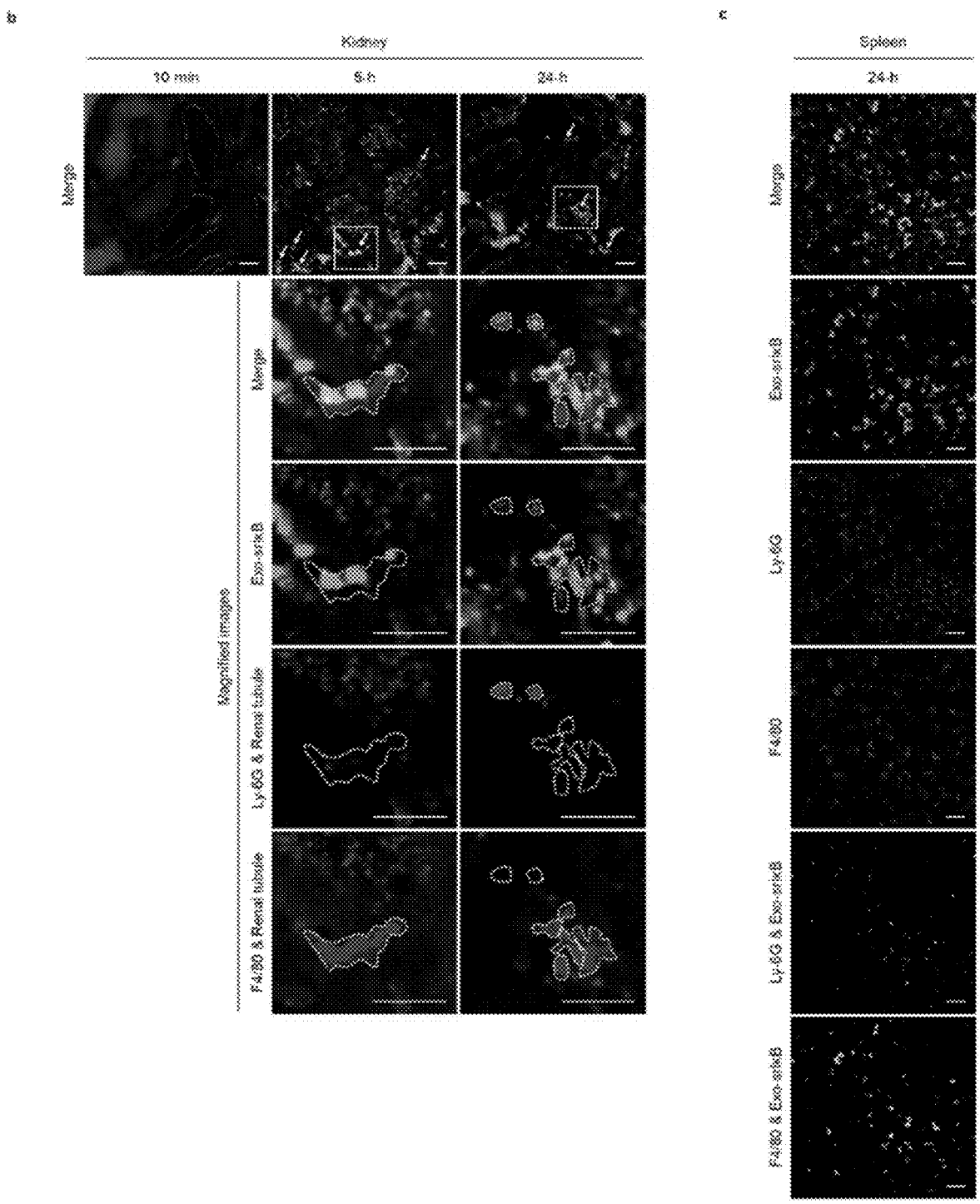

FIG. 6. Biodistribution of exosomes after renal ischemia-reperfusion injury.

(a) Experimental scheme of intravital imaging and exosome delivery. (b) Sequential intravital imaging shows the uptake of DiD-labeled exosome (green) into neutrophils (Ly6G+, red) and macrophages (F4/80+, blue) in the post-ischemic kidneys treated with intravenous Exo-srIκB. White arrow indicates DiD-labeled exosomes engulfed in immune cells. White dashed line indicates renal interstitium. (c) The biodistribution of DiD-labeled exosomes (green) in spleen after kidney IRI surgery shows exosomal uptake into neutrophils (Ly6G+, red) and macrophages (F4/80+, blue) in the outer parenchyma. Elapsed time is indicated. Scale bar, 20 μm.

Figure 7:
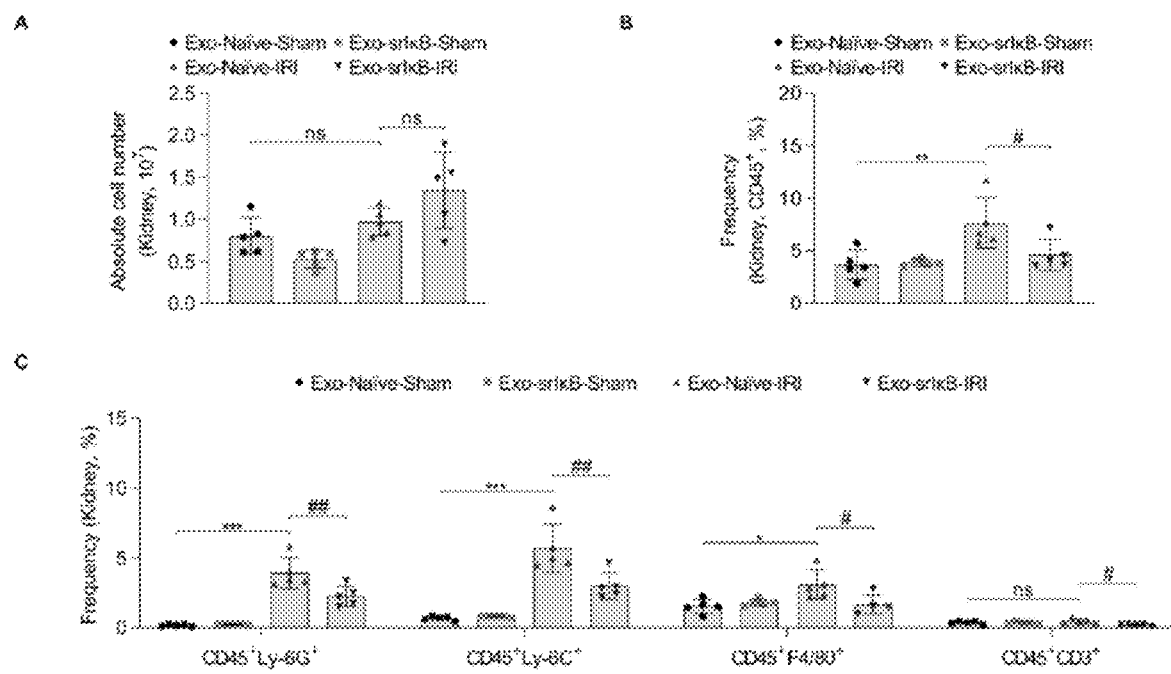
Figure 7:
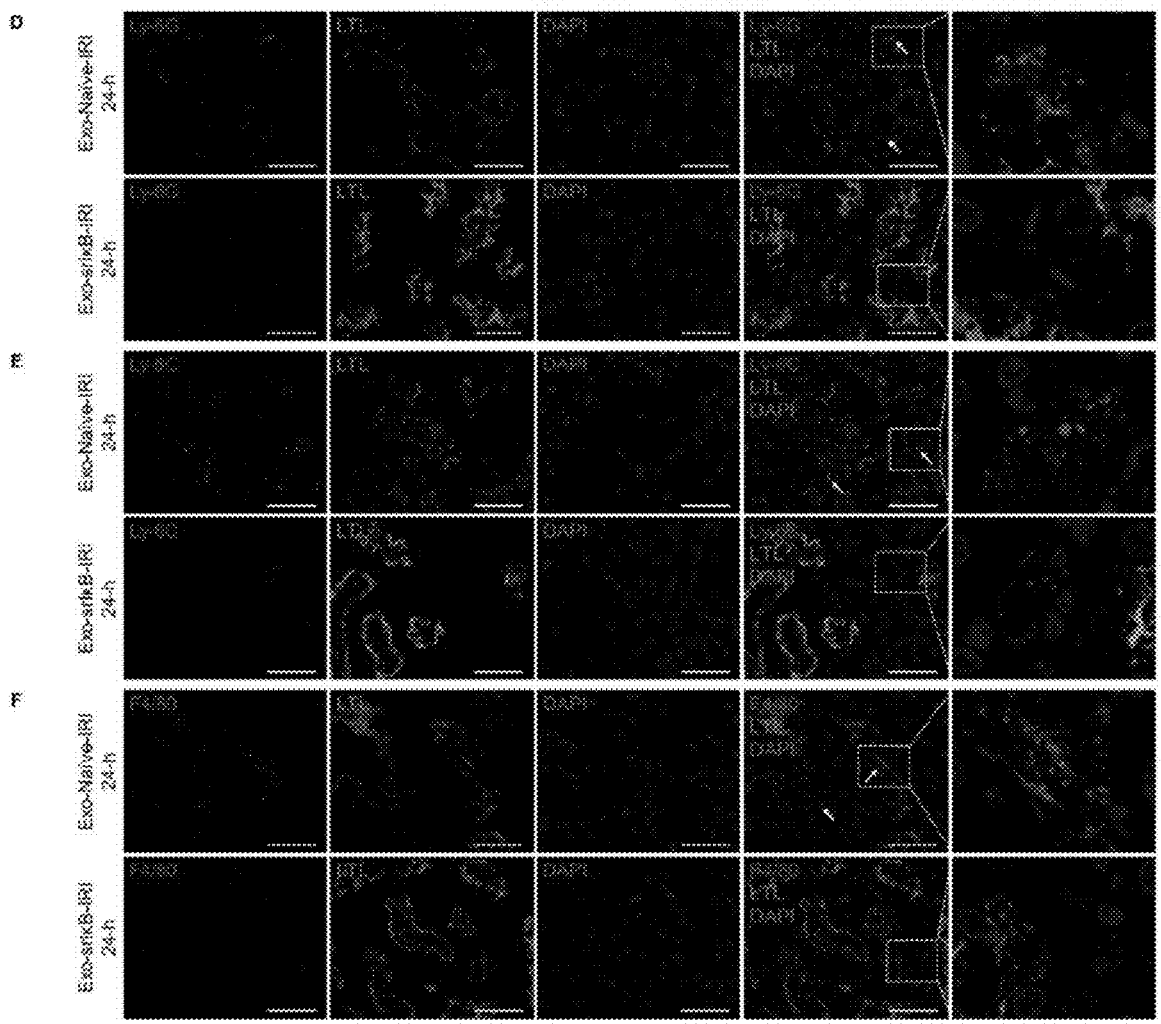

FIG. 7. Exo-srIκB treatment modulates kidney immune cell populations following IR-induced AKI.

(A) Mice were sacrificed 24 h after surgery. KMNCs were enriched using enzymatic digestion, mechanical disruption, and Percoll density gradients. Total kidney cell numbers determined using those methods showed no statistical differences among the experimental groups. (B) Graphical representation of flow cytometric analysis showed a higher percentage of kidney CD45+ cells after IRI among isolated kidney cells using enzymatic digestion, mechanical disruption, and Percoll density gradients. Exo-srIκB treatment alleviated the post-ischemic surge of renal immune cells. (C) Results of further staining with additional immune cell markers showed that the frequency of multilineage immune cells, including neutrophils (CD45+Ly6G+), pro-/anti-inflammatory mononuclear phagocytic cells (CD45+Ly6C+/CD45+F4/80+), and T cells (CD45+CD3+) among enriched KMNCs were also decreased with Exo-srIκB treatment in post-ischemic kidneys. (D-F) Immunofluorescence studies were performed on post-ischemic kidneys from each experimental group, targeting Ly6G, Ly6C, and F4/80. Secondary antibodies conjugated with Alexa Fluor 647 were used for all immunofluorescence experiments. Data showed a decreased frequency of Alexa Fluor 647 stained cells (white arrow) in post-ischemic kidneys following Exo-srIκB treatment, suggesting that there were fewer neutrophils (Ly6G+) and pro-/anti-inflammatory mononuclear phagocytic cells (Ly6C+/F4/80+) in Exo-srIκB treated kidneys. Proximal tubular cells were stained with LTL (green) and DAPI was used as for counterstaining. Scale bar, 50 μM. (n=5 per experimental group). Comparisons between groups were assessed using one-way ANOVA with Bonferroni post hoc test. Data were represented as mean±SD values. *P<0.05, P<0.01, *P<0.001, upon comparing Exo-Naïve-Sham and Exo-Naïve-IRI surgery groups. #P<0.05, ##P<0.01, upon comparing Exo-Naïve-IRI and Exo-srIκB-IRI surgery groups.

Figure 8:
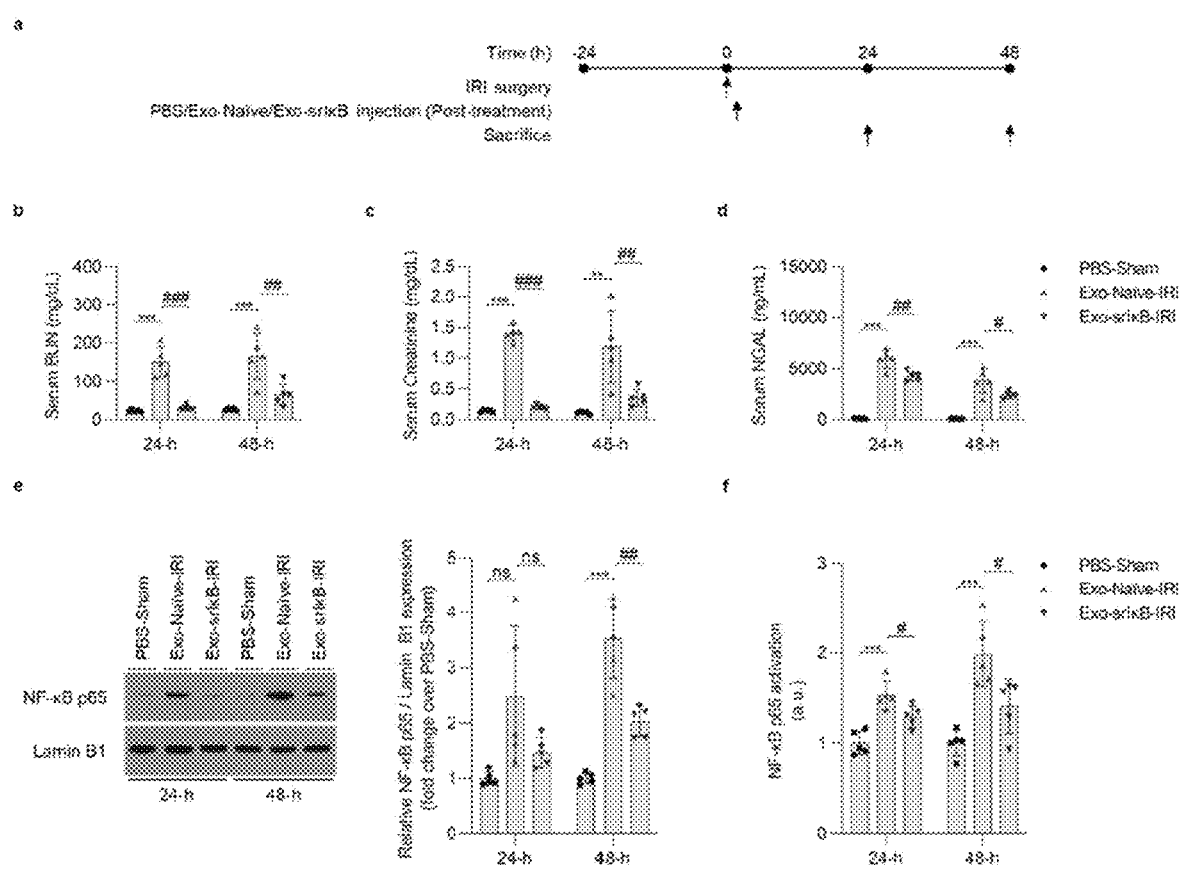
Figure 8:
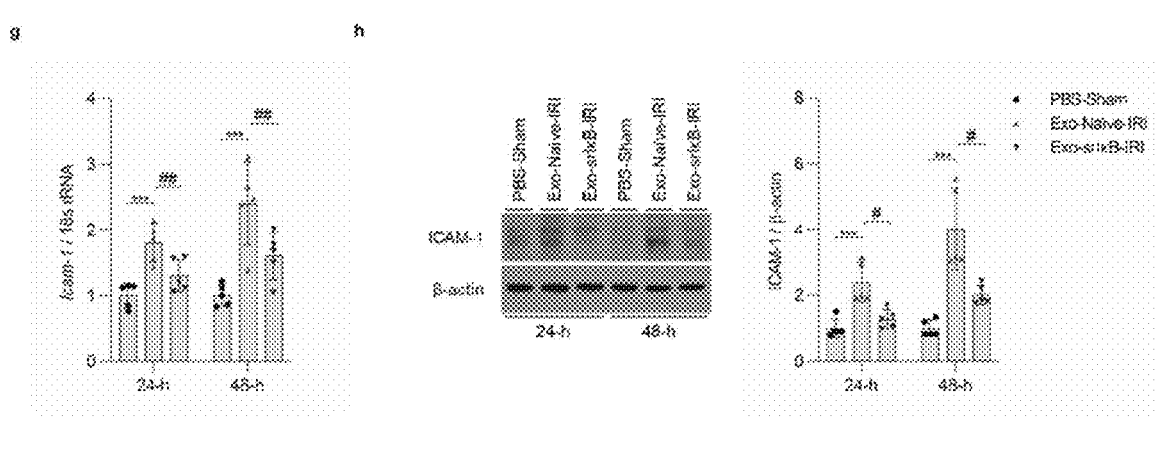

FIG. 8. Intravenous delivery of Exo-srIκB shows similar biologic effects compared to intraperitoneal delivery in ischemic AKI model.

(a) Experimental scheme of kidney IRI surgery and exosome delivery. Each mouse group was intravenously injected with 9×10$^9$ pn of Exo-Naïve, Exo-srIκB, or PBS 1 h after reperfusion. Mice were killed either 24 or 48 h after IRI surgery and serum and tissues were collected for further evaluation. (b-d) Serum levels of BUN, creatinine, and NGAL among different groups depending on treatment type (PBS vs. Exo-Naïve vs. Exo-srIκB) and follow-up time point (24-h and 48-h), which shows the renal protective effect of Exo-srIκB treatment (n=5 per experimental group).

(e) Western blot analysis of NF-κB p65 expression using renal nuclear extracts from each experimental mouse group. Nuclear extracts were biochemically separated from cytoplasmic fractions, and NF-κB p65 and Lamin B1 expression was analyzed via western blotting. IRI-induced activation of NF-κB signaling was significantly repressed with postoperative Exo-srIκB treatment. (f) Elevated DNA-binding activity of NF-κB p65 following renal IRI was suppressed with postoperative Exo-srIκB treatment. (g) qRT-PCR data show increased levels of Icam-1 mRNA in post-ischemic Exo-Naïve treatment group and significant reduction of Icam-1 mRNA with Exo-srIκB treatment. (h) Western blot analysis results of whole kidney lysates from each group demonstrated decreased expression of ICAM-1 in IR-injured kidneys with Exo-srIκB treatment. Comparisons between groups were assessed using one-way ANOVA with Bonferroni post hoc test. Data were represented as mean±SD values. ns; not significant, $P<0.01$, *$P<0.001$, upon comparing PBS-Sham and Exo-Naïve-IRI surgery groups. #$P<0.05$, ##$P<0.01$, ###$P<0.001$ upon comparing Exo-Naïve-IRI and Exo-srIκB-IRI surgery groups.

Figure 9:
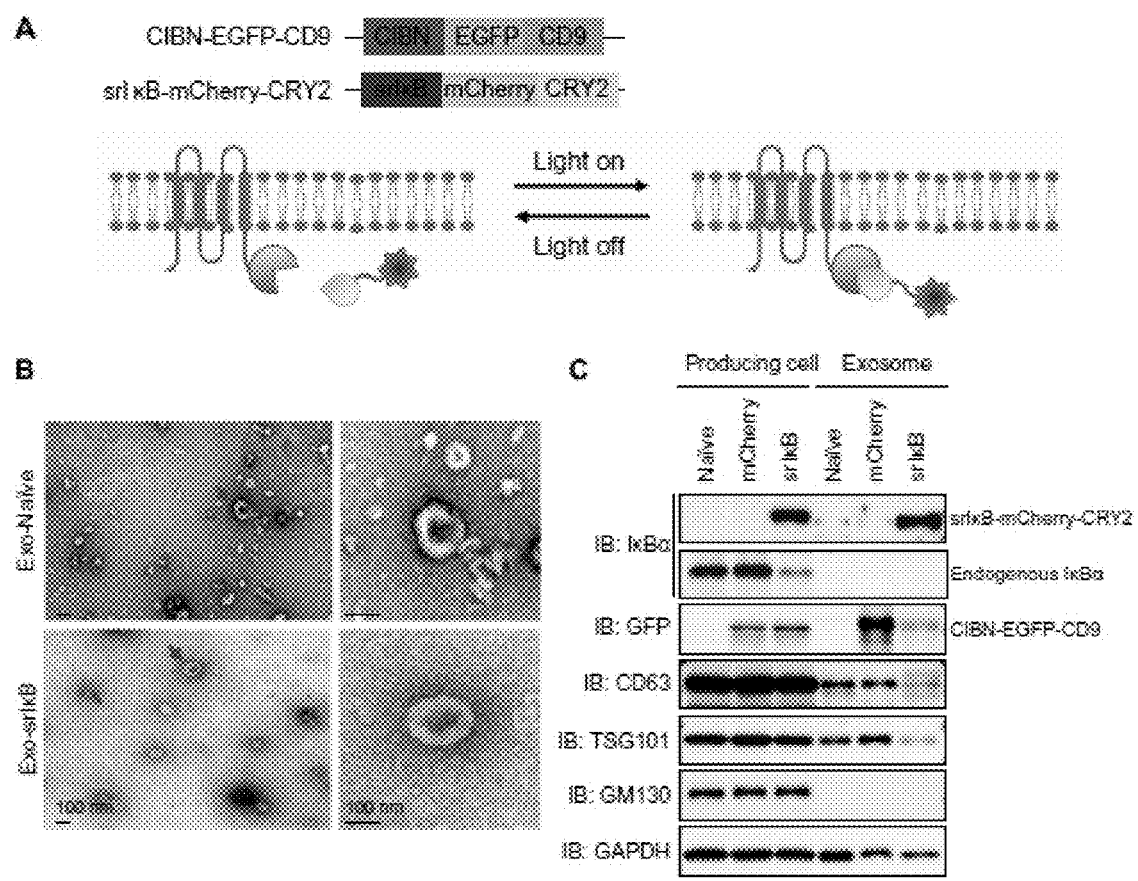

FIG. 9. Generation and characterization of engineered exosomes (A) Schematic of DNA constructs used for the production of super-repressor IκB-loaded exosome (Exo-srIκB) (upper). Schematic showing fusion proteins and their proposed activities (lower). (B) Morphological characterization of Exo-Naïve and Exo-srIκB through transmission electron microscopy (TEM) (C) HEK293T cells that stably express mCherry or srIκB, and exosomes from these HEK293T cells, were lysed and immunoblotted against the indicated proteins.

Figure 10:
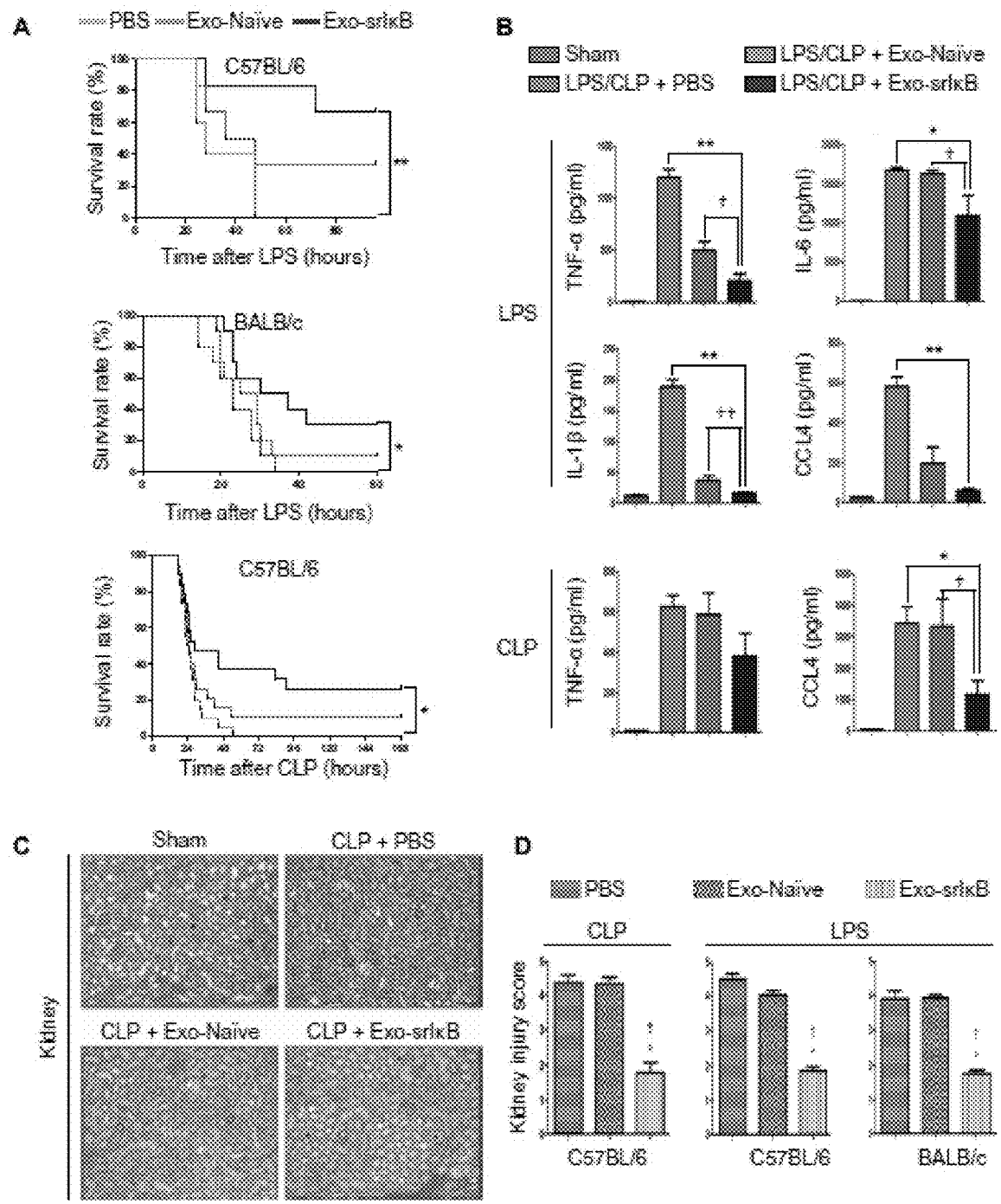

FIG. 10. The protective effects of Exo-srIκB in endotoxemia and cecal ligation and puncture (CLP)-induced sepsis (A) Survival curves of phosphate-buffered saline (PBS)-treated, Exo-Naïve, and Exo-srIκB-treated septic mice. Lipopolysaccharide (LPS) C57BL/6 mice (n=5-6/group), LPS BALB/c mice (n=10/group), and CLP C57BL/6 mice (n=14-15/group). **$p<0.01$, *$p<0.05$ compared with the PBS-treated sepsis group. (B) Levels of tumor necrosis factor (TNF)-α, interleukin (IL)-6, IL-1β, and CCL4/macrophage inflammatory protein (MIP)-1β in the plasma of exosome-treated mice were measured 24 h after LPS injection or CLP. **$p<0.01$, *$p<0.05$ compared with the PBS-treated sepsis group. †$p<0.05$ compared with the Exo-Naïve-treated sepsis group. (C) Representative images of cortical tubular cells in kidney sections from sham, CLP with PBS, CLP with Exo-Naïve, and CLP with Exo-srIκB mice. Normal brush border (*) of proximal tubules or loss of brush border (o); chromatin condensation (white arrows); denuded basement membrane (white arrow heads); vacuolization (yellow arrows); scale bar, 100 M. (D) Pathological kidney injury scores of representative kidney samples of each group. *$p<0.05$ compared with the PBS-treated sepsis group. †$p<0.05$ compared with the Exo-Naïve-treated sepsis group.

Figure 11:
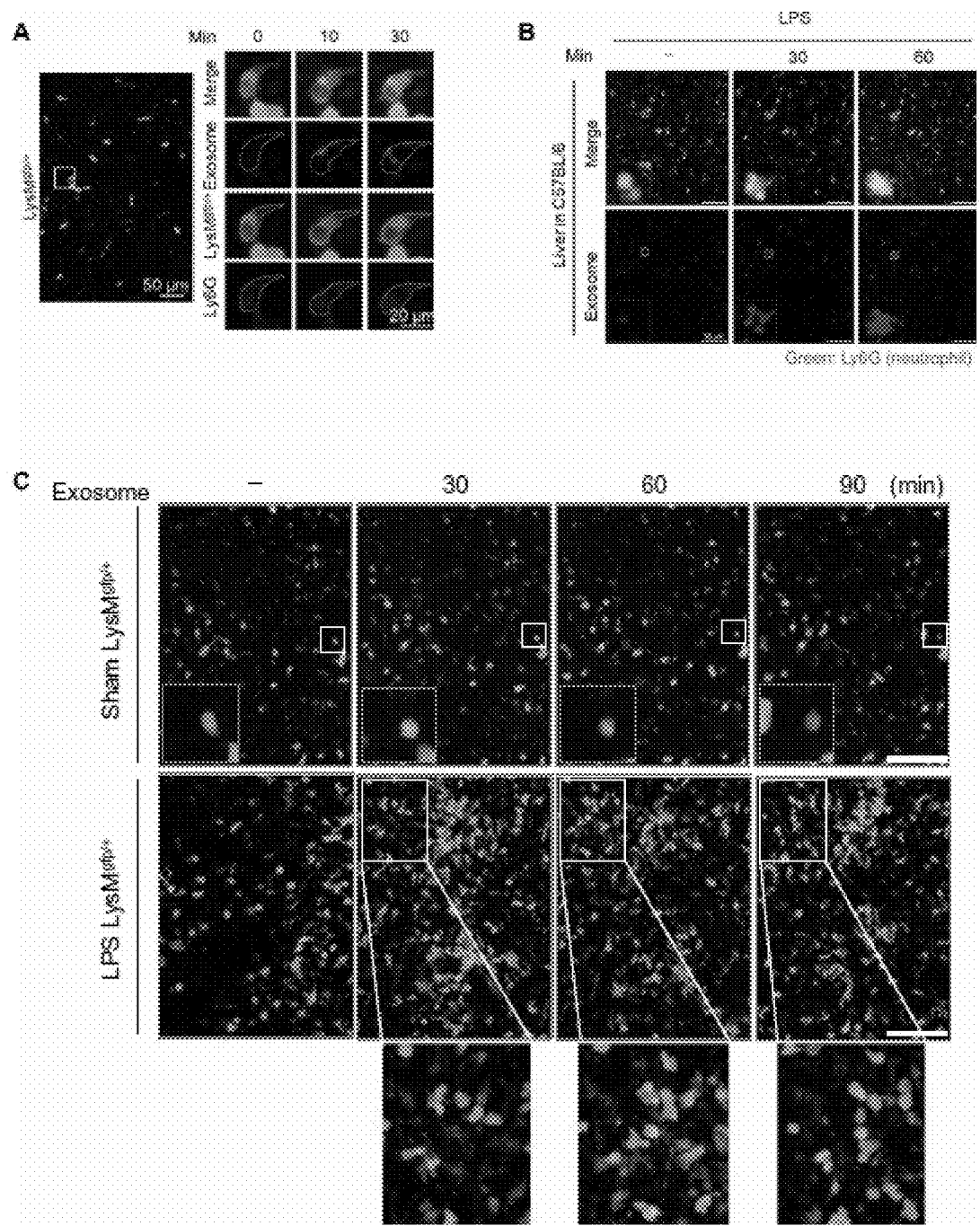

FIG. 11. The biodistribution of exosomes in LPS-injected mice (A) Intravital imaging of mCLING-labeled exosome (red) uptake into neutrophils (LysM$^{gfp/+}$, green; Ly6G$^+$, blue) in the liver of sham mice. (B) Representative time-lapse imaging of mCLING-labeled exosomes (red) inside the Ly6G$^+$ neutrophil cells (green) of the liver in LPS-treated C57BL/6 mice. (C) Sequential images of flowing mCLING-labeled exosomes (red) inside the spleen of sham and LPS-treated LysM$^{GFP/+}$ mice. Elapsed time is indicated. Magenta, autofluorescence; scale bars, 50 m.

Figure 12:
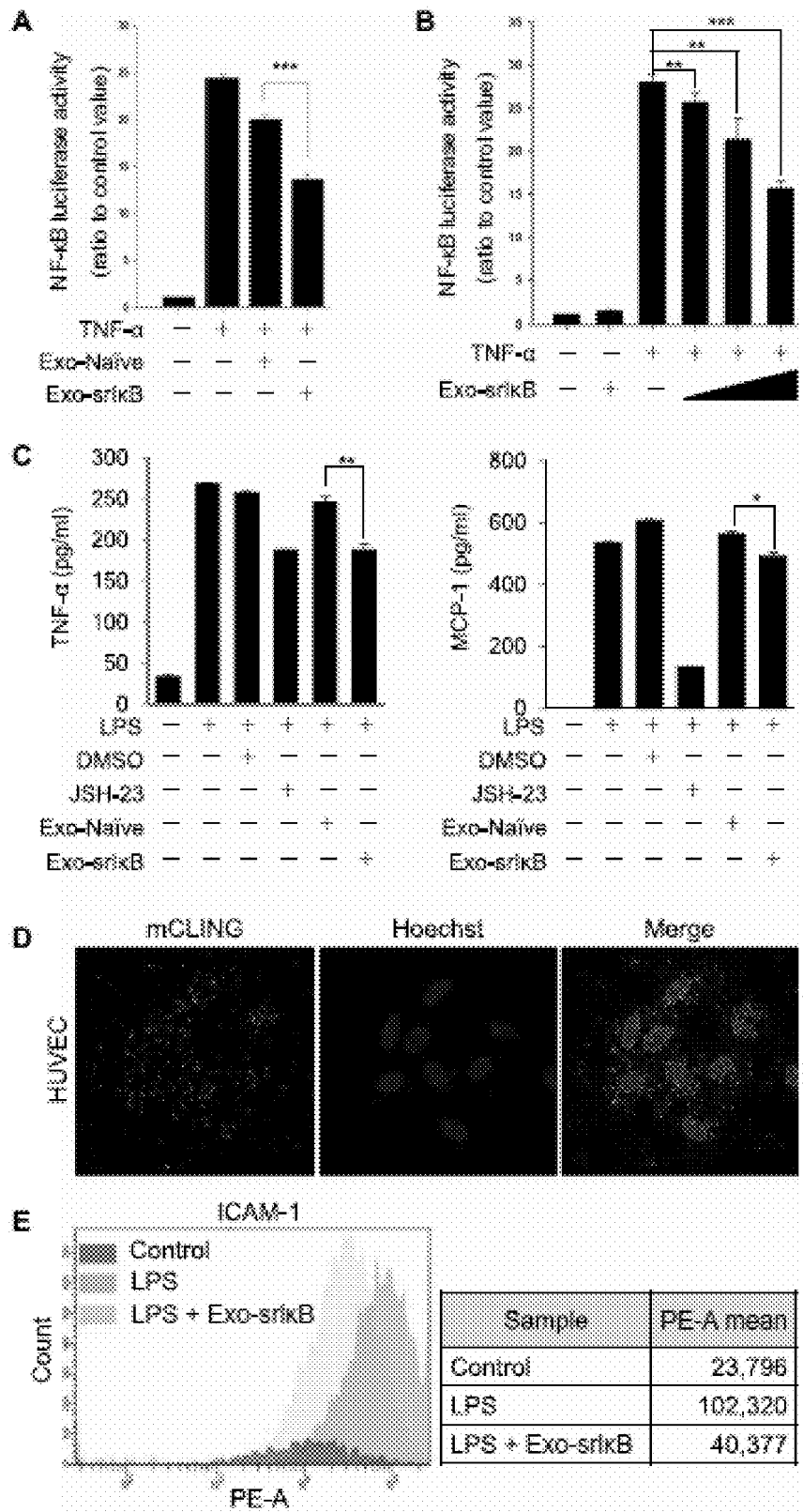

FIG. 12. Inhibitory effect of Exo-srIκB on nuclear factor-kappa-B (NF-κB) signaling in vitro (A) HEK293-NF-κB-luciferase cells ($2\times10^4$ cells) were cultured either with Exo-Naïve or with Exo-srIκB $2\times10^5$ particles. After 24 h, the cells were treated with 0.5 ng/ml TNF-α for an additional 18 h. Luciferase activities were measured and normalized. (B) Exo-srIκB dose-dependently repressed NF-κB activation in NF-κB-luciferase cells. (C) THP-1 cells ($5\times10^5$ cells) were stimulated with 1 g/ml LPS and then treated with Exo-srIκBs $5\times10^6$ particles. The supernatants were collected and assayed for the production of TNF-α and monocyte chemoattractant protein (MCP)-1. JSH-23 (50 µM) was used as the positive control. **$p<0.01$ (D) Immunofluorescence of human umbilical vein endothelial cells (HUVECs) incubated with mCLING-labeled Exo-srIκB. Representative images are shown. Nuclei were labeled with Hoechst. (E) HUVECs were stimulated with 300 ng/ml LPS for 24 h. Cells were harvested into a single-cell suspension and assessed through flow cytometry using specific phycoerythrin (PE)-conjugated antibodies against human intercellular cell adhesion molecule (ICAM)-1.

Figure 13:
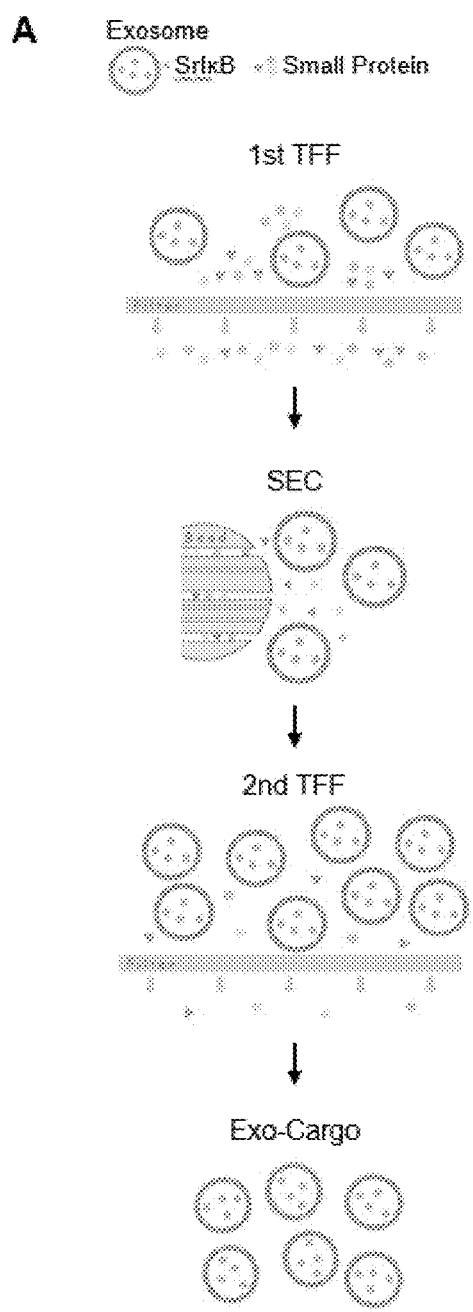
Figure 13:
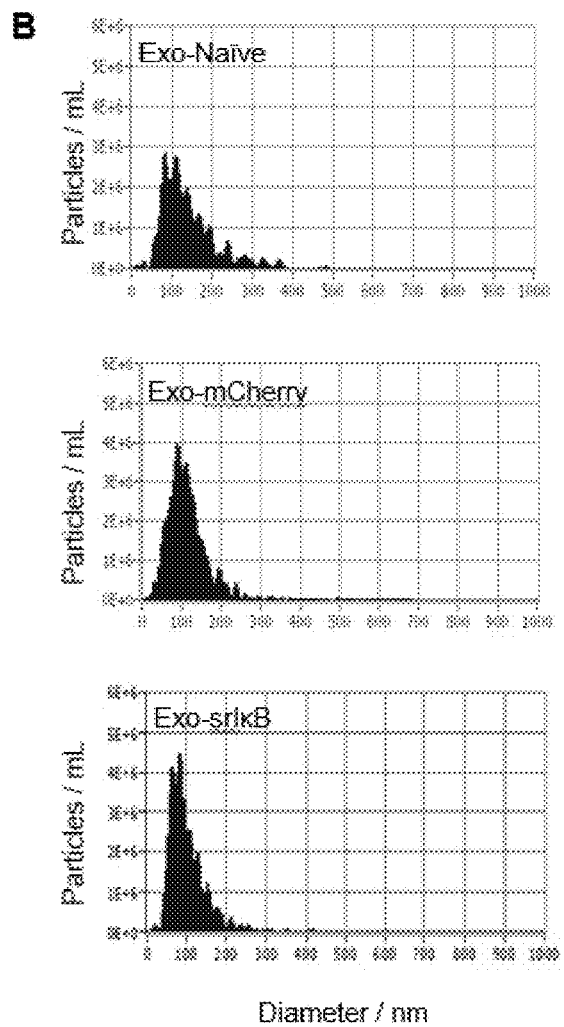

FIG. 13. Exosome characterization (A) Schematic illustration of the procedure used for generating engineered exosomes. (B) Representative graph of nanoparticle tracking analysis (NTA) demonstrating similar size distributions in diluted samples of Exo-Naïve, Exo-mCherry and Exo-srIκB.

Figure 14:
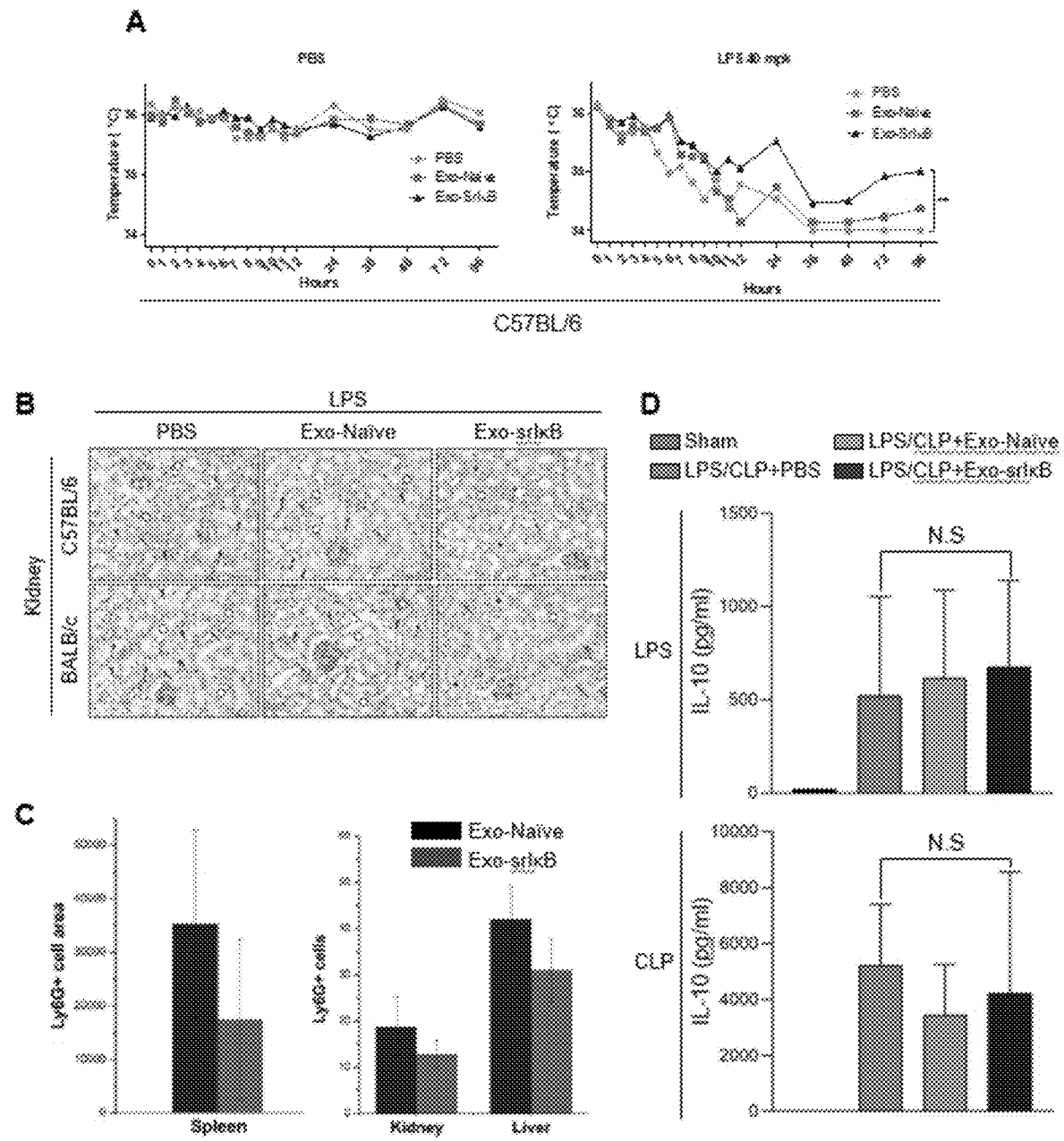

FIG. 14. Suppressive effects of Exo-srIκB in mouse models of sepsis (A) Changes in body temperature were monitored after wild-type and LPS-treated C57BL/6 mice were injected with the indicated exosomes. **$p<0.01$ compared with the PBS-treated LPS group. (B) Representative images of the renal cortex area in sections from C57BL/6 (upper panels) and BALB/c (lower panels) mice treated with LPS and PBS (left), Exo-Naïve (middle), and Exo-srIκB (right). Normal brush border of proximal tubules (*) or loss of brush border (o); chromatin condensation (red arrows); denuded basement membrane (red arrow heads); vacuolization (blue arrows); scale bar, 100 M. (C) Comparison of the number of infiltrated Ly6G+ cells in each organ between the Exo-Naïve and Exo-srIκB-treated groups of LPS-induced sepsis mice. (D) Levels of IL-10 were measured in the plasma of PBS-, Exo-Naïve-, and Exo-srIκB-treated septic mice. NS, not significant.

Figure 15:
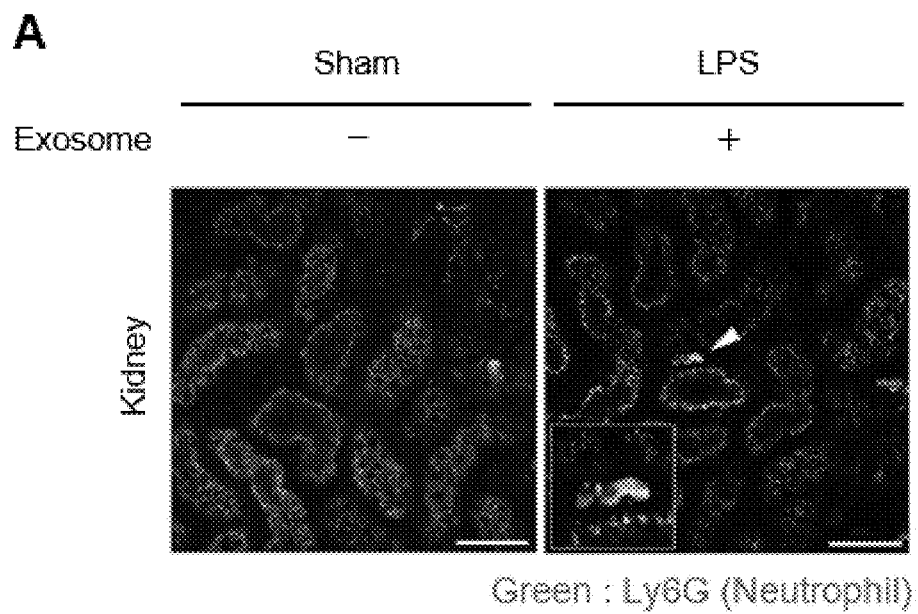

FIG. 15. The biodistribution of exosomes in mice with and without LPS challenge (A) Analysis of mCLING-labeled exosomes detected in the kidney using an intravital imaging system after intravenous administration of LPS.

Figure 16:
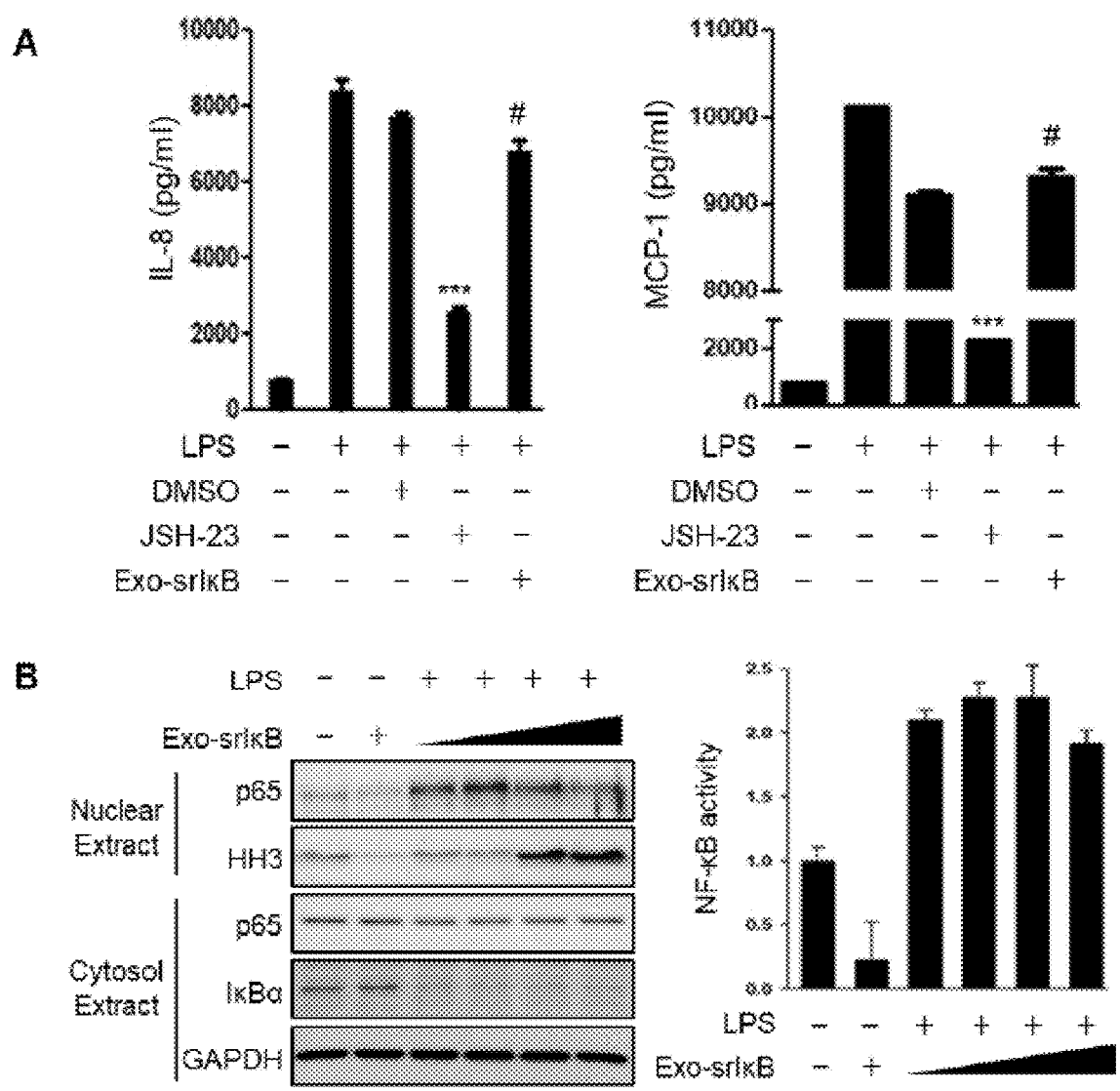

FIG. 16. Suppressive effects of Exo-srIκB on the LPS-induced inflammatory response in HUVECs (A) HUVECs ($7\times10^4$ cells) were cultured with Exo-srIκBs $1\times10^7$ particles for 24 h and then stimulated with 36 ng/ml LPS. The supernatants were collected after 24 h and assayed the production of IL-8 (left) and MCP-1 (right), respectively. JSH-23 (50 QM) was used as the positive control. ***$p<0.001$ compared with dimethyl sulfoxide (DMSO). #$p<0.05$ compared with cells treated only with LPS. (B) HUVECs were pretreated with Exo-srIκBs for 24 h, followed by 36 ng/ml of LPS stimulation for 1 h. Western blotting was used to assess protein levels of p65 and IκBα. GAPDH and histone H3 (HH3) were used as endogenous controls for the cytosol cell lysate and nuclear fraction, respectively (left). The binding of nuclear NF-κB to its target DNA sequence, 5'-GGGACTTTCC-3', was measured through enzyme-linked immunosorbent assay (ELISA) (right).

Figure 17:
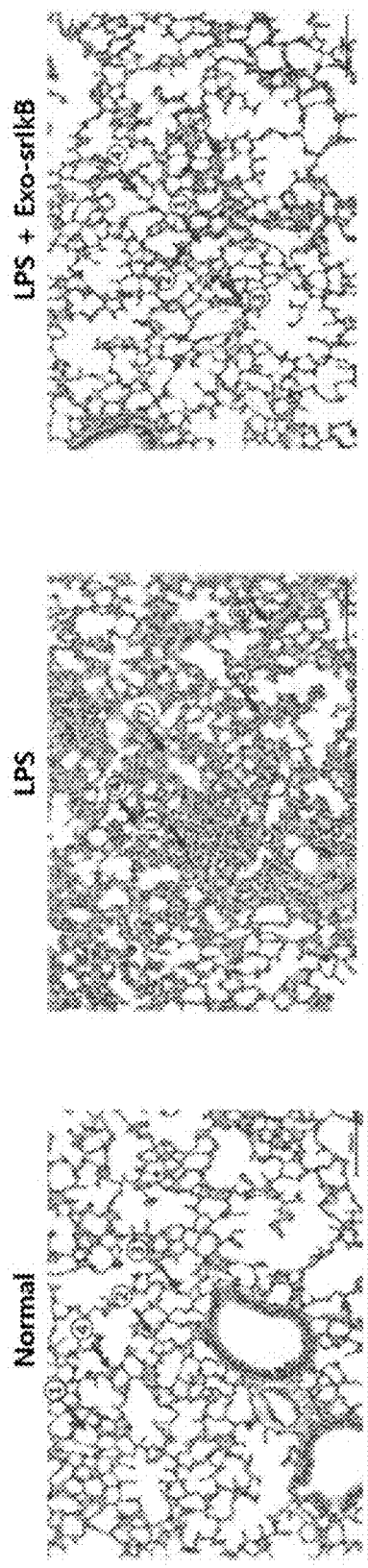

FIGS. 17-20. Protective effect of Exo-srIκBs on lung injury in LPS-induced sepsis FIG. 17 depicts H&E staining showing (1) Alveolar; (2) Capillary; (3) Neutrophil; (4) Alveolar macrophages; (5) Congestion; (6) Hemorrhage; (7) Nectrosis.

Figure 18:
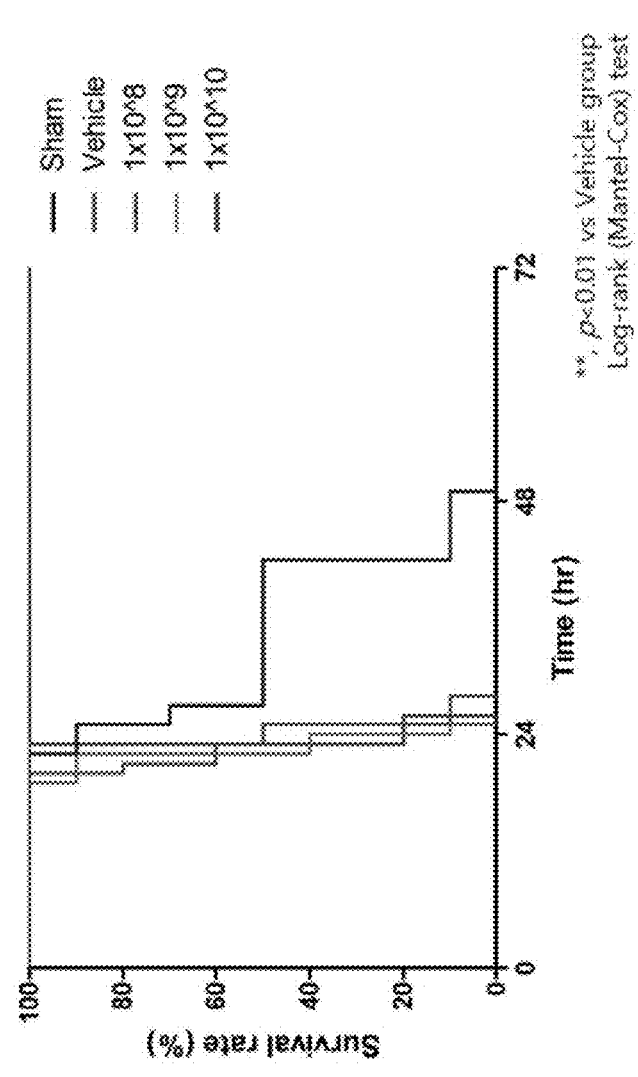

FIG. 18 depicts survival curve of sham, naïve exosome, and Exo-srIκB-treated septic mice.

Figure 19:
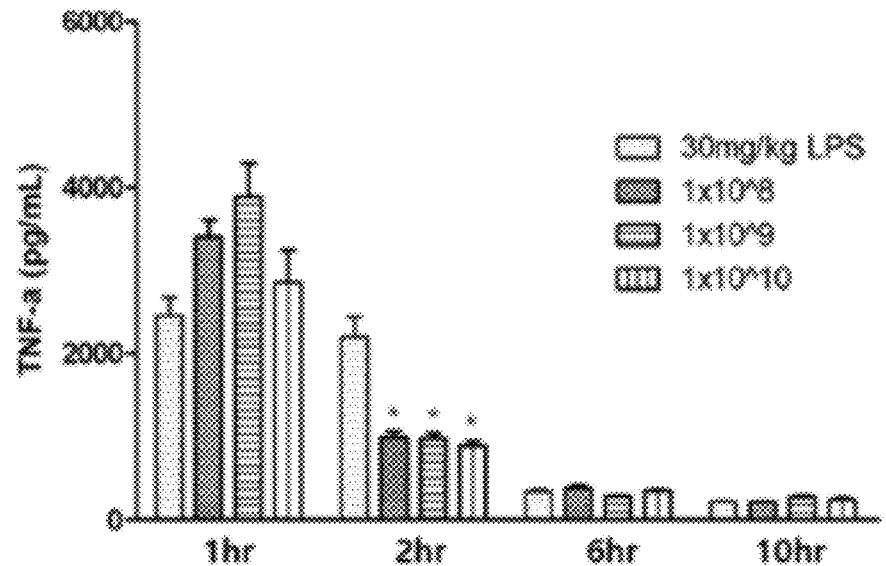

FIG. 19 depicts the level of TNF-α in the plasma of Exo-srIκB-treated septic mice.

Figure 20:
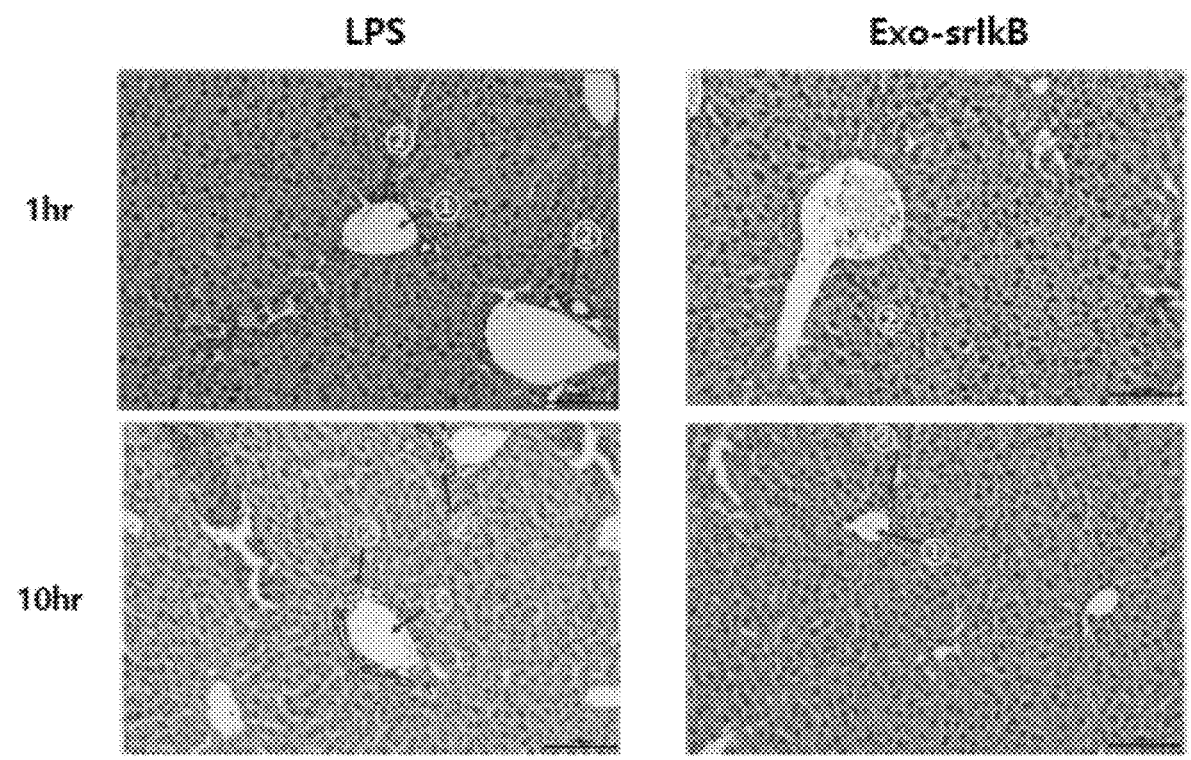

FIG. 20 depicts H&E staining showing (1) central vein; and (2) infiltration of immune cells.

Figure 21A:
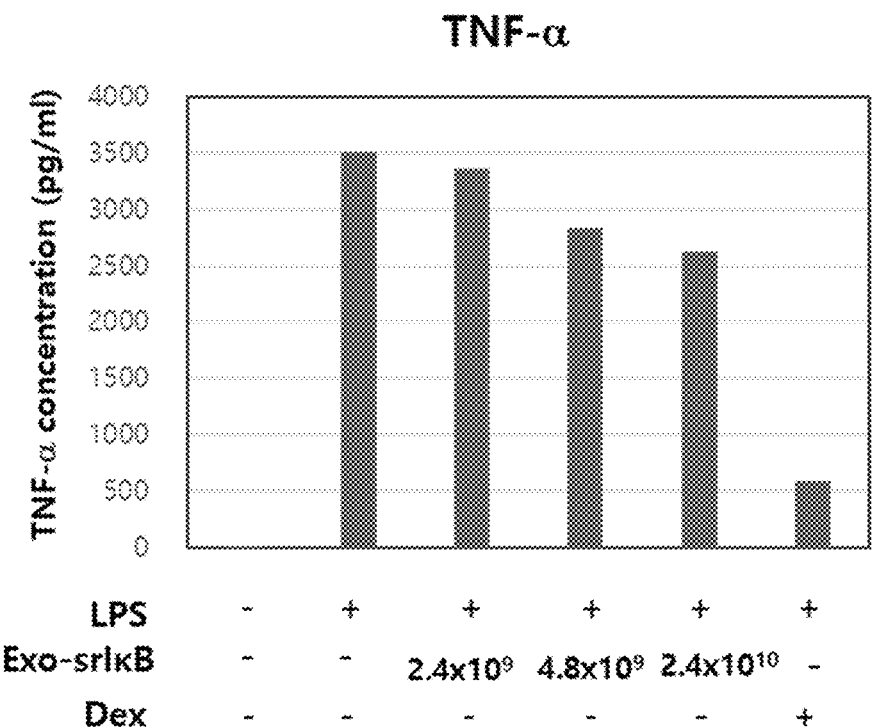
Figure 21B:
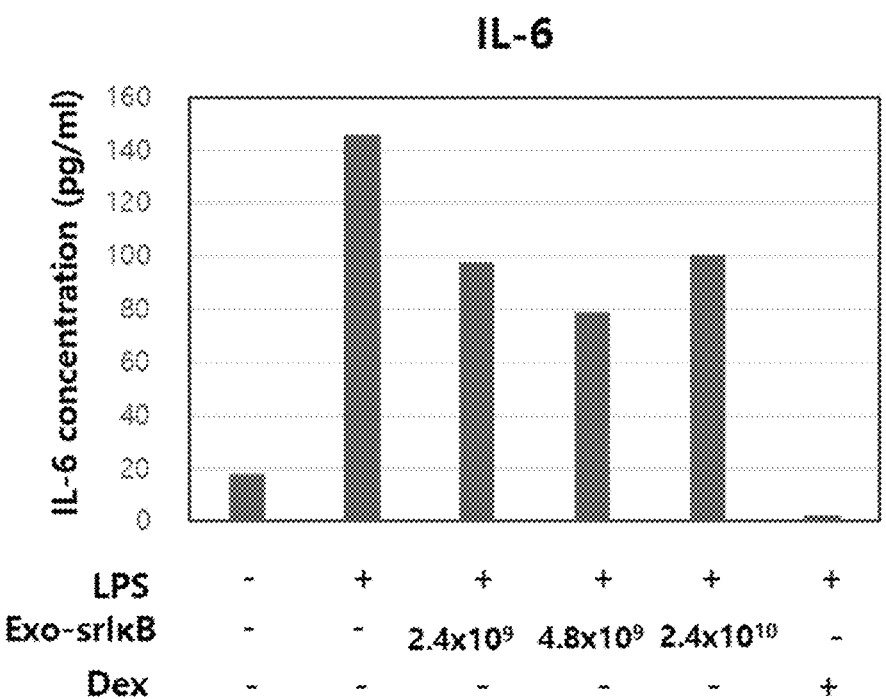

FIGS. 21A and 21B. Inhibitory effect of Exo-srIκB on proinflammatory cytokine production in LPS-induced pneumonia FIGS. 21A and 21B depict the levels TNF-α and IL-6 in the BALF and plasma, respectively, being decreased by Exo-srIκB injections in a dose-dependent manner

DETAILED DESCRIPTION OF THE INVENTION

The present disclosure provides for EXPLOR technology (Yim et al., *Nature Communications* 7, 12277 (2016), which was used to load srIκB into exosomes and systemically deliver Exo-srIκB, in order to assess their effect on the course of ischemic AKI. Human embryonic kidney (HEK) 293T cell lines that produced two recombinant proteins, CIBN-EGFP-CD9 and srIκB-mCherry-CRY2, were used for producing srIκB-containing exosomes (Exo-srIκB), by inducing the transient docking of CRY2 and CIBN using blue light illumination (FIG. 1A). Control exosomes (Exo-Naïve) were generated from intact HEK293T cells. The results confirmed that optogenetically engineered exosomes could be utilized as therapeutics, and that Exo-srIκB could alleviate IR-induced kidney damage through immunologic response modulation and apoptosis.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

As used herein, the term "about" means modifying, for example, lengths of nucleotide sequences, degrees of errors, dimensions, the quantity of an ingredient in a composition, concentrations, volumes, process temperature, process time, yields, flow rates, pressures, and like values, and ranges thereof, refers to variation in the numerical quantity that may occur, for example, through typical measuring and handling procedures used for making compounds, compositions, concentrates or use formulations; through inadvertent error in these procedures; through differences in the manufacture, source, or purity of starting materials or ingredients used to carry out the methods; and like considerations. The term "about" also encompasses amounts that differ due to aging of, for example, a composition, formulation, or cell culture with a particular initial concentration or mixture, and amounts that differ due to mixing or processing a composition or formulation with a particular initial concentration or mixture. Whether modified by the term "about" the claims appended hereto include equivalents to these quantities. The term "about" further may refer to a range of values that are similar to the stated reference value. In certain embodiments, the term "about" refers to a range of values that fall within 50, 25, 10, 9, 8,7, 6, 5,4, 3, 2, 1 percent or less of the stated reference value.

As used herein, the term "subject" refers to a human or any non-human animal (e.g., mouse, rat, rabbit, dog, cat, cattle, swine, sheep, horse or primate).

AKI

The immune response according to NF-κB signal transduction may be involved in AKI, and Exo-srIκB may exert an effect of improving kidney damage in the kidney damage caused by sepsis. In some examples herein, it was evaluated whether administration of the inhibitor could alleviate the process of ischemic AKI. In the examples herein, SrIκB was delivered to mice before and after IRI surgery using the EXPLOR technique, and the results were compared with the control group. As a result, it was confirmed that the Exo-srIκB-treated mice exhibited lower levels of serum BUN and creatinine compared to the control group, thereby exerting prophylactic and therapeutic effects from IR-induced AKI. On the other hand, as a result of checking whether the administration of Exo-srIκB locally affects the NF-κB signal of the kidney, Exo-srIκB was found to significantly reduce the nuclear translocation and nuclear binding activity of NF-κB compared to the control group. The NF-κB pathway may play an important role in the immune response process. As a result of comparing the gene expression of Pan-inflammatory cytokines/chemokines in the Exo-srIκB treatment group and the control group, IL-1β, IL-6, Significant reductions in a number of inflammatory mediators were identified, including CCL2, CCL5, CXCL2 and TNF-α. Finally, in the examples herein, flow cytometric analysis was conducted to compare whether NF-κB inhibitor treatment affects the renal immune cell population, and the frequency of multiple immune cell populations including neutrophils, monocytes/macrophages and T cells was observed to be significantly reduced.

IRI may induce an inflammatory cascade and oxidative stress, causing a cytokine storm, leading to apoptosis and structural damage to adjacent tissues. The NF-κB signaling pathway may regulate cell survival and inflammation in a rapid response to IRI stimulation, specifically, high levels from damaged cells during the early stages of hypoxia/reperfusion. For example, a number of endogenous factors such as mobility group box 1 (HMGB1), heat shock proteins (HSPs) and pathogen-/damage associated molecular patterns (PAMPs/DAMPs) are released. These endogenous molecules may stimulate Toll-like Receptor (TLR) and Pattern Recognition Receptor (PRP), such as IL-1R. TLR and IL-1R share the same intracellular domain and phosphorylate the inhibitory protein IκB residue and activate IκB kinase (IKK), which ultimately leads to degradation of IκB by the proteasome. This process allows a heterodimer (e.g., p50/p65) to move from the cytoplasm to the nucleus, which binds to DNA and promotes transcription of inflammatory mediators including TNF-α, IL-1, IL-6 and IL-8, which further accelerate NF-κB signaling. This pro-inflammatory cascade may regulate the surrounding microenvironment by inducing apoptosis and promoting leukocyte migration/activation in renal duct cells exposed to IRI. The ischemic AKI model of the present disclosure can also induce the activation of NF-κB signaling, which induces the expression of a number of inflammatory cytokines/chemokines genes, significantly affecting the renal immune cell population compared to the false surgical group. Recent studies include TLR antagonists, cytokine antagonists, IKK complex antagonists, proteasome inhibitors, decoy oligo deoxynucleotides (ODNs) specific to specific NF-κB complexes, and ODNs that inhibit Rel protein translation in various organs. It shows the effect of blocking NF-κB in IRI by inhibiting NF-κB signaling using a variety of pharmacological inhibitors, including. IκBα proteins having mutations at serine residues 32 and 36 are not phosphorylated and thus exist as multimers with NF-κB in the cytoplasm and are not degraded, which holds NF-κB nuclear translocation. This non-degradable IκBα, so-called super-repressor IκBα (srIκB), is also known to have an anti-tumor effect by inducing apoptosis.

In the present disclosure, the therapeutic effect of Exo-srIκB is shown in a kidney IRI model representing acute nephritis. Exo-srIκB regulates the process of AKI by down-regulating the production of pro-inflammatory mediators that can limit leukocyte migration/activation, and by inducing early apoptosis of inflammatory cells, leading to early termination of the inflammatory phase. In the present disclosure, it was confirmed that the administration of Exo-srIκB only affects the frequency of the immune cell population in the kidney and does not affect the frequency of the immune cell population in the spleen. These results show that Exo-srIκB selectively inhibits cell proliferation or promotes apoptosis in kidney-resident immune cells. On the other hand, it may be interpreted that the in vivo delivery of ExosrIκB blocks the outflow of splenic immune cells to the damaged kidney. In the present disclosure, Exo-srIκB is shown to alleviate IR-induced AKI in mice by inhibiting the activity of NF-κB signal. In addition, in vivo delivery of Exo-srIκB can improve the overall inflammatory state of the kidney by reducing the expression of pro-inflammatory genes and reducing the renal immune cell population including neutrophils, monocytes/macrophages and T cells. Accordingly, in one aspect, the present disclosure relates to an exosome on which srIκB is mounted, and more particularly, to an exosome on which srIκB represented by the amino acid sequence of SEQ ID NO: 1 is mounted. Hereinafter, srIκB may be expressed as a cargo protein.

In some embodiments, the AKI described herein is Ischemia-reperfusion (IR)-induced AKI, lipopolysaccharide (LPS)-induced AKI or sepsis-induced AKI but not limited thereto. Ischemia-reperfusion (IR) injury (IRI) is a major cause of acute kidney injury (AKI). Ischemia-reperfusion (IR)-induced acute kidney injury (AKI) is a relatively common but severe medical condition that can happen when a subject suffers from systemic hypoperfusion that is followed by restoration of blood flow and re-oxygenation. The most common clinical examples include patients undergoing renal transplant or cardiac surgery and patients with sepsis, trauma, or myocardial infarction. Renal IR injury (IRI) is associated with a high morbidity/mortality and is known to induce dysfunction in other distant organs, including the heart, lung, and liver. In IR-induced AKI, hypoxia and reperfusion generate reactive oxygen species (ROS), followed by a cascade response, including cell death and inflammation, and subsequent renal failure. Immunologic responses may significantly affect renal IRI and repair. Nuclear factor (NF)-κB signaling, which controls cytokine production and cell survival, is significantly involved in IR-induced AKI; its inhibition can ameliorate ischemic AKI.

Using EXPLOR, an optogenetically engineered exosome technology, the exosomal super-repressor inhibitor of NF-κB (Exo-srIκB) was loaded into exosomes and administered toB6 WT mice before/after kidney IR surgery as shown in the examples herein. The outcome was compared with the results from a control exosome (Exo-Naïve)-injected group. Exo-srIκB treatment resulted in lower levels of serum blood urea nitrogen, creatinine, and neutrophil gelatinase-associated lipocalin in post-ischemic mice than in the Exo-Naïve treatment group. Systemic delivery of Exo-srIκB decreased NF-κB activity in post-ischemic kidneys, leading to reduced apoptosis levels. Post-ischemic kidneys showed decreased gene expression of pro-inflammatory cytokines and adhesion molecules with Exo-srIκB treatment as compared with the control. Exo-srIκB treatment also significantly affected post-ischemic renal immune cell populations, lowering neutrophil, monocyte/macrophage, and T cell frequencies than those in the control. Thus, the modulation of NF-κB signaling through exosomal delivery can be used as a novel therapeutic method for AKI, including IR-induced AKI.

In another embodiment of the present disclosure, the exosomes are engineered to contain a mutant form of the biological inhibitor of NF-κB, called super-repressor (SR) IκB (srIκB, SEQ ID NO:1) (N. Yim et al., *Nature Communications* 7, 12277 (2016).

As shown in the examples below, an optogenetically engineered exosome system (EXPLOR) was employed for loading a large amount of srIκB into exosomes in stably transfected cells. The below examples confirm that intraperitoneal injection of purified srIκB-loaded exosomes (Exo-srIκBs) attenuates mortality and systemic inflammation in septic mouse models. In a biodistribution study using exosomes labeled with fluorescence dye, Exo-srIκBs were mainly observed in the neutrophils, and in monocytes to a lesser extent, in the spleens and livers of mice. Moreover, the examples confirm that Exo-srIκB alleviates inflammatory responses in monocytic THP-1 cells and human umbilical vein endothelial cells (HUVECs) in response to lipopolysaccharide (LPS) or tumor necrosis factor (TNF)-α. These results confirm that Exo-srIκB can protect against systemic inflammation and sepsis-induced death by inhibiting NF-κB activation.

The present disclosure provides a method for treating acute kidney injury (AKI) in a subject in need thereof, comprising administering an effective amount of a composition comprising an exosome comprising an NF-κB inhibitor to the subject. In some embodiments, the NF-κB inhibitor is selected from the group consisting of a NF-κB inhibitory protein, its fragment, and a mixture thereof.

The compositions are physiologically acceptable water-based solutions, or suspensions, of exosomes.

The NF-κB inhibitor is selected from an NF-κB inhibitory drug, an NF-κB inhibitory protein or its fragment, or a mixture thereof.

Preferably, the NF-κB inhibitor is selected from the group comprising super-repressor IκB, IκB-α, IκB-β, IκB-ε, BCL-3, a mutant thereof, and a mixture thereof.

In another preferred embodiment of the present disclosure, the exosomes of the present disclosure contain a mutant form of the biological inhibitor of NF-κB, called super-repressor (SR) IκB (srIκB, SEQ ID NO:1).

In one embodiment of the present disclosure, srIκB has Ser32 and Ser36 of IκB (SEQ ID NO:2) replaced with Ala.

SEQ ID NO:1 *Homo sapiens*, super-repressor-IκB (srIκB)

MFQAAERPQEWAMEGPRDGLKKERLLDDRHDAGLDAMKDEEYEQMVKEL

QEIRLEPQEVPRGSEPWKQQLTEDGDSFLHLAIIHEEKALTMEVIRQVK

GDLAFLNFQNNLQQTPLHLAVITNQPEIAEALLGAGCDPELRDFRGNTP

LHLACEQGCLASVGVLTQSCTTPHLHSILKATNYNGHTCLHLASIHGYL

GIVELLVSLGADVNAQEPCNGRTALHLAVDLQNPDLVSLLLKCGADVNR

VTYQGYSPYQLTWGRPSTRIQQQLGQLTLENLQMLPESEDEESYDTESE

FTEFTEDELPYDDCVFGGQRLTL

SEQ ID NO:2 *Homo sapiens*, IκB-α

MFQAAERPQEWAMEGPRDGLKKERLLDDRHDSGLDSMKDEEYEQMVKEL

QEIRLEPQEVPRGSEPWKQQLTEDGDSFLHLAIIHEEKALTMEVIRQVK

GDLAFLNFQNNLQQTPLHLAVITNQPEIAEALLGAGCDPELRDFRGNTP

LHLACEQGCLASVGVLTQSCTTPHLHSILKATNYNGHTCLHLASIHGYL

GIVELLVSLGADVNAQEPCNGRTALHLAVDLQNPDLVSLLLKCGADVNR

VTYQGYSPYQLTWGRPSTRIQQQLGQLTLENLQMLPESEDEESYDTESE

FTEFTEDELPYDDCVFGGQRLTL

SEQ ID NO:3 recombinant srIκB α peptide
DRHDAGLDAMKDE

In some embodiments, the NF-κB inhibitor comprises an amino acid sequence having at least 85% sequence identity to SEQ ID NO:1 or SEQ ID NO:2. In some embodiments, the NF-κB inhibitor comprises an amino acid sequence having at least 85% sequence identity to SEQ ID NO:1. In some embodiments, the NF-κB inhibitor comprises an amino acid sequence having at least 86% sequence identity to SEQ ID NO:1. In some embodiments, the NF-κB inhibitor comprises an amino acid sequence having at least 87% sequence identity to SEQ ID NO:1. In some embodiments, the NF-κB inhibitor comprises an amino acid sequence having at least 88% sequence identity to SEQ ID NO:1. In some embodiments, the NF-κB inhibitor comprises an amino acid sequence having at least 89% sequence identity to SEQ ID NO:1. In some embodiments, the NF-κB inhibitor comprises an amino acid sequence having at least 90% sequence identity to SEQ ID NO:1. In some embodiments, the NF-κB inhibitor comprises an amino acid sequence having at least 91% sequence identity to SEQ ID NO:1. In some embodiments, the NF-κB inhibitor comprises an amino acid sequence having at least 92% sequence identity to SEQ ID NO:1. In some embodiments, the NF-κB inhibitor comprises an amino acid sequence having at least 93% sequence identity to SEQ ID NO:1. In some embodiments, the NF-κB inhibitor comprises an amino acid sequence having at least 94% sequence identity to SEQ ID NO:1. In some embodiments, the NF-κB inhibitor comprises an amino acid sequence having at least 95% sequence identity to SEQ ID NO:1. In some embodiments, the NF-κB inhibitor comprises an amino acid sequence having at least 96% sequence identity to SEQ ID NO:1. In some embodiments, the NF-κB inhibitor comprises an amino acid sequence having at least 97% sequence identity to SEQ ID NO:1. In some embodiments, the NF-κB inhibitor comprises an amino acid sequence having at least 98% sequence identity to SEQ ID NO:1. In some embodiments, the NF-κB inhibitor comprises an amino acid sequence having at least 99% sequence identity to SEQ ID NO:1. In embodiments, the NF-κB inhibitor is represented by SEQ ID NO: 1.

In some embodiments, the NF-κB inhibitor comprises an amino acid sequence having at least 85% sequence identity to SEQ ID NO:2. In some embodiments, the NF-κB inhibitor comprises an amino acid sequence having at least 86% sequence identity to SEQ ID NO:2. In some embodiments, the NF-κB inhibitor comprises an amino acid sequence having at least 87% sequence identity to SEQ ID NO:2. In some embodiments, the NF-κB inhibitor comprises an amino acid sequence having at least 88% sequence identity to SEQ ID NO:2. In some embodiments, the NF-κB inhibitor comprises an amino acid sequence having at least 89% sequence identity to SEQ ID NO:2. In some embodiments, the NF-κB inhibitor comprises an amino acid sequence having at least 90% sequence identity to SEQ ID NO:2. In some embodiments, the NF-κB inhibitor comprises an amino acid sequence having at least 91% sequence identity to SEQ ID NO:2. In some embodiments, the NF-κB inhibitor comprises an amino acid sequence having at least 92% sequence identity to SEQ ID NO:2. In some embodiments, the NF-κB inhibitor comprises an amino acid sequence having at least 93% sequence identity to SEQ ID NO:2. In some embodiments, the NF-κB inhibitor comprises an amino acid sequence having at least 94% sequence identity to SEQ ID NO:2. In some embodiments, the NF-κB inhibitor comprises an amino acid sequence having at least 95% sequence identity to SEQ ID NO:2. In some embodiments, the NF-κB inhibitor comprises an amino acid sequence having at least 96% sequence identity to SEQ ID NO:2. In some embodiments, the NF-κB inhibitor comprises an amino acid sequence having at least 97% sequence identity to SEQ ID NO:2. In some embodiments, the NF-κB inhibitor comprises an amino acid sequence having at least 98% sequence identity to SEQ ID NO:2. In some embodiments, the NF-κB inhibitor comprises an amino acid sequence having at least 99% sequence identity to SEQ ID NO:2. In some embodiments, the NF-κB inhibitor is represented by SEQ ID NO: 1. In some embodiments, the NF-κB inhibitor is represented by SEQ ID NO: 2.

In a certain embodiment of the present disclosure, the exosome further comprises a photo-specific binding protein. In some embodiments, the photo-specific binding protein comprises a first photo-specific binding protein and/or a second photo-specific binding protein, which interacts reversibly with each other upon irradiation. In some embodiments, the first photo-specific binding protein is conjugated to an exosome specific marker to form a first fusion protein (fusion protein I). In some embodiments, the second photo-specific binding protein is conjugated to the NF-κB inhibitory protein to form a second fusion protein (fusion protein II). In some embodiments, the fusion protein I and the fusion protein II are linked reversibly through the first photo-specific binding protein and the second photo-specific binding protein. In some embodiments, the first photo-specific binding protein is conjugated to the exosome specific marker to be located in the direction toward inside of the exosome.

In additional embodiments, the first photo-specific binding protein and the second photo-specific binding protein are selected from the group comprising CIB, CIBN, PhyB, PIF, FKF1, GIGANTEA, CRY or PHR, but not limited thereto.

In additional embodiments, the first photo-specific binding protein is CIB or CIBN and the second photo-specific binding protein is CRY or PHR; or the first photo-specific binding protein is CRY or PHR and the second photospecific binding protein is CIB or CIBN.

In additional embodiments, the first photo-specific binding protein is PhyB and the second photo-specific bind protein is PIF or the first photo-specific binding protein is PIF and the second photo-specific binding protein is PhyB.

In additional embodiments, the first photo-specific binding protein is GIGANTEA and the second photo-specific binding protein is FKF1 or the first photo-specific binding protein is FKF1 and the second photo-specific binding protein is GIGANTEA.

In some embodiments, the exosome specific marker is selected from the group comprising CD9, CD63, CD81 or CD82, but not limited thereto. In additional embodiment, the exosome specific marker is CD9. In additional embodiment, the exosome specific marker is CD63. In additional embodiment, the exosome specific marker is CD81. In additional embodiment, the exosome specific marker is CD82.

In some embodiments, the exosome has a diameter of between about 50 nm and about 200 nm. In some embodiments, the exosome has a diameter of between about 50 nm and about 75 nm. In some embodiments, the exosome has a diameter of between about 75 nm and about 100 nm. In some embodiments, the exosome has a diameter of between about 100 nm and about 125 nm. In some embodiments, the exosome has a diameter of between about 125 nm and about 150 nm. In some embodiments, the exosome has a diameter of between about 150 nm and about 175 nm. In some embodiments, the exosome has a diameter of between about 175 nm and about 200 nm. In embodiments, the exosome has a diameter of between about 50 nm and about 150 nm. In some embodiments, the exosome has a diameter of about 50, 55, 60, 65, 70, 75, 80, 85, 90, 95, 100, 105, 110, 115, 120, 125, 130, 135, 140, 145, 150 or more and/or of about 75, 80, 85, 90, 95, 100, 105, 110, 115, 120, 125, 130, 135, 140, 145, 150, 155, 160, 165, 170, 175, 180, 185, 190, 195, 200 or less.

Without listing all details, the contents of U.S. Pat. No. 10,702,581 and Korean Patent No. 10-2100420 are incorporated herein by reference to provide the compositions and method of preparing the exosomes containing NF-κB inhibitors of the present disclosure.

The present disclosure also provides sustained release of the therapeutically effective drugs, while conventional sustained effects required repeated dosing of the therapeutics.

The present disclosure also further provides pharmaceutical compositions containing extracellular vesicles (exosomes) carrying NF-κB inhibitors and a pharmaceutically acceptable carrier or carriers.

Despite recent noteworthy advancements in understanding the pathophysiology of IR-induced AKI, no drug with proven clinical efficacy and safety to treat ischemic AKI has been developed; thus, the associated mortality and morbidity levels are significant. Since NF-κB signaling is deeply involved in the course of IR-induced AKI, it was assessed whether the systemic delivery of the NF-κB inhibitor using exosomes could alleviate the course of ischemic AKI. Through optogenetically controlled biogenesis of exosomes using EXPLOR technology, Exo-srIκB was delivered to mice either before/after IRI surgery and compared outcomes with those of the control group. The results showed that the mouse group receiving Exo-srIκB treatment was protected from IR-induced AKI; it showed better biochemical and histological outcomes than the control group. Systemic delivery of Exo-srIκB suppressed NF-κB signaling in post-ischemic kidneys, which led to a decreased expression of pro-inflammatory cytokines/chemokines and adhesion molecules and alleviation of apoptosis. Finally, NF-κB treatment affected the renal immune cell population and a significant reduction in frequencies of multiple immune cell populations, including neutrophils, monocytes/macrophages, and T cells, through flow cytometric and immunofluorescent analysis was observed.

During the early course of IRI, pro-inflammatory cascade and oxidative stress results in NF-κB pathway activation, subsequently leading to the regulation of cell survival and inflammation. Multiple endogenous factors are released during the early stages of hypoxia/reperfusion, including high mobility group box 1, heat shock proteins, and pathogen-/damage-associated molecular patterns, and these molecules stimulate pattern recognition receptors, such as Toll-like receptors (TLRs) and the interleukin-1 receptor (IL-1R). This process subsequently activates IκB kinase (IKK), which leads to IκB degradation by proteasomes. Next, heterodimers (e.g., p50/p65) translocate from the cytosol to the nucleus, where they promote the transcription of inflammatory mediators, including TNF-α, IL-1, IL-6, and IL-8, which in turn further promote NF-κB signaling. This proinflammatory cascade modulates surrounding microenvironments, by inducing apoptosis in renal tubular cells subjected to IRI, and promoting leukocyte migration/activation. The instant experimental ischemic AKI model could reproduce the activation of NF-κB signaling following renal IRI, leading to the increased expression of multiple inflammatory cytokines/chemokines and tissue apoptosis, which significantly affect renal immune cell populations.

Recent experimental studies have shown more detailed evidence regarding the effect of NF-κB blockade on IRI, using selective pharmacologic inhibitors of NF-κB signaling, including TLR antagonists, cytokine antagonists, IKK complex antagonists, proteasome inhibitors, and decoy oligodeoxynucleotides specific to a particular NF-κB complex, in various organs. srIκB is a non-degradable IκBα protein with mutations at serine residues 32 and 36. This protein prevents NF-κB nuclear translocation and subsequent NF-κB signaling. srIκB has proven protective effects in the lung IRI model, as it decreases neutrophil infiltration and pulmonary edema, and is also known to have anti-tumor effects, because it decreases chemoresistance. However, the effects of srIκB treatment in the course of kidney injury has not been fully evaluated. By using bioengineered exosomes as a vector, Choi et al. recently showed the therapeutic benefits of srIκB treatment in the septic AKI model. The below examples also demonstrate the protective effects of Exo-srIκB treatment in the renal IRI model, expanding the therapeutic potential of srIκB delivery through exosomes in various types of AKI.

Inflammatory process modulation has been a major therapeutic consideration in the field of ischemic AKI. Splenectomy as well as the use of the anti-TNF-α agent, infliximab, showed protective effects in the experimental ischemic AKI model, by lowering inflammatory cytokine expression and macrophages/monocyte accumulation. Inhibiting the migration of leukocytes and macrophages also preserved renal function and alleviated cell death, the provided examples have shown that Exo-srIκB treatment downregulates the expression of pro-inflammatory cytokines/chemokines and adhesion molecules, reduces apoptosis, and alleviates multi-lineage immune cell accumulation in IR-injured kidneys. These results suggest that Exo-srIκB modifies the course of ischemic AKI through pro-inflammatory cascade downregulation, limiting subsequent leukocyte migration/activation and preventing apoptosis.

Exosomes can have several benefits over the use of other types of vectors as conveyors. First, EVs are naturally protected from degradation during circulation and are non-immunogenic when used autologously. Exosomes can also overcome natural barriers such as the blood-brain barrier, through their intrinsic cell targeting properties. Additionally, exosomes use intrinsic mechanisms of recipient cells in the course of uptake, intracellular trafficking and the final delivery of cargoes to target cells. While maintaining these properties, EXPLOR technology made it possible to significantly increase intracellular levels of cargo proteins through controllable, reversible detachment from exosomes. There were several technical obstacles during the intracellular delivery of therapeutic proteins, including low purification efficiency, induction of immune responses against the host, and limited cytosolic delivery, and this novel exosomal delivery method using EXPLOR has significantly improved exosomal loading capacity, delivery efficiency, and purity, as compared with those of previous technologies. The below examples showed that efficient delivery of Exo-srIκB using EXPLOR technology could bring significant improvement in the renal outcome after experimental IRI.

Systemic Exo-srIκB treatment may only affect immune cell population frequencies in the kidney but not those in the spleen. This can be attributed to Exo-srIκB either selectively acting on renal resident immune cells alleviating proliferation or promoting apoptosis, or the systemic delivery of Exo-srIκB blocking the efflux of splenic immune cells into injured kidneys. Kidney resident immune cells and immune cells from lymphoid organs are known to have distinct origins, phenotypes, and functional characteristics. Further studies using chimeric mice or in vivo imaging would be able to differentiate resident renal immune cells from circulating immune cells, and provide more information about immune cell populations affected by systemic Exo-srIκB treatment.

Using the exosome as a carrier to deliver a cargo of active therapeutic agents is a safe and efficient method for delivering srIκB into the IR-induced AKI model. Exo-srIκB treatment alleviates IR-induced AKI in mice by downregulating NF-κB signaling and ameliorating inflammation and apoptosis in the ischemic injured kidney. The direct intracellular delivery of immunosuppressive proteins into target cells using exosomes is a promising therapeutic tool in IR-induced AKI and the therapeutic potential of Exo-srIκB in human kidney IRI should be explored further.

Diseases Caused by Sepsis

Sepsis, which is accompanied by a large number of organ failures and excessive inflammatory reactions, has complex pathophysiological features, and it is not easy to develop a therapeutic agent that can effectively treat all symptoms. Sepsis is initiated through the strong activation of the innate immune system and is mediated by the activation of the pattern recognition receptor (PRR) by pathogens, leading to activation of the complement system, coagulation system and vascular endothelium and thus the difficulty to normal homeostasis.

As shown in the examples herein, the effect of Exo-srIκB was capable of resolving the inflammatory response and reducing organ damage through inhibition of NF-κB activity in a sepsis mouse model. srIκB is a non-degradable form of IκBα that prevents NF-κB from entering the nucleus and acting as a transcription factor. For example, in order to generate an immunosuppressive exosome loaded with srIκB, a recent technology capable of mounting a functional protein on an exosome was utilized. By delivering Exo-srIκB to the whole body in a sepsis mouse model (e.g., systemic delivery), the examples herein confirmed that exosomes are delivered to neutrophils and macrophages, which are key players of the sepsis inflammatory response. In addition, in both mouse sepsis models of the present examples, Exo-srIκB treatment significantly reduced pro-inflammatory markers such as TNF-α, IL-1β and IL-6, but did not decrease the anti-inflammatory cytokine IL-10. Even when exosomes were injected 1 hour after LPS injection, a significant therapeutic effect of Exo-srIκB was observed. Thus, the treatment with Exo-srIκB may also be applied to the early stages of sepsis before the transition to an immune suppression state.

Pro-inflammatory cytokines may play an important role in acute kidney injury (AKI) induced by sepsis. In the mouse model with AKI caused by CLP surgery or LPS injection in the examples herein, as a result of histopathological examination, it was confirmed that the glomerular structure was destroyed, renal tubular epithelial cells were degenerated, and severe intracellular edema and congestion occurred in the renal tubules in the sepsis-induced group. However, Exo-srIκB administration reduced the severity of lesions, kidney damage, and invasion of inflammatory cells.

Tissue infiltration of neutrophils may be a major process in sepsis. For example, in some studies targeting specific adhesion molecules to deplete neutrophils and inhibit recruitment of neutrophils can reduce tissue damage in sepsis It has been reported that it can be protected. TNF-α and IL-1β are major mediators for the expression of chemokines such as MCP-1 and IL-8, which are important chemoattractants for neutrophils and monocytes/macrophages during the inflammatory response. These chemokines initiate local invasion of monocytes/macrophages after activation. However, in HUVECs, Exo-srIκB was shown to attenuate the release of LPS-induced MCP-1 and IL-8, thereby inhibiting monocyte/macrophage invasion. These data are consistent with results obtained from in vivo studies herein. In the present examples, Exo-srIκB treatment significantly reduced neutrophil infiltration in the spleen, kidney, lung and liver of the sepsis animal model. Considering the important role of neutrophils in the pathophysiology of sepsis, the tissue protective effect of Exo-srIκB may be related to at least a reduction in invasion of neutrophils in the kidney.

In some embodiments, the spleen shows higher levels of neutrophils compared to other organs such as kidney and liver. Pro-inflammatory cytokines may occur in the spleen and affect other organs. Most of the genes encoding pro-inflammatory cytokines may be under the control of NF-κB, one of the important transcription factors in the septic inflammatory response caused by LPS. Expression of the NF-κB response reporter protein according to the presence or absence of Exo-srIκB treatment was investigated in the examples herein, and the translocation of p65 was confirmed. Exo-srIκB inhibited NF-κB signal activation by blocking nuclear translocation of the NF-κB subunit p65.

In some embodiments, exosomes may be used as a mechanism for therapeutic delivery of immunosuppressive proteins in a sepsis mouse model. Exosomes may be excellent carriers capable of delivering srIκB into cells, providing a new option for the treatment of sepsis. A method of directly delivering an immunosuppressive protein into a target cell in vivo has not been established before, but Exo-srIκB according to the present disclosure acts as an inhibitor of NF-κB, thereby inhibiting the expression of inflammation-related genes and directly inflammatory response. The examples herein shows it can be suppressed, thereby alleviating the pro-inflammatory cytokine storm of sepsis and the resulting organ damage.

Recent studies in animal models of sepsis induced either by lipopolysaccharide (LPS; endotoxin model) or cecal ligation and puncture (CLP, polymicrobial model) have demonstrated that NF-κB inhibitors with diverse chemical properties and mechanisms of action protect animals from septic lethality. Although more than 700 inhibitors of NF-κB have been reported, no NF-κB blocker has been approved for human use to date. Various steroids and non-steroid anti-inflammatory drugs have been found to block NF-κB, but their effects are highly pleiotropic and lack specificity. Novel therapeutic strategies aimed at specific inhibition of key elements in the NF-κB activation pathway have been under development in recent years, and expectations are high regarding their potential efficacy as sepsis treatments and treatments for one or more diseases caused by sepsis. Genetic constructs expressing an engineered IκBα protein without sites for phosphorylation, super-repressor IκB (srIκB), have also been used. IκBα mutation at specific phosphorylation sites (Ser32 and Ser36 replaced to Ala) results in a dominant active form of IκBα with a prolonged half-life. These srIκBs lead to a stable cytoplasmic pool of IκBα, thereby preventing nuclear NF-κB activation.

Here, exosomes were utilized as a therapeutic conveyor to deliver srIκB to a therapeutic target. Exosomes have been recognized as potent therapeutic vehicles for transferring various proteins and regulatory genes to target cells. They function as non-immunogenic nanovesicles, and can protect their cargo from serum proteases and immune responses. Loading of soluble proteins into exosomes has been enabled by a technology called EXPLOR, which exploits the natural exosome biogenesis process and reversible protein-protein interactions controlled by optogenetics. To load specific target proteins into exosomes, a HEK293T cell line was generated that stably expresses two recombinant proteins, CIBN-EGFP-CD9 and srIκB-mCherry-CRY2 (FIG. 1A). Consistent with previous studies, EXPLOR technology was used to produce srIκB-loaded exosomes. The srIκB loading exosomes were designated as Exo-srIκB, and exosomes generated from intact HEK293T cells as Exo-Naïve. By applying Exo-srIκB to sepsis models for therapeutic purposes, sepsis-induced organ injury was ameliorated and inhibited the secretion of pro-inflammatory cytokines, thereby improving the overall survival of sepsis patients.

The present disclosures provides for methods for treating a disease caused by sepsis in a subject in need thereof, comprising: administering an effective amount of a composition comprising an exosome comprising an NF-κB inhibitor to the subject.

In embodiments, the disease is selected from the group consisting of pneumonia, cytokine storm syndrome, respiratory distress syndrome, and organ failure but not limited thereto. In some embodiments, the disease is pneumonia. In some embodiments, the disease is cytokine storm syndrome. In some embodiments, the disease is respiratory distress syndrome. In some embodiments, the disease is organ failure.

In embodiments, the NF-κB inhibitor is selected from the group consisting of a NF-κB inhibitory protein, its fragment, and a mixture thereof. In embodiments, the NF-κB inhibitor is selected from the group consisting of super-repressor (SR)-IκB (srIκB), IκB-α, IκB-β, IκB-ε, BCL-3, a mutant thereof, and a mixture thereof. In embodiments, the NF-κB inhibitor is super-repressor (SR)-IκB (srIκB).

In embodiments, the composition is administered via oral, transdermal, intraperitoneal, intravenous, intramuscular, subcutaneous, or mixed routes. In some embodiments, the composition is administered via oral routes. In some embodiments, the composition is administered via transdermal routes. In some embodiments, the composition is administered via intraperitoneal routes. In some embodiments, the composition is administered via intravenous routes. In some embodiments, the composition is administered via intramuscular routes. In some embodiments, the composition is administered via subcutaneous routes. In some embodiments, the composition is administered via mixed routes.

In embodiments, the method further comprises administering an anti-inflammatory agent to the subject.

In embodiments, the exosome comprising a NF-κB inhibitor further comprises a photo-specific binding protein. In some embodiments, the NF-κB inhibitor comprises an amino acid sequence having at least 85% sequence identity to SEQ ID NO:1 or SEQ ID NO:2. In some embodiments, the NF-κB inhibitor comprises an amino acid sequence having at least 85% sequence identity to SEQ ID NO:1. In some embodiments, the NF-κB inhibitor comprises an amino acid sequence having at least 86% sequence identity to SEQ ID NO:1. In some embodiments, the NF-κB inhibitor comprises an amino acid sequence having at least 87% sequence identity to SEQ ID NO:1. In some embodiments, the NF-κB inhibitor comprises an amino acid sequence having at least 88% sequence identity to SEQ ID NO:1. In some embodiments, the NF-κB inhibitor comprises an amino acid sequence having at least 89% sequence identity to SEQ ID NO:1. In some embodiments, the NF-κB inhibitor comprises an amino acid sequence having at least 90% sequence identity to SEQ ID NO:1. In some embodiments, the NF-κB inhibitor comprises an amino acid sequence having at least 91% sequence identity to SEQ ID NO:1. In some embodiments, the NF-κB inhibitor comprises an amino acid sequence having at least 92% sequence identity to SEQ ID NO:1. In some embodiments, the NF-κB inhibitor comprises an amino acid sequence having at least 93% sequence identity to SEQ ID NO:1. In some embodiments, the NF-κB inhibitor comprises an amino acid sequence having at least 94% sequence identity to SEQ ID NO:1. In some embodiments, the NF-κB inhibitor comprises an amino acid sequence having at least 95% sequence identity to SEQ ID NO:1. In some embodiments, the NF-κB inhibitor comprises an amino acid sequence having at least 96% sequence identity to SEQ ID NO:1. In some embodiments, the NF-κB inhibitor comprises an amino acid sequence having at least 97% sequence identity to SEQ ID NO:1. In some embodiments, the NF-κB inhibitor comprises an amino acid sequence having at least 98% sequence identity to SEQ ID NO:1. In some embodiments, the NF-κB inhibitor comprises an amino acid sequence having at least 99% sequence identity to SEQ ID NO:1. In some embodiments, the NF-κB inhibitor is represented by SEQ ID NO: 1.

In some embodiments, the NF-κB inhibitor comprises an amino acid sequence having at least 85% sequence identity to SEQ ID NO:2. In some embodiments, the NF-κB inhibitor comprises an amino acid sequence having at least 86% sequence identity to SEQ ID NO:2. In some embodiments, the NF-κB inhibitor comprises an amino acid sequence having at least 87% sequence identity to SEQ ID NO:2. In some embodiments, the NF-κB inhibitor comprises an amino acid sequence having at least 88% sequence identity to SEQ ID NO:2. In some embodiments, the NF-κB inhibitor comprises an amino acid sequence having at least 89% sequence identity to SEQ ID NO:2. In some embodiments, the NF-κB inhibitor comprises an amino acid sequence having at least 90% sequence identity to SEQ ID NO:2. In some embodiments, the NF-κB inhibitor comprises an amino acid sequence having at least 91% sequence identity to SEQ ID NO:2. In some embodiments, the NF-κB inhibitor comprises an amino acid sequence having at least 92% sequence identity to SEQ ID NO:2. In some embodiments, the NF-κB inhibitor comprises an amino acid sequence having at least 93% sequence identity to SEQ ID NO:2. In some embodiments, the NF-κB inhibitor comprises an amino acid sequence having at least 94% sequence identity to SEQ ID NO:2. In some embodiments, the NF-κB inhibitor comprises an amino acid sequence having at least 95% sequence identity to SEQ ID NO:2. In some embodiments, the NF-κB inhibitor comprises an amino acid sequence having at least 96% sequence identity to SEQ ID NO:2. In some embodiments, the NF-κB inhibitor comprises an amino acid sequence having at least 97% sequence identity to SEQ ID NO:2. In some embodiments, the NF-κB inhibitor comprises an amino acid sequence having at least 98% sequence identity to SEQ ID NO:2. In some embodiments, the NF-κB inhibitor comprises an amino acid sequence having at least 99% sequence identity to SEQ ID NO:2. In embodiments, the NF-κB inhibitor is represented by SEQ ID NO: 1. In some embodiments, the NF-κB inhibitor is represented by SEQ ID NO: 2.

In some embodiments, the photo-specific binding protein is a first photo-specific binding protein and/or a second photo-specific binding protein. In embodiments, the first photo-specific binding protein is conjugated to an exosome specific marker to form fusion protein I; and the second photo-specific binding protein is conjugated to the NF-κB inhibitor to form fusion protein II. In embodiments, the fusion protein I and the fusion protein II are linked reversibly through the first photo-specific binding protein and the second photo-specific binding protein. In embodiments, the first photo-specific binding protein is conjugated to an exosome specific marker to be located in the direction toward inside of the exosome.

In some embodiments, the first photo-specific binding protein and the second photo-specific binding protein are selected from the group consisting of CIB, CIBN, PhyB, PIF, FKF1, GIGANTEA, CRY and PHR. In embodiments, the first photo-specific binding protein is CIB and the second photo-specific binding protein is CRY. In some embodiments, the first photo-specific binding protein is CIBN and the second photo-specific binding protein is CRY. In some embodiments, the first photo-specific binding protein is CIB and the second photo-specific binding protein is PHR. In some embodiments, the first photo-specific binding protein is CIBN and the second photo-specific binding protein is PHR.

In some embodiments, the first photo-specific binding protein is CRY or PHR and the second photo-specific binding protein is CIB or CIBN. In some embodiments, the first photo-specific binding protein is CRY and the second photo-specific binding protein is CIB. In some embodiments, the first photo-specific binding protein is CRY and the second photo-specific binding protein is CIBN. In some embodiments, the first photo-specific binding protein is PHR and the second photo-specific binding protein is CIB. In some embodiments, the first photo-specific binding protein is PHR and the second photo-specific binding protein is CIBN.

In some embodiments, the first photo-specific binding protein is PhyB and the second photo-specific binding protein is PIF. In embodiments, the first photo-specific binding protein is PIF and the second photo-specific binding protein is PhyB.

In some embodiments, the first photo-specific binding protein is GIGANTEA and the second photo-specific binding protein is FKF1. In embodiments, the first photo-specific binding protein is FKF1 and the second photo-specific binding protein is GIGANTEA.

In some embodiments, the exosome specific marker is selected from the group consisting of CD9, CD63, CD81 and CD82. In some embodiments, the exosome specific marker is CD9. In some embodiments, the exosome specific marker is CD63. In some embodiments, the exosome specific marker is CD81. In some embodiments, the exosome specific marker is CD82.

In some embodiments, the exosome has a diameter of between about 50 nm and about 200 nm. In some embodiments, the exosome has a diameter of between about 50 nm and about 75 nm. In some embodiments, the exosome has a diameter of between about 75 nm and about 100 nm. In some embodiments, the exosome has a diameter of between about 100 nm and about 125 nm. In some embodiments, the exosome has a diameter of between about 125 nm and about 150 nm. In some embodiments, the exosome has a diameter of between about 150 nm and about 175 nm. In some embodiments, the exosome has a diameter of between about 175 nm and about 200 nm. In embodiments, the exosome has a diameter of between about 50 nm and about 150 nm. In some embodiments, the exosome has a diameter of about 50, 55, 60, 65, 70, 75, 80, 85, 90, 95, 100, 105, 110, 115, 120, 125, 130, 135, 140, 145, 150 or more and/or of about 75, 80, 85, 90, 95, 100, 105, 110, 115, 120, 125, 130, 135, 140, 145, 150, 155, 160, 165, 170, 175, 180, 185, 190, 195, 200 or less.

In some embodiments, the composition is a pharmaceutical composition further comprising a physiologically acceptable carrier or carriers.

Viral Respiratory Diseases

In one aspect, the present disclosure relates to treating viral respiratory diseases using exosomes loaded with super-repressor IκBα (srIκB), which is an NF-kB inhibitory protein.

srIκB may be a non-degradable form of IκBα that prevents NF-κB from entering the nucleus and acting as a transcription factor. In order to generate an immunosuppressive exosome loaded with srIκB, a recent technology capable of mounting a functional protein on an exosome may be utilized.

Exosomes with srIκB, among various NF-κB inhibitors, may suppress mechanisms associated with respiratory diseases, such as pneumonia and acute respiratory distress syndrome, induced by infection with respiratory viruses including coronavirus, cytokine storm syndrome, and organ damage including excessive inflammatory reactions, thereby alleviating symptoms caused by viral infection, improving patient survival, improving various viral respiratory diseases induced by respiratory viral infections including coronavirus, and organ failure such as sepsis and kidney damage, and exerting therapeutic and preventive effects for acute renal injury and lung injury.

In the present disclosure, use of srIκB in diseases induced by virus including coronavirus, such as acute pneumonia, acute respiratory distress syndrome, sepsis, cytokine storms, organ damage caused by excessive inflammatory reactions, and diseases caused by excessive immune responses, is described, and exosomes are used as a therapeutic conveyor to efficiently deliver it into cells. Exosomes without a target protein generated from a cell line is herein called, Exo-Naïve, and an exosome loaded with a therapeutic target protein srIκB as Exo-srIκB, respectively. By applying Exo-srIκB to infectious disease animal models and respiratory virus coronavirus and influenza virus infection models, Exo-srIκB may treat various organ damage and immune hyperactivity including ARDS induced by viral respiratory disease, sepsis or respiratory viruses, and improve the survival rate of patients infected with respiratory viruses including coronavirus by suppressing the secretion of pro-inflammatory cytokines.

In Examples herein, specifically in damaged kidneys, the delivery of Exo-srIκB showed significantly lower levels of serum BUN and creatinine compared to the control group, showing a therapeutic effect on AKI (Acute Kidney Injury). Exo-srIκB pretreatment also showed significant results in the aspect of preventing the disease. In addition, the protective mechanism of Exo-srIκB may be derived from decreased NF-κB signaling in the kidney, which affects gene expression of pro-inflammatory cytokines/chemokines. Exo-srIκB may also significantly affect the renal immune cell population without affecting the splenic immune cell population, thereby significantly reducing the frequency of multiple lineage immune cells.

In addition, after inducing inflammation from infections such as LPS, coronavirus, and flu virus used in sepsis and acute kidney injury animal models, Exo-Naïve and Exo-srIκB may be administered, the changes in inflammation and damage in the lung tissue and the invasion of the immune cell population into the lung tissue were compared, and srIκB may suppress the secretion of substances that regulate immune activity in immune cells so that the effect of srIκB in lung damage, such as pneumonia and acute respiratory distress syndrome (ARDS), which are the main causes of death among organ damage induced by respiratory viral infections including coronavirus is confirmed.

In the present disclosure, exosomes may be used as a mechanism for therapeutic delivery of immunosuppressive proteins in an infected mouse model. Exosomes are excellent carriers capable of delivering srIκB into cells, providing a new option for the treatment of viral respiratory diseases including coronavirus. A method of directly delivering an immunosuppressive protein into a target cell in vivo has not been established before, but Exo-srIκB according to the present disclosure acts as an inhibitor of NF-κB, thereby inhibiting the expression of inflammation-related genes and directing the inflammatory response. It may also alleviate viral respiratory diseases and excessive inflammatory reactions induced by respiratory viruses and inflammatory cytokine storms and subsequent organ damage.

In some embodiments, the NF-κB inhibitor and srIκB include those described above. In some embodiments, the exosome used herein is described above. In a certain embodiment of the present disclosure, the exosome further comprises a photo-specific binding protein as described above.

In some embodiments, the srIκB may be conjugated or bound to an exosome-specific marker. This is to bind the cargo protein srIκB with an exosome-specific marker so that a large amount of the cargo protein can be loaded onto the exosome. The cargo protein and the exosome-specific marker may be bonded through various linkers capable of linking between polypeptides.

In some embodiments, the exosome-specific marker may be characterized in that CD9, CD37, CD53, CD63, CD81 or CD82, but is not limited thereto. In additional embodiments, the exosome-specific marker may be characterized in that a target peptide is conjugated or bound to the extracellular portion thereof, and the exosome into which the target peptide is introduced has the advantage of increasing targeting efficiency to a target organ or cell.

In some embodiments, the exosome-specific marker may be a CD9 protein, and a target peptide may be inserted between amino acids located at the 170th and 171th from the N-terminus of the CD9 protein. The target peptide may be inserted into an exosome-specific marker without any other linker, and may be bonded through various linkers capable of linking the polypeptides.

In some embodiments, the CD9 protein comprises the following amino acid sequence of SEQ ID NO: 4:

```
                                                     (SEQ ID NO: 4)
Met Pro Val Lys Gly Gly Thr Lys Cys Ile Lys Tyr Leu Leu Phe Gly
 1               5                  10                  15

Phe Asn Phe Ile Phe Trp Leu Ala Gly Ile Ala Val Leu Ala Ile Gly
                20                  25                  30

Leu Trp Leu Arg Phe Asp Ser Gln Thr Lys Ser Ile Phe Glu Gln Glu
            35                  40                  45

Thr Asn Asn Asn Asn Ser Ser Phe Tyr Thr Gly Val Tyr Ile Leu Ile
        50                  55                      60

Gly Ala Gly Ala Leu Met Met Leu Val Gly Phe Leu Gly Cys Cys Gly
65                      70                  75                  80

Ala Val Gln Glu Ser Gln Cys Met Leu Gly Leu Phe Phe Gly Phe Leu
                    85                  90                      95

Leu Val Ile Phe Ala Ile Glu Ile Ala Ala Ala Ile Trp Gly Tyr Ser
                100                 105                 110

His Lys Asp Glu Val Ile Lys Glu Val Gln Glu Phe Tyr Lys Asp Thr
            115                 120                 125

Tyr Asn Lys Leu Lys Thr Lys Asp Glu Pro Gln Arg Glu Thr Leu Lys
        130                 135                 140

Ala Ile His Tyr Ala Leu Asn Cys Cys Gly Leu Ala Gly Gly Val Glu
145                 150                 155                 160

Gln Phe Ile Ser Asp Ile Cys Pro Lys Lys Asp Val Leu Glu Thr Phe
```

```
                                -continued
                 165                  170                 175
Thr Val Lys Ser Cys Pro Asp Ala Ile Lys Glu Val Phe Asp Asn Lys
            180                  185                 190

Phe His Ile Ile Gly Ala Val Gly Ile Gly Ile Ala Val Val Met Ile
        195                 200                 205

Phe Gly Met Ile Phe Ser Met Ile Leu Cys Cys Ala Ile Arg Arg Asn
    210                 215                 220

Arg Glu Met Val.
225
```

In some embodiments, the exosome may comprise an exosome-specific marker fused with the first binding protein and a cargo protein (srIκB) conjugated to a second binding protein capable of being fused to the first binding protein.

In some embodiments, the first binding protein may be fused with an exosome-specific marker so as to be positioned in the inner direction of the exosome. Such a configuration helps loading a cargo protein (i.e., srIκB) in an exosome by combining a first binding protein and a second binding protein.

In some embodiments, the first binding protein may be any combination of proteins that can reversibly bind to a second binding protein according to changes in external conditions, without limitation, preferably the first binding protein and the second binding protein being photo-specific binding proteins.

In some embodiments, the first binding protein and the second binding protein may be selected from the group consisting of CIB, CIBN, PhyB, PIF, FKF1, GIGANTEA, CRY and PHR, but are not limited thereto. In additional embodiments, the first binding protein may be CIB or CIBN, and the second binding protein may be CRY or PHR, or vice versa. In additional embodiments, the first binding protein may be PhyB, and the second binding protein may be PIF or vice versa. In additional embodiments, the first binding protein may be GIGANTEA, and the second binding protein may be FKF1 or vice versa.

The method for preparing an exosome according to the present invention may utilize various conventionally known methods for preparing an exosome. For example, Korean Patent Publication 10-2016-0126335, Korean Patent Publication 10-2016-0126921, Korean Patent Publication 10-2016-0126961, Korean Patent Publication 10-2016-0127486, Korean Patent Publication 10-2016-0132616, Republic of Korea. The method for preparing exosomes described in Korean Patent Application Publication No. 10-2018-0096232 is also incorporated herein as part of the present application.

The term "exosome" of the present disclosure refers to small vesicles having a plasma membrane structure that originate from a specific compartment within a cell called multivesicular bodies (MVBs) and are released or secreted out of the cell. In some embodiments, the exosome may serve as a carrier for transporting the cargo protein to the target cells or tissues of the cargo protein, including the cargo protein inside, and the cargo protein carried by the exosome may be used to treat or diagnose sepsis and/or kidney disease by acting on target cells or tissues.

In some embodiments, the exosome-specific marker may be a protein abundantly present in the membrane of an exosome. In additional embodiments, the exosome-specific marker may be tetraspanin. Tetraspanin is a membrane protein that passes through the cell membrane four times, and may be a protein that exists on the cell membrane and exchanges information between cells and controls cell proliferation. Specifically, the tetraspanin may be any one or more proteins selected from the group consisting of CD9, CD37, CD53, CD63, CD81, and CD82. In one embodiment of the present invention, the tetraspanin may be a CD9 protein.

In the present disclosure, the "target peptide" is a peptide capable of delivering a substance to a specific site in vivo, and is expressed on the surface of an exosome to allow the exosome to move to a specific tissue. That is, the target peptide according to the present invention can be used as long as it is known to move to a specific tissue. In some embodiments, the target peptide may be an engiopeptin-2, apo B, apo E, a VCAM-1 internalization sequence, or a transverse striated muscle target. In some embodiments, the target peptide may be inserted between amino acids located at the 170th and 171th positions from the N-terminus of the CD9 protein having the amino acid sequence of SEQ ID NO: 4.

In some embodiments, various protein types, including the cargo protein (srIκB) and other fusion proteins, can be expressed in cells by introducing a gene encoding the same into an expression vector.

In some embodiments, the exosome may be produced using any one or more cells selected from the group consisting of B-lymphocytes, T-lymphocytes, dendritic cells, giant nuclear cells, macrophages, stem cells, and tumor cells. In additional embodiments, the exosome producing cells may be HEK cells.

The term "cargo protein" herein may be a protein expressed in a form fused with the second light-specific binding protein so as to be mounted on the exosome, and srIκB may include an active ingredient.

In some embodiments, the exosome may include a first fusion protein in which a first binding protein is bound to an exosome-specific marker and a second fusion protein in which a second binding protein capable of binding to the first binding protein is bound to a cargo protein.

The term "first fusion protein" means a fusion protein in which the exosome-specific marker and the first binding protein are bound, and preferably, the first binding protein is a photospecific binding protein.

Photospecific binding protein may be a light-induced heterodimer-forming protein or a light-induced homodimer-forming protein. It may be a protein capable of forming or a protein capable of forming a homodimer by combining with other proteins of the same type.

In some embodiments, the photospecific binding protein is not particularly limited thereto, but as an example, it may be a light-induced heterodimer-forming protein, and as another example, CIB (cryptochrome-interacting basic-helix-loop-helix protein), CIBN (N-terminal domain of CIB), PhyB (phytochrome B), PIF (phytochrome interacting factor), FKF1 (Flavinbinding, Kelch repeat, F-box 1), GIGANTEA, CRY (chryptochrome), PHR (phytolyasehomolgous region), etc.

In additional embodiments, when forming a heterodimer, two photospecific binding proteins (a first photospecific binding protein and a second photospecific binding protein) may be used, wherein the first photospecific binding protein is CIB or CIBN, the second photospecific binding protein for this may be CRY or PHR, and when the first photospecific binding protein is PhyB, the second photospecific binding protein may be PIF. In addition, when the first photospecific binding protein is GIGANEA, the second photospecific binding protein may be FKF1.

In some embodiments, CIBN may be used as the first photospecific binding protein, and CRY2 may be used as the second photospecific binding protein, and the wavelength of the used light is set to 460 to 490 nm representing blue light And, the light intensity may be set to 20 to 50 μW.

In some embodiments, the order of arrangement of the exosome-specific marker and the first binding protein included in the first fusion protein is the first binding of the first fusion protein in the exosome-producing cell to the inside of the exosome. As long as the protein can be expressed so as to be located, it is not particularly limited thereto, but as an example, it may be configured in a form in which the N-terminus of the first binding protein is bound to the C-terminus of the exosome-specific marker.

In additional embodiments, the exosome-specific marker constituting the first fusion protein and the first binding protein may be directly connected to each other or may be connected through a linker. The linker is not particularly limited as long as the first fusion protein can be expressed so that the first binding protein is located in the exosome in an exosome producing cell, but a peptide linker composed of amino acids may be used, and preferably, a flexible peptide linker may be used. The peptide linker may be expressed by operatively linking the nucleic acid encoding the linker in an expression vector by linking the nucleic acid encoding each domain in frame.

The term "second fusion protein" refers to a fusion protein in which the second binding protein and the cargo protein are bound, and preferably, the first binding protein may be a photospecific binding protein, have.

In some embodiments, the order of arrangement of the second binding protein and the cargo protein included in the second fusion protein is that the second fusion protein is a first binding protein site of the first fusion protein in an exosome-producing cell. As long as it binds to and can be located inside the exosome, it is not particularly limited thereto, but as an example, the N-terminus of the cargo protein may be combined with the C-terminus of the second binding protein.

In additional embodiments, the second binding protein and the cargo protein constituting the second fusion protein may be directly connected to each other or may be connected through a linker. The linker is not particularly limited as long as the second fusion protein can be located inside the exosome by binding to the first binding protein site of the first fusion protein in the exosome producing cell, but a peptide linker composed of amino acids may be used. It may be, more preferably, a flexible peptide linker may be used. The peptide linker may be expressed by operatively linking the nucleic acid encoding the linker in an expression vector by linking the nucleic acid encoding each domain in frame.

In additional embodiments, each of the fusion proteins may include a polypeptide having a sequence different from the wild-type amino acid sequence of each domain contained therein and at least one amino acid residue. Amino acid exchanges in proteins and polypeptides that do not totally alter the activity of the molecule are known in the art. The most commonly occurring exchanges are amino acid residues Ala/Ser, Val/Ile, Asp/Glu, Thr/Ser, Ala/Gly, Ala/Thr, Ser/Asn, Ala/Val, Ser/Gly, Thy/Phe, Ala/It is an exchange between Pro, Lys/Arg, Asp/Asn, Leu/Ile, Leu/Val, Ala/Glu, Asp/Gly. In addition, it may include a protein whose structural stability to heat, pH, etc. of the protein is increased or protein activity is increased due to a mutation or modification in an amino acid sequence.

The fusion protein or the polypeptide of each domain constituting the fusion protein may be prepared by a chemical peptide synthesis method known in the art, or a gene encoding the domain is amplified by PCR (polymerase chain reaction), or known After synthesis by the method, it can be produced by cloning and expressing it in an expression vector.

In some embodiments, various fusion proteins may be expressed in the exosome-producing cells by introducing a polynucleotide encoding them into an exosome-producing cell, and the polynucleotide is introduced into the exosome-producing cells. As a method, a method known to those skilled in the art may be used, for example, a method of introducing using an expression vector may be used.

The term "expression vector" refers to a recombinant vector capable of expressing a peptide or protein of interest in a host cell of interest, and refers to a gene construct comprising an essential regulatory element operably linked to express a gene insert do. The expression vector includes expression control elements such as a start codon, a stop codon, a promoter, and an operator, and the start and stop codons are generally considered to be part of the nucleotide sequence encoding the polypeptide, and when the gene construct is administered, the individual Must show an action in and must be in frame with the coding sequence. The promoter of the vector can be constitutive or inducible.

The term "operably linked" refers to a state in which a nucleic acid expression control sequence and a nucleic acid sequence encoding a protein or RNA of interest are functionally linked to perform a general function, it means. For example, a promoter and a nucleic acid sequence encoding a protein or RNA may be operably linked to affect the expression of the coding sequence. Operable linkage with the expression vector may be prepared using gene recombination techniques well known in the art, and site-specific DNA cleavage and linkage may use enzymes generally known in the art.

In additional embodiments, the expression vector may further include a selection marker. The selection marker is a marker for selection of a transformed microorganism or a recombinant vector, and may be used to impart a selectable phenotype such as drug resistance, auxotrophic resistance, resistance to cytotoxic agents, or expression of surface proteins. When a vector containing a selection marker is used, only cells expressing the selection marker survive in an environment treated with the selection agent, and thus transformed cells can be selected. Antibiotic resistance genes, specifically kanamycin, can be used as the selection marker, but any selection marker that can be used in the art can be used.

In the examples herein, the effect of improving acute kidney damage according to the administration of Exo-srIκB was confirmed, and in addition, the effect of improving the inflammation of Exo-srIκB in an animal lung injury model was tested in a lung tissue, through comparison of the expression of immune-related genes in tissues and blood, activation of NF-κB p65, and changes in immune cell populations in damaged and improved lungs through flow cytometric analysis were confirmed. In addition, it was confirmed that in vivo delivery of Exo-srIκB (particularly, delivery to lung tissue) affects the immune cell population of the lung in a lung injury model.

The present disclosure also relates to a pharmaceutical composition for the prevention or treatment of diseases induced by respiratory virus infection, including the coronavirus containing the exosome as an active ingredient in another aspect. In some embodiments, the composition for the treatment of viral respiratory diseases may relieve inflammation due to respiratory viral infection, alleviates acute organ damage including lungs and kidneys, and/or reduces mortality. In some embodiments, diseases induced by respiratory viral infection including the coronavirus are pneumonia, respiratory distress syndrome, cytokine storm syndrome and sepsis, organ failure including kidney damage due to excessive immune response due to viral infection.

The present disclosure also relates to a combination for the prevention or treatment of organ damage including organ damage induced by respiratory viral infection including coronavirus and having a mechanism similar thereto from another point of view, and also to co-administration of exosomes containing srIκB, which is an NF-kB inhibitory protein, and antibiotics, which are currently standard care in clinical practice for the disease. The present disclosure relates to a combination agent containing an exosome containing srIκB as a first component and an antibiotic as a second component.

In some embodiments, the antibiotic comprises a penicillin-based antibiotic, a cephalosporins-based antibiotic, a macrolide-based antibiotic, a lincosamide-based antibiotic, carbapenem (carbapenem) antibiotics, glycopeptide antibiotics, aminoglycoside antibiotics, tetracycline antibiotics, nitroimidazole, or a combination of two or more of these, It is not limited thereto. Pulnicillin antibiotics include, for example, penicillin G, penicillin V, ampicillin, amoxicillin, or piperacillin, and cephalosporin antibiotics are cefazolin, cefazolin Cefuroxime, cefotetan, cefmetazole, cefotaxime, ceftizoxime, ceftriaxone, ceftazidime, cefoperazone (CPZ), Cefpirome, cefepime, cephhalexin, ceprazine, cefadroxil, cefaclor, cefprozil, loracarbef, Cefpodoxime or cefixime, and macrolide antibiotics include, for example, erythromycin, clarithromycin, tylosin, and tylosin, josamycin) or leucomycin, and lincosamide antibiotics, for example, lincomycin or clindamycin, carbapenem antibiotics, for example, imipenem), meropenem, doripenem, or ertapenem, and glycopeptide antibiotics include, for example, tycoplanin, and aminoglycosides. Antibiotics include, for example, gentamicin, tobramycin, or amikacin, and tetracycline-based antibiotics include, for example, tetracycline, demeclocycline, and meta. Cyclin (methacyclin) e), doxycycline or minocycline, but is not limited thereto. In additional embodiments, the penicillin antibiotic may further include a β-lactamase inhibitor (β-lactamase inhibitor).

In some embodiments, the exosome component and the antibiotic component may be administered simultaneously, separately, or sequentially, but is not limited thereto.

The term "prevention" herein relates to averting, delaying, impeding, or hindering to reduce disease. The term "treatment" herein relates to caring for a subject suffering from a disease to ameliorate, cure or reduce the symptoms of a disease or to reduce or stop the progression of the disease.

EXPLOR® Technology

Recently, exosomes received significant attention as novel bio-carriers for gene/drug delivery. Exosomes are extracellular vesicles (EVs) that play an important role in cell-to-cell communication, by transferring bioactive materials to recipient cells or affecting signaling pathways of target cells. Exosomes are easier to store and exhibit greater stability. Exosomes have a high capacity to overcome biological barriers, and can carry surface molecules targeting specific cell types, thus causing fewer off-target effects. However, in the clinical application of exosomes, it was a significant challenge to obtain high amounts of pure exosomes and load soluble proteins into exosomes. Using "exosomes for protein loading via optically reversible protein-protein interactions" (EXPLOR), a novel, optogenetically engineered exosome technology developed by Yim et al., significant advancements in the production efficiency and biological compatibility of exosomes were achieved. This EXPLOR technology has been recently adopted in the experimental sepsis model by Choi et al.; they delivered exosomes containing the super-repressor IκB (srIκB) to mice. This was a non-degradable form of inhibitor of kappa B (IκB) that prevented the nuclear translocation of NF-κB. Their study showed that treatment with Exo-srIκB ameliorated the systemic pro-inflammatory response and subsequent organ dysfunction in the mouse sepsis model.

EXAMPLES

Animals: Male C57BL/6J mice were bred under specific pathogen-free conditions at the central animal facility of the Yonsei Medical Center. 6-7-week-old male mice were used for all experiments. Additionally, C56BL/6, C57BL/6N, BALB/c mouse were purchased from Orientbio (Seong-Nam, Republic of Korea). LysM$^{GFP/+}$ mice intrinsically expressing GFP in neutrophils and macrophages were generously provided by Dr. M. Kim (University of Rochester, Rochester, NY, USA).

Exosome isolation: The HEK293T cell line, which expresses two recombinant proteins, CIBN-EGFP-CD9 and srIκB-mCherry-CRY2, were used to produce srIκB-loaded exosomes. Intact HEK293T cells were used for producing Exo-Naïve. Stable cells were seeded into T175 flasks for 24 h at 37° C. After removing the medium, cells were washed and resuspended with exosome-depleted medium. Cells were then exposed to continuous blue light illumination from a 460-nm light emitting diode in a $CO_2$ incubator. After 72 h, cell culture supernatants were harvested and centrifuged, to remove cells and debris, and filtered through a 0.22-pm polyether sulfone filter; exosomes were isolated using a combination of tangential flow filtration and size-exclusion chromatography. In some examples, to produce Exo-srIκB, the stable cells were seeded into T175 flasks. After 1 day, the medium was carefully removed, the cells were rinsed with PBS, and exosome-depleted medium was added. Then, the cells were exposed to continuous blue light illumination from a 460-nm light emitting diode in a $CO_2$ incubator. After 72 h, the cell culture supernatant was harvested and centrifuged at 1,000 g for 15 min to remove cells and cell debris, and then filtered through a 0.22-um polyethersulfone (PES) filter to remove large particles. The exosomes were isolated using molecular weight cutoff (MWCO)-based membrane filtration. The isolated exosomes were purified through SEC.

Transmission Electron Microscopy: To observe the morphology of EVs via TEM, 5 1 of EVs were absorbed to carbon-coated copper grids (Electron Microscopy Sciences, Hatfield, PA) for 15 s. After removing excess liquids, samples were negatively stained with 2% uranyl acetate (Electron Microscopy Sciences). TEM images were obtained using a Tecnai G2 Retrofit electron microscope (FEI company, Hillsboro, OR) operating at 200 kV. Extracellular vesicles (EVs) were evaluated morphologically through negative staining. First, 5 µl of EV suspended in PBS was loaded onto glow-discharged carbon-coated copper grids (Electron Microscopy Sciences, Hatfield, PA, USA). After sample adsorption for 3-5 s, the grid was blotted with filter paper and stained with 2% uranyl acetate (UA). Next, samples were dried for 20 s using a dryer. EVs were viewed with Tecnai G2 Retrofit (FEI Company, Hillsboro, OR, USA) at a voltage of 200 kV.

Nanoparticle tracking analysis: The particle number and size distribution of EVs were measured by NTA using the Zetaview instrument (PMX120, Particle Metrix, Germany) with an embedded 488 nm laser. Samples were diluted (serum 1:100-1:10000) in particle-free PBS according to the manufacturer's instructions. Samples were analyzed under constant flow conditions at 25° C. with a camera level of 78 and shutter of 80. Size distributions determined by NTA corresponded to hydrodynamic diameters of EVs in the suspension. Particle number was calculated from the rate of Brownian motion and size was determined using the two-dimensional Stokes-Einstein equation based on the velocity of particle movement. Certain samples were diluted in 0.2-µm filtered PBS between 1:100 and 1:10,000. EV concentrations were measured based on counts of 50-200 particles per frame. For each measurement, two cycles of scanning at 11 cell positions were performed with the following settings: focus, autofocus; camera sensitivity for all samples, 78.0; shutter, 70; and cell temperature, 25° C. The EV concentration was expressed in particle numbers per ml (pn/ml).

Immunoblotting: Cells were lysed in RIPA buffer containing the Halt™ Protease and Phosphatase Inhibitor Cocktail (100×) (Thermo Fisher Scientific, Waltham, MA) and kidneys were lysed in Triton X-100 lysis buffer. Lysates were centrifuged at 9,000-16,000×g for 10-20 min at 4° C. and supernatants were stored at −70° C. for subsequent immunoblotting. Protein concentrations were measured using the BCA assay (Pierce™ BCA Protein Assay, Thermo Scientific™). Protein extracts were lysed in Laemmli sample buffer (Bio-Rad, Hercules, CA) and heated for 5 min at 100° C. Proteins were electrophoresed in an acrylamide-denaturating SDS-polyacrylamide gel and transferred onto a nitrocellulose (NC) membrane. Transfer membranes were incubated in blocking buffer A (PBS, 0.1% Tween-20, and 5% nonfat milk) for 1 h at 22° C., and then incubated with primary antibodies against srIκB (customized antibody, Abclon, Seoul, Korea), mCherry, Alix, TSG101, GM130, calnexin (Abcam, Cambridge, UK), CD9, CD63 (SBI, Tokyo, Japan), GAPDH (Santa Cruz Biotechnology, Dallas, TX), prohibitin (NOVUSBIO, Centennial, CO), nucleoporin p62 (BD bioscience, San Jose, CA), NF-κB (Clone 8242S, Cell signaling technology, Danvers, MA), Lamin Bi (Clone ab133741), ICAM-1 (Clone AF796, R&D Systems), cleaved caspase-3 (Clone 9661L, Cell signaling technology), cleaved PARP (Clone 9544S, Cell signaling technology), and β-actin (A5441, Sigma-Aldrich) overnight at 4° C. After washing and incubating membranes with specific secondary antibodies, they were developed using chemiluminescent agents [Clarity and Clarity Max ECL Western Blotting Substrates (Bio-Rad) or West-Q Pico Dura ECL solution (GenDEPOT, Katy, TX)]. Image J software (NIH) was used to measure the relative optical densities of bands for each group.

Mouse renal ischemia-reperfusion model: Mice were anesthetized via the intraperitoneal administration of a tiletamine/zolazepam (Zoletil®)-xylazine (Rompun®) mixture (1 mg/kg), and placed on a heated surgical pad (37° C.). Bilateral IRI was performed using the dorsal approach. Renal pedicles were dissected, and a micro clamp (Jeungdo Bio & Plant, Seoul, South Korea) was placed on each renal pedicle for 30 min. Sham animals received anesthesia and bilateral dorsal incisions alone. During the procedure, mice were hydrated with 1 ml warm normal saline, to prevent dehydration. After 30 min of ischemia, both clamps were removed and blood flow restoration was confirmed before closing wounds with the Autoclip® Wound Closure System (Harvard apparatus, Holliston, MA). The animals were allowed to recover with free access to food and water. Mice were sacrificed 24 or 48 h after IRI surgery. Serum, spleens, and kidneys were collected from each mouse for further analysis. Serum BUN and creatinine levels were analyzed using the Cobas C502 automatic analyzer (Roche diagnostics, Basel, Switzerland).

Enzyme-linked immunosorbent assay (ELISA): Serum NGAL levels were measured using mouse ELISA kits, according to the manufacturers' protocols (Mouse Lipocalin-2/NGAL Quantitative ELISA kit) (R&D Systems, Minneapolis, MN) after diluting samples 1:100-1000 times.

The TNF-α, IL-8 and MCP-1 levels in supernatants collected from THP-1 and HUVEC cultures were measured using commercial ELISA kits (R&D Systems, Minneapolis, MN, USA), and NF-κB activity in HUVECs was measured using the Trans AM NF-κB p65 kit (Active Motif, Carlsbad, CA, USA). TNF-α, CCL-4/macrophage inflammatory protein (MIP)-1β, IL-6, and IL-1β levels in mouse plasma collected through cardiac puncture at the indicated time points after the high-grade CLP procedure were measured using the Mouse Magnetic Luminex eScreening Assay kit (R&D Systems). The assay was performed according to the manufacturer's instructions. All samples and standards were assayed in duplicate using the Luminex 200TM System (Merck Millipore, Darmstadt, Germany). To measure serum TNF-α, IL-1β, IL-6, and CCL4 at the indicated time points, blood samples were collected through cardiac puncture after the LPS endotoxemia procedure, allowed to clot for 2 h at room temperature, and then centrifuged at 2,000 g for 20 min at 4° C.

NE-PER nuclear and cytoplasmic extraction: Kidneys were collected, cut into small pieces, washed with PBS, and homogenized with beads in certain volumes of cytoplasmic extraction reagent (CER) I, obtained from the NE-PER Nuclear and Cytoplasmic Extraction Reagent kit (ThermoFisher, Waltham, MA), according to the kidney weight. After 15 s of vigorous vortexing and 10 min of incubation on ice, CER II was added to each kidney sample, followed by incubation on ice for 1 min and centrifugation at 16,000×g for 5 min. The supernatant was collected as a cytoplasmic extract, and the insoluble fraction was suspended in nuclear extraction reagent. After centrifuging for 10 min at 16,000×g, all supernatants were collected and used as nuclear extracts.

Histopathologic assessment of kidney injury score and immunohistochemistry: Five micrometer-thick sections of formalin-fixed and paraffin-embedded kidney tissue samples were processed via hematoxylin-eosin (HE) and IHC staining. For histologically evaluating kidney injury, each slide was stained with HE. A renal pathologist (JIY) scored the percentage of necrotic tubules out of total tubules in cortical areas in a blind manner. Kidney injury was scored according to the percentage of damaged tubules among total tubules: 0, normal; 1, <25% damage; 2, 25-50% damage; 3, 50-75% damage, 4, 75-90% damage; and 5, >90% damage. Histological criteria for injured tubules included the loss of tubular brush border, vacuolization, chromatin condensation, and denuded tubular basement membrane. Renal tubules in five randomly selected high-power fields, typically including 50-100 tubules, were evaluated and scored.

For IHC, tissue sections were deparaffinized, rehydrated in ethyl alcohol, and washed in tap water. Antigens were retrieved in 10 mM sodium citrate buffer for 20 min, using a Black & Decker vegetable steamer. Slides were blocked with 10% donkey serum for 30 min at 22° C., and washed using PBS. Primary antibodies for NF-κB (Clone 8242S, Cell signaling technology, Danvers, MA) and ICAM-1 (Clone AF796, R&D Systems) were diluted to appropriate concentrations using 2% casein in bovine serum albumin, added to the slides, and incubated overnight at 4° C. After washing, secondary antibodies (Dako, Carpinteria, CA) were applied for 1 h at 22° C. Diaminobenzidine was added for 2 min, and hematoxylin was used to counterstain slides. A semi-quantitative score for staining intensity was obtained by examining at least five fields in each section under a 400× magnification and via digital image analysis (MetaMorph version 4.6r5, Universal Imaging Corp., Downingtown, PA).

Measurement of DNA-binding activity of NF-κB: Twenty micrograms of kidney nuclear extracts were used to measure the binding activity of p65/c-Rel (NF-κB) to DNA, using the TransAM NF-κB assay kit (ActiveMotif, Carlsbad, CA), according to the manufacturer's protocol.

Quantitative real-time polymerase chain reaction: The established method for whole kidney RNA extraction was used. Briefly, whole kidney samples were homogenized with 700 µl of RNAiso reagent (Takara Bio Inc., Otsu, Shiga, Japan). Next, 160 µl of chloroform was added into homogenized samples of kidney cells. Next, the mixture was shaken vigorously for 30 s, kept at 22° C. for 3 min, and centrifuged at 16,000×g for 15 min at 4° C. The aqueous phase, located on the top of three phases, was transferred to a fresh tube carefully, to prevent contamination with other phases. Extracted RNA was precipitated by adding 400 µl of isopropanol and centrifuged at 16,000×g for 30 min at 4° C. RNA pellets were washed with 70% ethanol, air-dried for 2 min, and dissolved in sterile diethyl pyrocarbonate-treated distilled water. Quantity and quality of extracted RNA were assessed by spectrophotometric measurements at wavelengths of 260 and 280 nm. Isolated RNA was reverse transcribed to cDNA using cDNA synthesis kits (Takara Bio Inc, Shiga Prefecture, Japan). Five microliters of each cDNA were mixed with 10 µl of the SYBR Green PCR Master Mix (Applied Biosystems, Foster City, CA) and 5 pmol of sense/antisense primers. Primer concentrations were determined after preliminary experiments confirming optimal concentrations for each primer. Expression levels of Il-1α, Il-1β, Il-2, Il-4, IR-6, Il-10, Il-17α, Ccl2, Ccl3, Ccl5, Cxcl2, Ifn-γ, Tnf-α, and Icam-1 were measured using the ABI PRISM 7700 Sequence Detection System (Applied Biosystems). PCR conditions were as follows: the initial heating step was performed for 9 min at 95° C., followed by 35 cycles of denaturation for 30 min at 94.5° C., annealing for 30 s at 60° C., and extension for 1 min at 72° C., and final extension for 7 min at 72° C. Sequence data for each primer are shown in Table 1.

TABLE 1

PRIMER SEQUENCES

| Gene | Primer type | Primer sequence (5' to 3') | |
|---|---|---|---|
| Il-1α | Forward | CCCGTCCTTAAAGCTGTCTG | SEQ ID NO: 5 |
| | Reverse | AATTGGAATCCAGGGGAAAC | SEQ ID NO: 6 |
| Il-1β | Forward | GCCCATCCTCTGTGACTCAT | SEQ ID NO: 7 |
| | Reverse | AGGCCACAGGTATTTTGTCG | SEQ ID NO: 8 |
| Il-2 | Forward | CCCACTTCAAGCTCCACTTC | SEQ ID NO: 9 |
| | Reverse | ATCCTGGGGAGTTTCAGGTT | SEQ ID NO: 10 |
| Il-4 | Forward | CCTCACAGCAACGAAGAACA | SEQ ID NO: 11 |
| | Reverse | ATCGAAAAGCCCGAAAGAGT | SEQ ID NO: 12 |
| Il-6 | Forward | AGTTGCCTTCTTGGGACTGA | SEQ ID NO: 13 |
| | Reverse | TCCACGATTTCCCAGAGAAC | SEQ ID NO: 14 |
| Il-10 | Forward | TGCTATGCTGCCTGCTCTTA | SEQ ID NO: 15 |
| | Reverse | TCATTTCCGATAAGGCTTGG | SEQ ID NO: 16 |
| Il-17a | Forward | TCCAGAAGGCCCTCAGACTA | SEQ ID NO: 17 |
| | Reverse | AGCATCTTCTCGACCCTGAA | SEQ ID NO: 18 |
| Ccl2 | Forward | AGGTCCCTGTCATGCTTCTG | SEQ ID NO: 19 |
| | Reverse | TCTGGACCCATTCCTTCTTG | SEQ ID NO: 20 |
| Ccl3 | Forward | CCTCTGTCACCTGCTCAACA | SEQ ID NO: 21 |
| | Reverse | GATGAATTGGCGTGGAATCT | SEQ ID NO: 22 |
| Ccl5 | Forward | CCCTCACCATCATCCTCACT | SEQ ID NO: 23 |
| | Reverse | GAGCACTTGCTGCTGGTGTA | SEQ ID NO: 24 |
| Cxcl2 | Forward | AGTGAACTGCGCTGTCAATG | SEQ ID NO: 25 |
| | Reverse | TCCAGGTCAGTTAGCCTTGC | SEQ ID NO: 26 |
| Ifn-γ | Forward | AAGACTGTGATTGCGGGGTT | SEQ ID NO: 27 |
| | Reverse | GCACCAGGTGTCAAGTCTCT | SEQ ID NO: 28 |
| Tnf-α | Forward | TATGGCTCAGGGTCCAATC | SEQ ID NO: 29 |
| | Reverse | CTCCCTTTGCAGAACTCAGG | SEQ ID NO: 30 |
| Icam-1 | Forward | TTCACACTGAATGCCAGCTC | SEQ ID NO: 31 |
| | Reverse | GTCTGCTGAGACCCCTCTTG | SEQ ID NO: 32 |
| 18S | Forward | CGCTTCCTTACCTGGTTGAT | SEQ ID NO: 33 |
| | Reverse | GGCCGTGCGTACTTAGACAT | SEQ ID NO: 34 |

Each sample was run in triplicate in separate tubes and a negative control without cDNA was also run in parallel with each assay. After real-time PCR, the temperature was increased from 60° C. to 95° C. at a rate of 2° C./min, to construct a melting curve. The expression value for each gene was normalized to 18S rRNA and relative fold expression values were calculated using a comparative CT method with $2^{-\Delta\Delta CT}$.

Multiplex cytokine assay in serum: Thirteen inflammatory cytokines and chemokines, including IL-1α, IL-1β, IL-2, IL-4, IL-6, IL-10, IL-17A, CCL2, CCL3, CCL5, CXCL2, IFN-γ, and TNF-α were analyzed using Milliplex Mouse Cytokine/Chemokine Magnetic bead Panel—Multiplex Assay kits, according to the manufacturer's protocol (EMD Millipore, Billerica, MA), using 1:2 diluted serum. Quantification was performed using a Luminex 200 microplate reader (EMD Millipore).

Terminal deoxynucleotidyl transferase dUTP nick-end labeling assay: Cell death was evaluated by the FITC-labelled TUNEL assay, using a commercially available kit (S7110, Merck Millipore, Billerica, MA). TUNEL-positive cells in formalin-fixed renal tissue were identified by examining at least five fields in each section under a 400× magnification and with digital image analysis (MetaMorph version 4.6r5, Universal Imaging Corp.).

Isolation of kidney mononuclear cells and splenocytes from mice: KMNCs were isolated according to an established protocol. Both kidneys were removed after exsanguination, decapsulated, finely minced, and incubated in collagenase type I (1 mg/ml) (Worthington Biochemical, Lakewood, NJ) for 30 min at 37° C. After enzymatic digestion, a single-cell kidney suspension was achieved by mechanical disruption of the tissue through a 70 m strainer (BD bioscience, San Jose, CA). KMNCs were collected following centrifugation at RT using isotonic Percoll density gradient (GE Healthcare, Chicago, IL) (1,500×g for 30 min in brake off mode), as per the manufacturer's instructions. Collected cells were washed and re-suspended in RPMI media containing 5% FBS and automatically counted using the Countess® II FL Automated Cell Counter (Life Technologies, Waltham, MA).

Splenocytes were collected through mechanical disruption of the spleen using a 70 m strainer (BD bioscience) and incubated with RBC lysis solution (Qiagen, Hilden, Germany) for 3 min, to remove red blood cells.

FACS sorting of kidney $CD4^+$ T cells: For FACS sorting, KMNCs were pre-incubated with anti-CD16/CD32 Fc block (Clone 93, Biolegend, San Diego, CA) for 10 min on ice and stained with monoclonal Ab anti-CD45 (APC, Clone 30-F11, Biolegend), anti-Ly6G (APC-Fire750, Clone 1A8, Biolegend), anti-Ly6C (FITC, Clone HK1.4, Biolegend), anti-F4/80 (PerCP-Cy5.5, Clone BM8, Biolegend), and anti-CD3 (PE, Clone 17A2, Biolegend) for 30 min at 4° C. After washing and resuspension in FACS buffer (PBS with 5% FBS), stained cells were analyzed with LSRII using FACS Diva software (BD Biosciences) and FlowJo software (Version 10.2). After excluding debris/dead cells and doublets, each sample was analyzed based on CD45, Ly6G, Ly6C, F4/80, and CD3 expression. OneComp eBeads (ThermoFisher) were used for compensation.

Immunofluorescence: After performing deparaffinization, rehydration, and antigen retrieval, slides were blocked with 10% goat serum for 30 min at 22° C., and washed using phosphate buffered saline with Tween-20. Primary antibodies for Ly-6G (Clone ab25377, Abcam, Cambridge, UK), Ly-6C (Clone ab15627, Abcam), F4/80 (Clone ab6640, Abcam) and fluorescein (FITC)-conjugated Lotus tetragonolobus lectin (LTL) (Clone FL-1321, Vector laboratories, Burlingame, CA) were diluted to proper concentrations using 2% casein in bovine serum albumin, added to slides, and incubated overnight at 4° C. After washing, goat anti-rat IgG Alexa Fluor 647 (ab150167, Abcam) was applied for 1 h at 22° C. Next, 4',6-diamidino-2-phenylindole (DAPI) (MBD0015, Sigma-Aldrich, St. Louis, MO) was used to counterstain slides. Staining intensity was semi-quantitatively scored by examining at least five fields in each section under a 400× magnification via digital image analysis (MetaMorph version 4.6r5, Universal Imaging Corp.).

Statistics: Data were expressed as means±standard deviation (SD) values. Statistical differences were analyzed using one-way ANOVA with Bonferroni post hoc test using Prism 8 (GraphPad, San Diego, CA). If $P<0.05$, results were statistically significant.

LPS endotoxemia model: To generate the LPS endotoxemia mouse model, LPS derived from *Escherichia coli* (Sigma-Aldrich, Milwaukee, WI, USA) was injected into male mice.

High-grade CLP sepsis model and treatment regiment: Male C57BL/6 mice purchased from ORIENTBIO (Seongnam-si, Gyeonggi-do, Republic of Korea) were subjected to high-grade CLP at 9-10 weeks of age, using a previously described procedure with minor modification. All mice were housed, and experiments were performed, in a specific-pathogen-free area of Yonsei Biomedical Research Institute, Yonsei University College of Medicine, which was certified by the Association for Assessment and Accreditation of Laboratory Animal Care International. Mice were anesthetized through i.p. injection of a mixture of 80 mg/kg ketamine and 10 mg/kg xylazine prior to all procedures. After anesthesia, the peritoneum was opened in a sterile manner and the cecum was ligated using 4-0 black silk thread 1 cm from the distal end and punctured with a 23-gauge needle. After puncturing, the needle was removed and a small amount of stool was extruded through both punctures to ensure patency. Then, the cecum was placed back into the abdominal cavity and the abdominal incision was closed with 6-0 nylon sutures, with stainless steel removable wound clips used on the skin. After this procedure, 1 ml of prewarmed saline per 20 g body weight was administered subcutaneously. Sham-treated mice underwent the same procedure except for the ligation and puncture of the cecum. After this procedure, $1.0×10^9$ particles of Exo-naïve or Exo-srIκB were administered to mice via i.p. injection at 0, 6, 12 and 18 h. As a control, an equivalent volume of phosphate buffer solution (PBS) was injected in the same manner. The animals were assessed every 2 h during the initial 48 h after CLP, and then every 4 h for 5 days. Samples were collected to evaluate the outcome of the procedure within 18 h after CLP.

Intravital imaging: A laser-scanning intravital confocal microscope (IVM-C; IVIM Technology, Daejeon, South Korea) was used to visualize the biodistribution and antiseptic effects of Exo-srIκB. During intravital imaging, mouse body temperature was maintained at 37° C. using a homoeothermic controller. Mice were anaesthetized with intramuscular injections of Zoletil (30 mg/kg) and xylazine (10 mg/kg). To access the internal organs, including the liver, spleen and kidney, a small incision of 10 mm was made in both the skin and peritoneum. Exposed organs were kept hydrated through repeated application of saline during imaging. The biodistribution of exosomes was visualized through wide-area z-stack imaging before and after the injection of Exo-Naïve or Exo-srIκB. To fluorescently label neutrophils of C57BL/6N mice in vivo, anti-Ly6G antibody (BD Bioscience, San Jose, CA, USA) conjugated with Alexa Fluor 555 (A20009; Thermo Fisher Scientific, Waltham, MA, USA) was injected intravenously, naïve or srIκB exosomes labeled with mCLING ATTO 647N (Synaptic System, Gottingen, Germany) were intravenously injected via a tail vein catheter or 31-G insulin syringe. To generate the sepsis model, high-dose LPS (Sigma-Aldrich, St. Louis, MO, USA) was intravenously injected 1-16 h prior to imaging.

Confocal microscopy: For exosome uptake analysis, exosomes were diluted in 0.5 ml of Dulbecco's PBS (DPBS). Subsequently, the suspension was incubated with 647N-labeled mCLING-ATTO (Synaptic System) according to the manufacturer's instructions. Then, a pellet of the mixture was obtained through centrifugation and 300 μl of the resuspended pellet was incubated with the HUVECs. After 24 h, cells were washed with DPBS and fixed in 4% paraformaldehyde solution. Hoechst was used for nuclear staining. Images were recorded using a Zeiss 710 confocal microscope (Zeiss, Oberkochen, Germany).

Luciferase assay: HEK293 cells were stably transfected with a luciferase reporter construct regulated under the NF-κB response element (SL-0012; Signosis, Santa Clara, CA, USA) and grown according to the manufacturer's instructions. Cells were treated with exosomes for 24 h at 37° C., and luciferase activity was measured (E1501; Promega, Madison, WI, USA) using a SpectraMax ID3 microplate reader (Molecular Devices, Sunnyvale, CA, USA).

Flow cytometry: The levels of surface markers expressed on HUVECs were assessed using flow cytometry. The cells were separated and harvested through centrifugation, labeled with phycoerythrin (PE)-conjugated antibodies specific for human ICAM-1 (BD Biosciences) on ice for 30 min in the dark, and then washed extensively. All samples were analyzed with a BD Celesta flow cytometer (BD Biosciences). The data were analyzed using BD FACSDiva software. PE-conjugated antibodies specific to IgG1κ (BD Biosciences) were used as the isotype control.

Example 1. Characterization and Analysis of Engineered Exosomes

Figure 1:
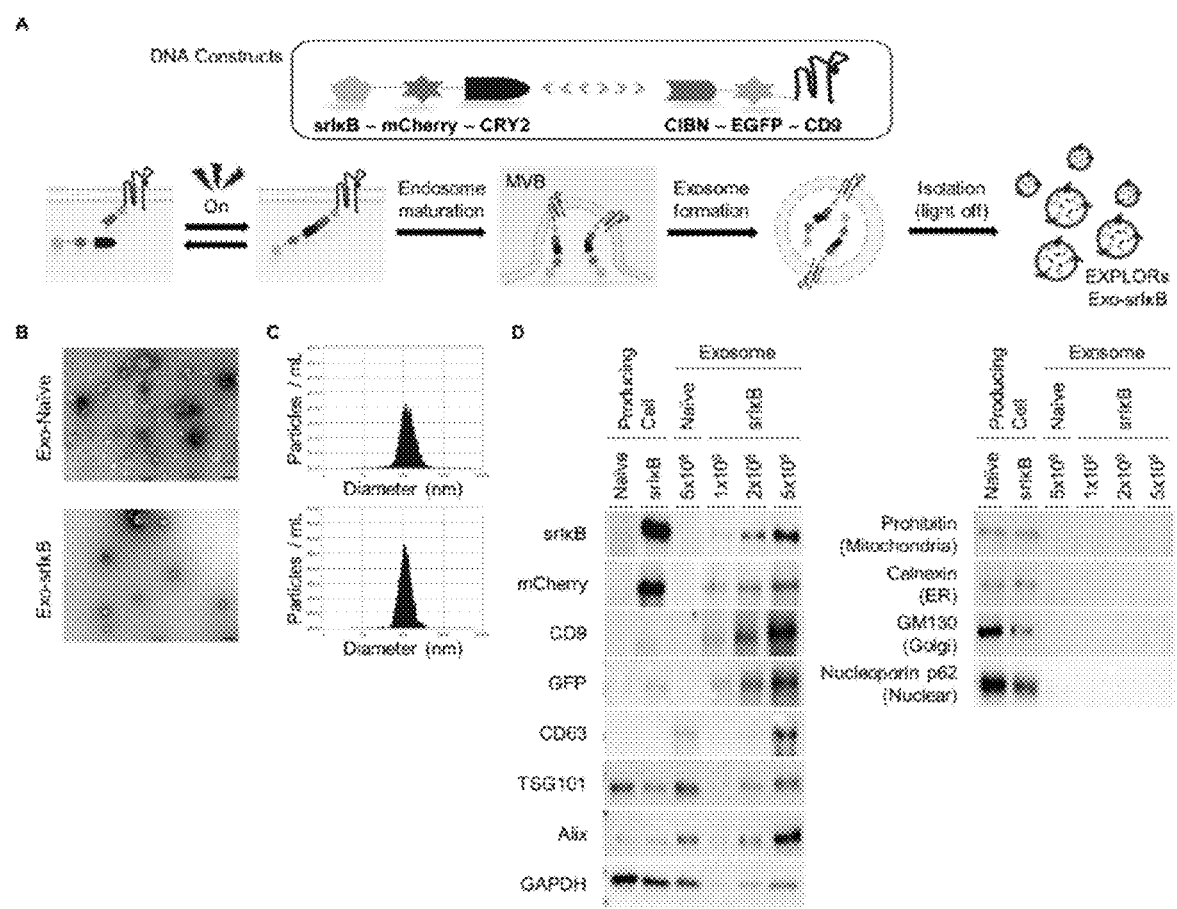
FIG. 1. Characterization of engineered exosomes produced from HEK293T (A) Schematic diagram of DNA constructs used for producing super-repressor IκB-loaded exosomes (Exo-srIκB) (upper), and biogenesis of cargo protein-carrying exosomes using optically reversible protein-protein interactions, so called EXPLOR technology (lower). (B) Representative TEM images of Exo-Naïve and Exo-srIκB. Scale bar: 100 nm. (C) Concentrations and size distributions of Exo-Naïve (upper) and Exo-srIκB (lower) were determined by a Zetaview instrument. (D) Immunoblotting HEK293T cells and HEK293T cell-derived exosomes to analyze the expression of target proteins (srIκB, mCherry, CD9, and GFP), exosome positive markers (CD63, TSG101, Alix, and GAPDH), and exosome negative markers (Cell organelle markers; prohibitin, calnexin, GM130, and nucleoporin p62). Naïve cells and Exo-naïve were used as negative controls of Exo-srIκB.

The production, collection, and purification of exosomes have been thoroughly described in previous studies as shown in FIG. 13. The size of particles mostly ranged from 30 to 120 nm, with a mean size of 101 nm. Transmission electron microscopy (TEM) revealed intact cup-shaped membrane vesicles with sizes in accordance with nanoparticle tracking analysis (NTA) results (FIGS. 1, B and C). Immunoblotting analysis results for Exo-srIκB revealed the robust expression of target proteins, including srIκB, mCherry, CD9, and GFP with positive exosome markers, such as CD63, TSG101, Alix, and GAPDH. Exo-srIκB lacked the expression of cell organelle markers, including prohibitin, calnexin, GM130, and nucleoporin p62. Exo-Naïve did not express any markers except exosome markers (FIG. 1D).

Example 2. Injection of Exo-srIκB Ameliorates Renal Ischemic-Reperfusion Injury Firstly, the role of Exo-srIκB in the course of renal IRI was investigated. Each experimental group was intraperitoneally injected with $3\times10^9$ pn of Exo-srIκB or with Exo-Naïve three times in 1-h intervals (total of $9\times10^9$ pn), either before or after renal IRI. (Pre-treatment: 3, 2, and 1 h before IRI surgery; Post-treatment: 1, 2, and 3 h after IRI surgery) Mice were sacrificed either 24 or 48 h after surgery (FIG. 2A).

Figure 2:
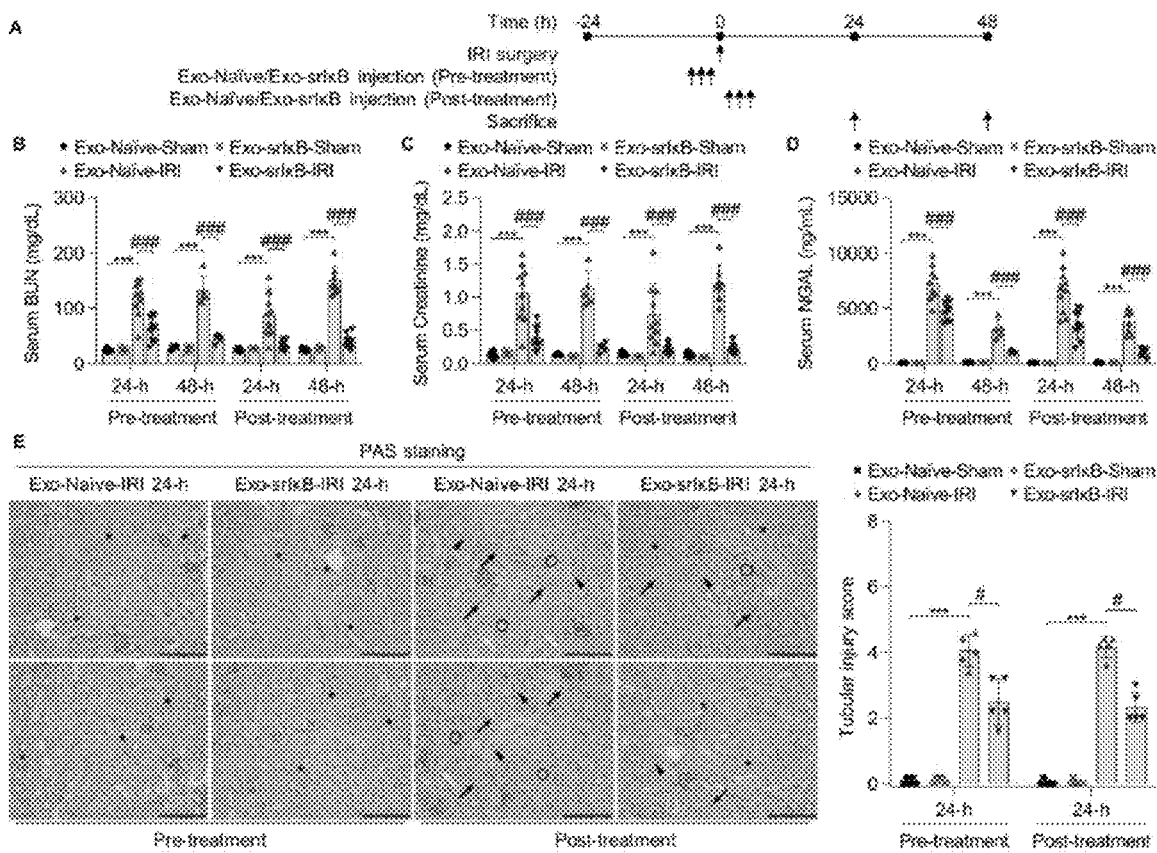
FIG. 2. Renal protective effects of Exo-srIκB after kidney IRI (A) Experimental scheme of kidney IRI surgery and exosome delivery. Each mouse group was intraperitoneally injected with $3 \times 10^9$ pn of Exo-naïve or Exo-srIκB three times in a 1-h interval (total of $9 \times 10^9$ pn). Mice were sacrificed either 24 or 48 h after IRI surgery and serum and tissues were collected for further evaluation. (B-D) Serum levels of BUN, creatinine, and NGAL among different groups depending on treatment type (Exo-naïve vs. Exo-srIκB), drug delivery timing (Pre-treatment vs. Post-treatment), and follow-up time point (24-h and 48-h), which shows the renal protective effect of Exo-srIκB treatment (Pre-treatment 24-h, n=10; pre-treatment 48-h, n=4-5; post-treatment 24-h, n=5-10; post-treatment 48-h, n=4-11). (E) Left: Representative PAS staining images of cortical tubular cells in kidney sections from each group. Normal proximal tubular brush border (*) or loss of brush border (o); chromatin condensation (black arrows); denuded basement membrane (black arrowheads); vacuolization (yellow arrows); scale bar, 100 μM. Right: Pathological tubular injury; numerous kidney samples from each group show fewer tubular injuries with Exo-srIκB treatment than those with Exo-Naïve treatment (Pre-treatment 24-h, n=5; post-treatment 24-h, n=5). Comparisons between groups were assessed using one-way ANOVA with Bonferroni post hoc test. Data were represented as mean±SD values. ***$P<0.001$, upon comparing Exo-Naïve-Sham and Exo-Naïve-IRI surgery groups. #$P<0.05$ and ###$P<0.001$, upon comparing Exo-Naïve-IRI and Exo-srIκB-IRI surgery groups.

Interestingly, the mice group that received Exo-srIκB showed a significantly lower level of serum blood urea nitrogen (BUN) and creatinine than the Exo-Naïve-injected group after IRI surgery, both in pre-treatment and post-treatment models (24-h/48-h BUN and creatinine in both models, P<0.001) (FIGS. 2B and 2C). Serum neutrophil gelatinase-associated lipocalin (NGAL) levels were significantly reduced in the Exo-srIκB-injected group, in the pre- and post-treatment models as compared with those in the Exo-Naïve group (P<0.001) (FIG. 2D). Histologic evaluation results also revealed lower tubular injury scores in the mouse group receiving Exo-srIκB treatment as compared with those in the Exo-naïve group, in pre-/post-treatment models (P<0.05 vs. Exo-Naïve-injected group) (FIG. 2E). Collectively, these data demonstrate that the systemic delivery of Exo-srIκB directly prevents the course of ischemic AKI.

Figure 3:
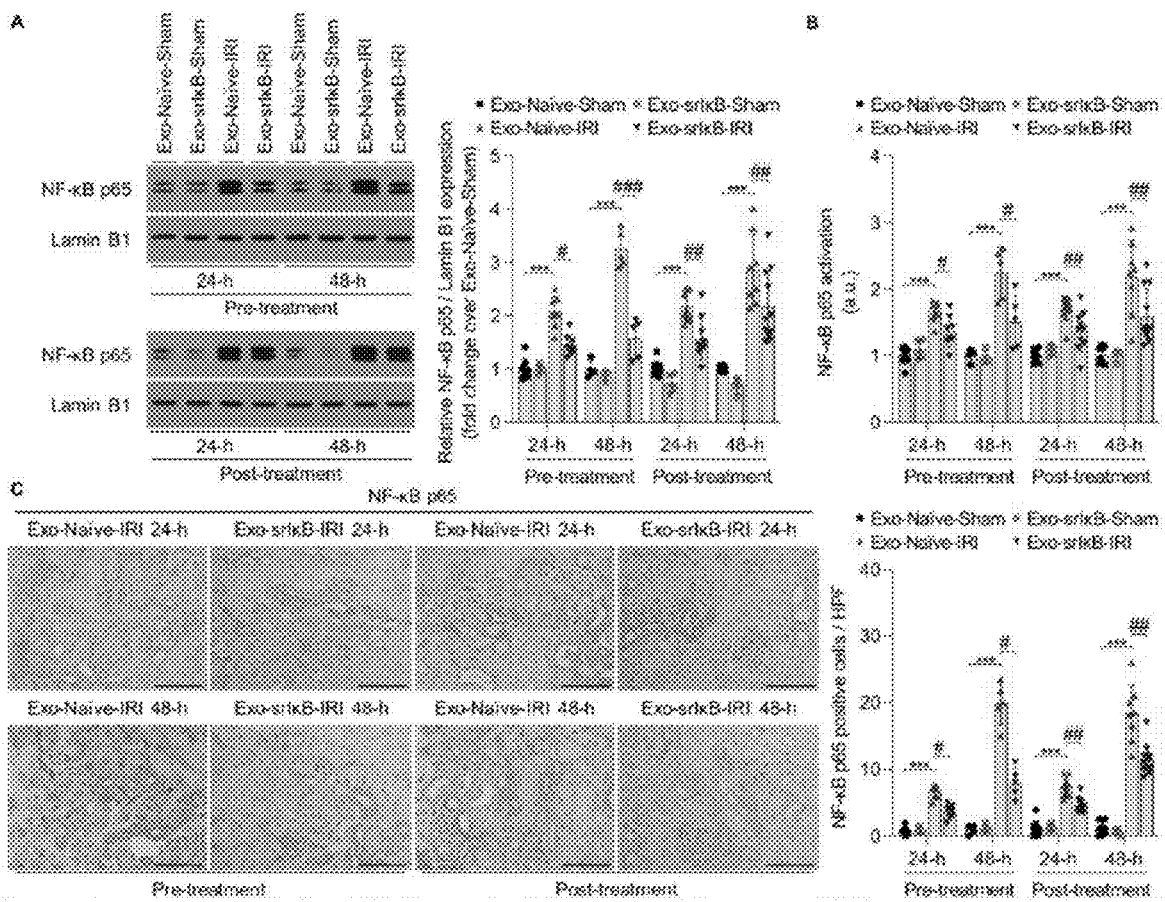
FIG. 3. Suppression of IRI-induced NF-κB activation following Exo-srIκB treatment (A) Western blot analysis of NF-κB p65 expression using renal nuclear extracts from each experimental mouse group. Nuclear extracts were biochemically separated from cytoplasmic fractions, and NF-κB p65 and Lamin B1 expression was analyzed via western blotting. IRI-induced activation of NF-κB signaling was significantly repressed with perioperative Exo-srIκB treatment. (B) Elevated DNA-binding activity of NF-κB p65 following renal IRI was suppressed with perioperative Exo-srIκB treatment. (C) Left: Representative IHC images with NF-κB p65 antibody from each treatment group. Scale bar, 50 μM. Right: Graphical representation showing immunohistochemical detection of NF-κB p65 in each experimental group. Treatment with Exo-srIκB decreased NK-κB expression as compared with that of the control group (Pre-treatment 24-h, n=5-8; pre-treatment 48-h, n=4-5; post-treatment 24-h, n=5-10; post-treatment 48-h, n=4-11). Comparisons between groups were assessed using one-way ANOVA with Bonferroni post hoc test. Data were represented as mean±SD values. P<0.01, *P<0.001, upon comparing Exo-Naïve-Sham and Exo-Naïve-IRI surgery groups. #P<0.05, ##P<0.01, ###P<0.001, upon comparing Exo-Naïve-IRI surgery group vs. and Exo-srIκB-IRI surgery groups.

Example 3. Systemic Exo-srIκB Treatment Represses Renal NF-κB Signaling in IR-Injured Kidney To understand the underlying mechanism by which systemic Exo-srIκB treatment affects the course of R-induced AKI, the systemic delivery of Exo-srIκB was first studied to determined if it represses local NF-κB signaling in kidneys. The expression of NF-κB p65 protein in renal nuclear extracts from each different experimental group was measured via western blotting. Systemic treatment with $9\times10^9$ pn of Exo-srIκB significantly decreased IR-induced NF-κB nuclear translocation, as compared with that seen in the Exo-Naïve-treated group, in the pre-IRI (24-h after IRI, P<0.05; 48-h, P<0.001) and post-IRI (24-/48-h after IRI, P<0.01) (FIG. 3A) treatment model. The finding was reconfirmed by measuring the DNA binding activity of p65 using renal nuclear extracts from each experimental group. Exo-srIκB treatment significantly downregulated the DNA binding activity of NF-κB after kidney IRI as compared with that in the Exo-Naïve group, regardless of treatment timings (Pre-treatment: 24-/48-h after IRI, P<0.05; Post-treatment: 24-/48-h after IRI, P<0.01) (FIG. 3B). Further validation through NF-κB immunohistochemical (IHC) staining showed a significant reduction in NK-κB expression in the Exo-srIκB-treated group as compared with that of the control treatment group (Pre-treatment: 24-h after IRI, P<0.05; 48-h, P<0.001 and post-treatment: 24-/48-h after IRI, P<0.05) (FIG. 3C). Thus, systemic Exo-srIκB treatment can reduce renal NF-κB signaling in post-IR kidneys.

Example 4. Exo-srIκB Ameliorates Inflammation in Post-Ischemic Kidneys

To further investigate whether systemic exosomal srIκB treatment locally alleviates renal IRI-induced inflammation, gene expression levels of pivotal inflammatory mediators was determined, including Il-1a, Il-1β, Il-2, Il-4, Il-6, Il-10, Il-17α, Ccl2, Ccl3, Ccl5, Cxcl2, Ifn-γ, and Tnf-α through quantitative real-time polymerase chain reaction (qRT-PCR). Treatment with $9\times10^9$ pn of Exo-srIκB before IRI significantly suppressed the expression levels of Il-1β, Il-6, Tnf-α, Ccl2, Ccl5, and Cxcl2 as compared with those of the Exo-Naïve-treated group in IR-injured kidneys (FIG. 4A). Multiplex cytokine analysis was also performed using serum from different experimental groups. Results were less significant than kidney transcriptional data, but there was an obvious tendency for decreased expression of inflammatory cytokines, including IL-6, TNF-α, CCL2, CCL5, and CXCL2 in the Exo-srIκB treatment group, as compared with that in the control group (FIG. 4B).

Figure 4:
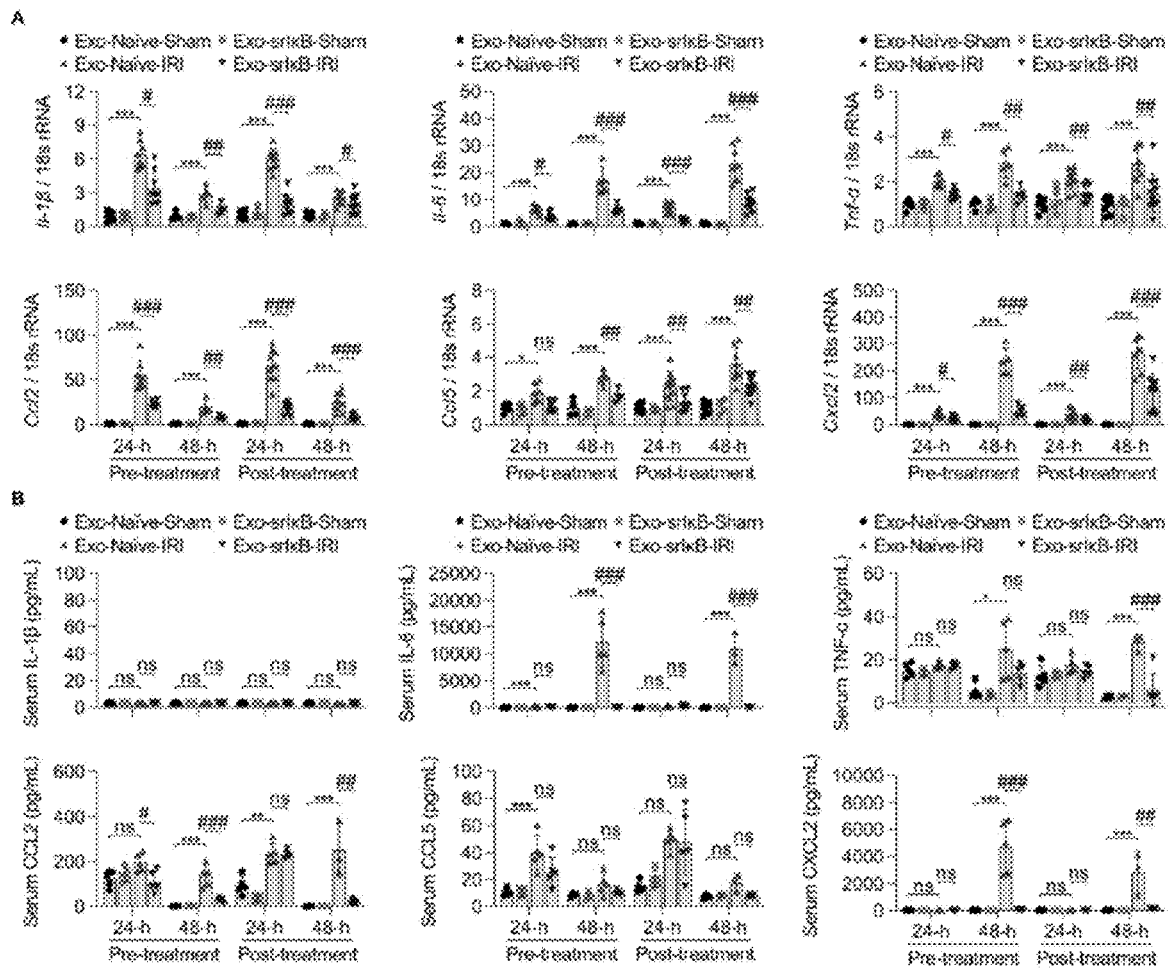
FIG. 4. The expression of pro-inflammatory cytokines/chemokines and adhesion molecules is negatively affected by Exo-srIκB treatment both locally and systemically.
Figure 4:
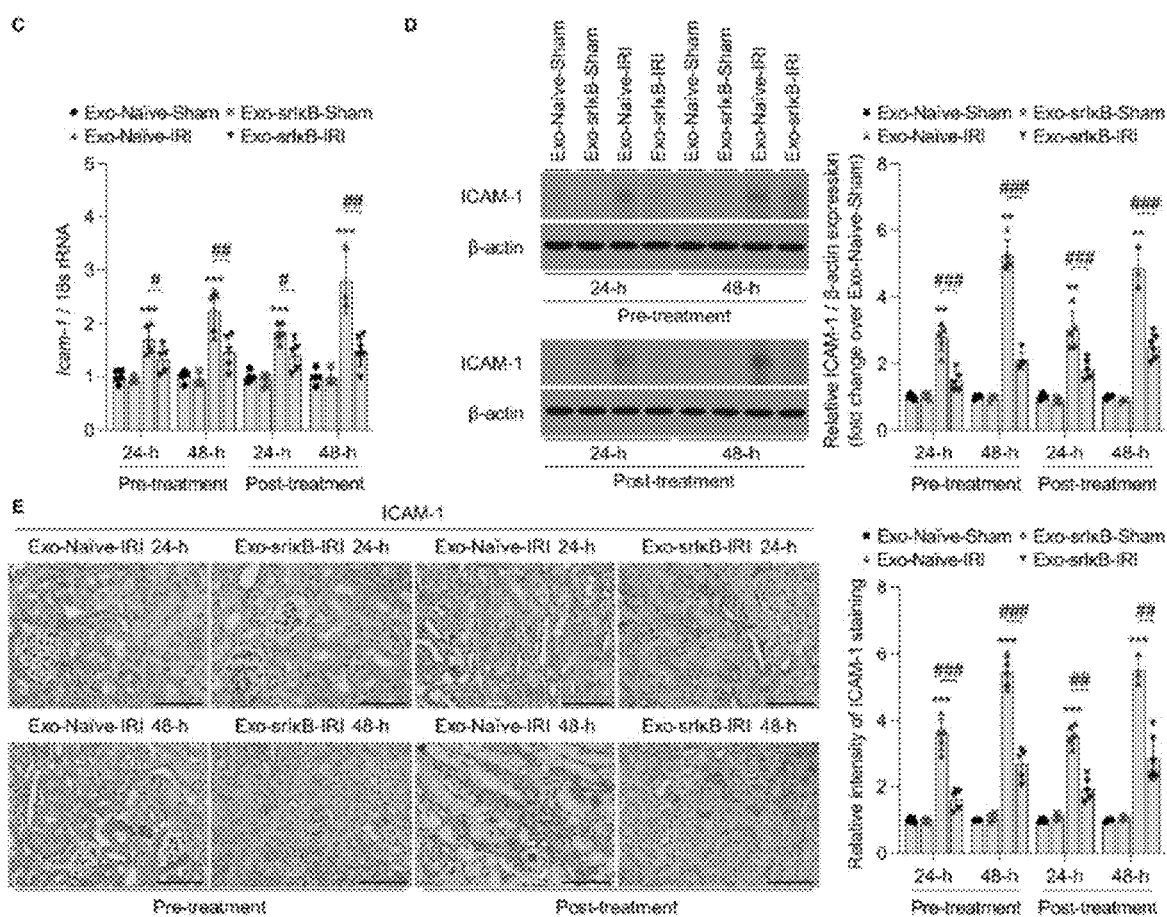

Additionally, the effect of exosomal srIκB treatment on the expression of adhesion molecules was evaluated, by comparing transcriptomic/translational intercellular adhesion molecule 1 (ICAM-1) levels among treatment groups. qRT-PCR results revealed the significantly lower level of Icam-1 expression in the Exo-srIκB treatment group than that in the Exo-Naïve treatment, in both pre-/post-treatment models (FIG. 4C). This result was reproduced in the translational level via western blotting and IHC staining (FIGS. 4, D and E). Thus, systemic Exo-srIκB delivery can downregulate the expression of pro-inflammatory cytokines/chemokines and adhesion molecules in IR-induced AKI.

Example 5. Exo-srIκB Alleviates Apoptosis in Post-Ischemic Kidneys

Based on the well-known role of NF-κB in modulating programmed cell death, how Exo-srIκB affected apoptosis in post-ischemic kidneys was investigated. Kidney IRI surgery induced significant apoptosis in renal cells, which showed an abrupt increase in cleaved caspase-3 and cleaved Poly (ADP-ribose) polymerase (PARP) levels in western blot analysis. Systemic delivery of Exo-srIκB either before/after the injury could substantially downregulate the expression level of cleaved caspase-3 and cleaved PARP, suggesting that Exo-srIκB has protective effects on apoptosis in post-ischemic kidneys (FIG. 5A). Terminal deoxynucleotidyl transferase dUTP nick-end labeling (TUNEL) staining was used to determine the extent of renal cell injury. Compared with the controls, Exo-srIκB-treated kidneys showed a significantly lower number of TUNEL-positive cells in pre-/post-treatment models (FIG. 5B).

Example 6. Biodistribution of Exosomes after Renal Ischemia-Reperfusion Injury

The biodistribution of Exo-srIκB in renal IRI model was investigated to better understand which cell types are orchestrating the protective effect of Exo-srIκB in post-ischemic kidneys. Mice were intravenously injected with fluorochrome-labeled Ly6G and F4/80 antibodies 1 h before IRI surgery and intravenously injected with $9 \times 10^9$ pn of Exo-srIκB 1 hr after reperfusion. Intravital imaging was performed at 10 min, 5 h, and 24 h after reperfusion (FIG. 6A). Intravital imaging following injection of DiD-labeled exosomes as well as anti-Ly6G antibody to visualize neutrophils (Fluor 555) and anti-F4/80 antibody to visualize macrophages (Fluor 488) confirmed that both Exo-srIκB and Exo-Naïve are taken up by neutrophils ($Ly6G^+$) and macrophages ($F4/80^+$) in post-ischemic kidneys (FIG. 6B). We observed mild increase in DiD (green) signal in renal tubules after IRI, raising a possibility of exosome uptake by renal tubular cells but the signal intensity was not significantly different compared to the one before the DiD-labeled exosome injection (data not shown). Spleens were observed at the same time which showed exosomal uptake in the neutrophils and macrophages in the outer parenchymal area (FIG. 6C). Inner parenchymal area did not show any significant uptake (data not shown).

Example 7. Systemic Delivery of Exo-srIκB Affects the Renal Immune Cell Population after Kidney IRI Immune cells are known to serve important roles in the course of ischemic AKI; hence, it was evaluated whether providing exosomal srIκB treatment before IRI surgery affected the population of each immune cell type. After 24 h of ischemic AKI, there was no difference in the total number of renal cells isolated through multiple steps of mechanical disruption, enzymatic digestion, and Percoll density gradient method between the experimental groups, but the Exo-srIκB-treated group had significantly lower frequency of kidney mononuclear cells (KMNCs) than those of the Exo-Naïve-treated group ($P<0.05$) (FIGS. 7, A and B). Further analysis showed that the Exo-srIκB-injected group had significantly lower frequency of neutrophil ($CD45^+Ly6G^+$) ($P<0.01$), pro-/anti-inflammatory mononuclear phagocytic cells ($CD45^+Ly6C^+/CD45^+F4/80^+$) ($P<0.01$/$P<0.05$, respectively), and T cells ($CD45^+CD3^+$) ($P<0.05$) among total KMNCs than those in the Exo-Naïve-injected group (FIG. 7C). Results of immunofluorescence of R-damaged kidneys also showed decreased neutrophil and mononuclear phagocytic cell frequencies in Exo-srIκB-injected kidneys (FIG. 7D). However, Exo-srIκB treatment did not have significant effects on the total immune cell numbers or frequencies in the spleen after ischemic AKI. There were no differences in total cell numbers and frequencies of total immune cells ($CD45^+$), neutrophils ($CD45^+Ly6G^+$), and pro-/anti-inflammatory mononuclear phagocytic cells ($CD45^+Ly6C^+/CD45^+F4/80^+$), except T cells ($CD45^+CD3^+$) between the Exo-srIκB and Exo-Naïve treatment groups. This confirms that systemic Exo-srIκB treatment before ischemic AKI has significant local effects on renal immune cell proliferation/trafficking, but not on splenic immune cells.

Example 8. Intravenous Delivery of Exo-srIκB

To validate whether the similar protective effects from intraperitoneal exosomal delivery is found with intravenous delivery, some experiments were repeated by using intravenous injection method. The improved bio-chemical outcomes as well as the decreased level of NF-κB signaling and ICAM-1 expression with intravenous delivery of Exo-srIκB were reproduced as shown in FIG. 8. Thus, intravenous delivery of Exo-srIκB results in similar biologic effects compared to intraperitoneal delivery in ischemic AKI model.

Example 9. More Characterization and Analysis of srIκB-Loaded Exosomes

To produce sufficient exosomes, culture medium was collected from each cell type.

HUVECs were purchased from the American Type Culture Collection (ATCC, Manassas, VA, USA) and cultured in F-12K medium (ATCC) containing 10% fetal bovine serum (FBS; Atlas Biologicals, Fort Worth, CO, USA), heparin (Sigma-Aldrich), endothelial cell growth supplement (BD Biosciences) and 1% penicillin/streptomycin (Thermo Fisher). HUVECs between the third and sixth passages were used in all experiments. Human monocytes (THP-1) were purchased from ATCC and cultured in RPMI 1640 medium (Welgene, Daegu, Korea) with 10% FBS, 1% penicillin/streptomycin and 0.05 mM 2-mercaptoethanol (Sigma-Aldrich).

Exosomes were isolated using a combination of tangential flow filtration (TFF) and size-exclusion chromatography (SEC) (FIG. 13A). To reduce the risk of loading the SEC column with impurities that would exceed its binding capacity, the samples were subjected to diafiltration and concentration through TFF. After TFF, the concentrated medium was loaded onto an SEC column for further purification. A second TFF was then performed to concentrate the exosomes. Each type of exosome isolated through sequential purification was analyzed via nanoparticle tracking analysis (NTA), which characterizes the size and concentration of exosomes (FIG. 13B). Particles with diameters from 30 to 120 nm accounted for over 80% of all particles, with a mean size as 101 nm, which is consistent with the characteristic size range (30-120 nm) of exosomes. Additionally, transmission electron microscopy (TEM) showed intact cup-shaped membrane vesicles with sizes corresponding to the NTA results obtained from Exo-Naïve and Exo-srIκB (FIG. 9B). To further characterize the exosomes in our preparations, two common exosome markers were investigated. These were the tetraspanins CD63 and TSG101, through western blotting.

Western blotting was performed as described in a previous study. Antibodies targeting the following proteins were used: IκBα (CST4812; Cell Signaling Technology, Danvers, MA, USA), p65 (CST6956S; Cell Signaling Technology), CD9 (NBP2-22187; NOVUSBIO, Centennial, CO, USA), CD63 (EXOAB-CD63A-1; SBI, Tokyo, Japan), TSG101 (ab228013; Abcam, Cambridge, UK), GM130 (ab52649; Abcam), GAPDH (sc-47724; Santa Cruz Biotechnology, Santa Cruz, CA, USA), Histone H3 (ab1791; Abcam), mCherry (ab125096; Abcam), and GFP (CST2555; Cell Signaling Technology).

The presence of CD63 and TSG101 was clearly observed in the samples, whereas a Golgi-derived contaminant, GM130, was only detected in the cell lysate (FIG. 9C). This analysis of the exosome preparations showed that they exhibit the characteristics of exosomes. Furthermore, robust loading of srIκB-mCherry-CRY2 (130 kDa) into exosomes isolated from srIκB stable cell lines was observed.

Example 10. Exo-srIκB Improves Survival and Ameliorates Acute Organ Injury in Septic Mice It was investigated to determine whether intraperitoneal (i.p.) injection with Exo-srIκB protected against endotoxic shock. Animals received a single i.p injection with a lethal dose of LPS (40 mg/kg body weight for C57BL/6, 20 mg/kg body weight for BALB/c), followed by a single i.p. injection of Exo-srIκB (6 h apart). Compared with control C57BL/6 mice, which showed 100% mortality due to LPS-induced sepsis, mice treated with Exo-srIκB were remarkably resistant to LPS-induced mortality; the majority of the mice were rescued from sepsis and showed prolonged survival (FIG. 10A, upper). Exo-srIκB-mediated effects were associated with modest protection from the LPS-induced temperature drop (FIG. 14A). A mouse mouse model of LPS-induced sepsis was developed using BALB/c mice. Exo-srIκB treatment significantly improved the survival rate of LPS-induced sepsis in BALB/c mice (FIG. 10A, middle). The role of Exo-srIκB in survival was examined next, using a model of CLP-induced sepsis, as a standardized murine model of intra-abdominal sepsis. The animals survived the 7-day monitoring period, indicating that Exo-srIκB provides lasting protection against sepsis mortality (FIG. 10A, lower). To further investigate whether Exo-srIκB treatment alleviated the inflammation induced by sepsis, enzyme-linked immunosorbent assay (ELISA) was used to determine the concentrations of key inflammation factors in the serum. Significant reductions significant reductions were observed in the expression levels of the pro-inflammatory cytokines TNFα, IL-1β, and IL-6, and the chemokine carbon tetrachloride (CCL4), in the Exo-srIκB treatment group with LPS-induced sepsis (FIG. 10B, upper). Serum levels of TNF-α and CCL4 in the CLP group were also observed to be significantly higher than those in sham-operation control mice, but were not elevated in mice treated with both CLP and Exo-srIκB (FIG. 10B, lower). These results suggest that Exo-srIκB alleviates inflammation induced by LPS or CLP and protects septic mice against the acute inflammatory process.

Numerous studies have shown that acute kidney injury (AKI) is a frequent and serious complication of sepsis, occurring in 50% or more cases, and is associated with very high mortality. To determine the role of Exo-srIκB in CLP-induced AKI in the septic mouse model, renal histological examination was performed. In comparison with those that underwent a sham operation, the renal tubular cells of mice treated with phosphate-buffered saline (PBS) and Exo-Naïve mice showed significant damage in terms of vacuolization, loss of the brush border, and nuclear condensation of tubular epithelial cells (FIG. 10C). Notably, Exo-srIκB treatment markedly decreased damage to tubular areas, preserving proximal tubules and demonstrating the therapeutic potential of Exo-srIκB for sepsis-induced renal injury. These results are consistent with those for LPS-induced AKI (FIG. 14B). The severity of histological kidney damage was further quantified, and found that Exo-srIκB treatment significantly reduced the injury score by 50% in both sepsis models (FIG. 10D). Exo-srIκB ameliorated degenerative changes in the renal tubules, although some damaged areas were present. These data suggest the critical importance of Exo-srIκB in improving renal physiological structure and function in septic mice.

Example 11. Biodistribution of Exosomes after LPS Injection

The changes in exosome biodistribution in the LPS-injected sepsis septic mouse model were investigated. The in vivo biodistribution was analyzed using a custom-made intravital video-rate laser scanning confocal microscopy system. mCLING fluorescence dye-labeled exosomes were injected intravenously into LysM$^{gfp/+}$ transgenic C57BL/6 mice that had also been injected with anti-Ly6G antibody to visualize neutrophils (green fluorescent protein [GFP] and Alexa 555) and macrophages (GFP). It was observed that most exosomes were taken up by neutrophils and macrophages rapidly, i.e., within a few minutes of intravenous exosome injection (FIG. 11A).

Exosomes were delivered mainly to the neutrophils of the liver (FIG. 11B), and increased recruitment of neutrophils and macrophages was observed, as well as increased uptake of exosomes, in the spleens of LPS-induced mice (FIG. 11C). mCLING-labeled exosomes were also delivered to neutrophils in the kidneys of LPS-injected mice (FIG. 15A). These observations suggest that therapeutic exosomes were successfully delivered to target neutrophils and macrophages within 30 minutes in the septic mouse model.

Example 12. Exo-srIκB Alleviates Inflammation Associated with Sepsis

The target specificity and efficiency of Exo-srIκB in vitro was identified. Exo-srIκB, but not Exo-Naïve, significantly blocked TNF-α induced NF-κB activation in an HEK293 cell stably expressing an NF-κB luciferase reporter gene (FIG. 12A). Increasing doses of Exo-srIκB decreased NF-κB reporter activity in a dose-dependent manner, indicating that srIκB released from exosomes prevents NF-κB transcriptional activity (FIG. 12B).

Among all sepsis-responsive cells, monocytes/macrophages play the most critical role in promoting the immune response and depletion of these cells in septic mice increases mortality. THP-1 cells are widely employed to represent monocytes in cell culture models. When THP-1 cells were stimulated with LPS, treatment with Exo-srIκB led to decreased secretion of the inflammatory cytokines TNF-α and monocyte chemoattractant protein (MCP)-1, which are under NF-κB transcriptional control, compared with Exo-Naïve (FIG. 12C). The effects of Exo-srIκB was also compared with those of the commonly used NF-κB inhibitor JSH-23, which interferes with the binding of NF-κB to its target DNA. The example data shows that Exo-srIκB and JSH-23 had comparable effects with respect to inhibiting LPS-induced NF-κB activation and cytokine production in THP-1 cells (FIG. 12C, lane 4 versus lane 6). Sepsis is characterized by monocyte adherence to the endothelium. Under normal conditions, endothelial cells are quiescent and do not interact with monocytes. However, in an inflammatory environment, activated endothelial cells express adhesion molecules, such as intercellular cell adhesion molecule (ICAM)-1, which bind to monocytes. The expression of adhesion molecules is widely considered to be activated during the development of sepsis.

To explore the effect of Exo-srIκB on the expression of cell adhesion molecules in human umbilical vein endothelial cells (HUVECs), the examples first examined whether Exo-srIκBs are internalized in the cells. mCLING-labeled Exo-srIκBs were detectable in HUVECs, with maximum internalization observed after 24 h (FIG. 12D). It was found that ICAM-1 expression in HUVECs was significantly inhibited by Exo-srIκB treatment (FIG. 12E). IL-8 and MCP-1 also triggered the migration and adhesion of monocytes to the vascular endothelium and led to extravasation of these cells into the surrounding tissues. Expression of IL-8 and MCP-1 has been observed previously in various tissues during acute inflammation caused by bacterial and viral infections, and is associated with severe sepsis. It was found that Exo-srIκB suppressed LPS-induced IL-8 and MCP-1 production (FIG. 16A) by inhibiting NF-κB transcriptional activity in HUVECs (FIG. 16B). These results confirm that Exo-srIκB reduces the NF-κB-mediated inflammatory response during sepsis.

Example 13. Protective Effect of Exo-srIκBs on Lung Injury in LPS-Induced Sepsis Animals received a single intraperitoneal injection with a lethal dose of LPS (30 mg/kg body weight for 30 min, followed by a single Intravenous injection of Exo-srIkB ($1\times10^{10}$) for 10 hrs. Lung tissues were analyzed by H&E staining as shown in FIG. 17. The group injected with LPS for 10 hrs showed the neutrophil infiltration and alveolar macrophage proliferation, intra-alveolar and external hyperemia, and bleeding proceeded. Alveolar endothelial cell damage as well as alveolar necrosis are observed. Exosome administration alleviated alveolar wall expansion, neutrophil infiltration and alveolar macrophage proliferation even if congestion is slightly observed.

30 mg/kg LPS was administered to LPS-administered group (negative control) and 3-dose Exo-srIkB-administered group, consisting of 10 mice per group. After 30 minutes of the administration, Exo-srIkB was administered i.v once, and the survival rate for 72 hours was evaluated as shown in FIG. 18. Compared with control C57BL/6 mice, mice treated with high dose of Exo-srIkB were resistant to LPS-induced mortality and showed prolonged survival.

30 mg/kg LPS was administered to LPS-administered group (negative control) and 3-dose Exo-srIkB-administered group, consisting of 5 mice per group. After 30 minutes of the administration, Exo-srIkB was administered i.v once, and blood plasma was obtained by autopsy at each time point. The obtained blood plasma level of TNF-α was measured by ELISA method (FIG. 19). The expression levels of the proinflammatory cytokines TNF-α was reduced in the Exo-srIkB treatment group with LPS-induced sepsis in a time-dependent manner.

Animals received a single intraperitoneal injection with a lethal dose of LPS (30 mg/kg body weight for 30 min, followed by a single Intravenous injection of Exo-srIkB ($1\times10^{10}$). Liver tissues were analyzed by H&E staining (FIG. 20). After 1 hour of LPS administration, infiltration of Kupffer and immune cells around the central vein was observed slightly, but infiltration of inflammatory cells was alleviated in the Exosome-administered group. After 10 hours of LPS administration, infiltration of Kupffer and immune cells around the central vein was significantly increased, and damage to the connective tissue between liver cells was observed. In the exosome-administered group, infiltration was reduced, but necrosis and swelling process of hepatocytes were expected to gradually relieve. Therefore, repeated administration of Exosome is expected to enhance the protective effect.

Example 14. Inhibitory Effect of Exo-srIκB on Proinflammatory Cytokine Production in LPS-Induced Pneumonia Animals received a single intravenous injection of LPS (0.1 mg/kg body weight), followed by two intravenous injections of Exo-srIκB at the indicated concentration after 30 min or 90 min respectively. After 6 hours of LPS administration, Bronchoalveolar lavage fluid (BALF) and blood plasma were acquired and cytokine level was analyzed. Dexamethasone (Dex) was used as a positive control.

The levels TNF-α and IL-6 in the BALF and plasma, respectively, were decreased by Exo-srIκB injections in a dose-dependent manner (FIGS. 21A and 21B). The protective effect of Exo-srIκB in LPS-induced pneumonia was confirmed.

Embodiments for Treating AKI

Embodiment 1. A method for treating acute kidney injury (AKI) in a subject in need thereof, comprising: administering an effective amount of a composition comprising an exosome comprising an NF-κB inhibitor to the subject.

Embodiment 2. The method of any of the above embodiments, wherein the NF-κB inhibitor is selected from the group consisting of a NF-κB inhibitory protein, its fragment, and a mixture thereof.

Embodiment 3. The method of any of the above embodiments, wherein the NF-κB inhibitor is selected from the group consisting of super-repressor (SR)-IκB (srIκB), IκB-α, IκB-β, IκB-ε, BCL-3, a mutant thereof, and a mixture thereof Embodiment 4. The method of any of the above embodiments, wherein the NF-κB inhibitor is super-repressor (SR)-IκB (srIκB).

Embodiment 5. The method of any of the above embodiments, wherein the composition of is administered via oral, transdermal, intraperitoneal, intravenous, intramuscular, subcutaneous, or mixed routes.

Embodiment 6. The method of any of the above embodiments, wherein the subject is human.

Embodiment 7. The method of any of the above embodiments, wherein the method further comprises administering an anti-inflammatory agent to the subject.

Embodiment 8. The method of any of the above embodiments, wherein the exosome comprising a NF-κB inhibitor further comprises a photo-specific binding protein.

Embodiment 9. The method of any of the above embodiments, wherein the NF-κB inhibitor comprises an amino acid sequence having at least 85% sequence identity to SEQ ID NO:1 or SEQ ID NO:2.

Embodiment 10. The method of any of the above embodiments, wherein the NF-κB inhibitor is represented by SEQ ID NO: 1.

Embodiment 11. The method of any of the above embodiments, wherein the NF-κB inhibitor is represented by SEQ ID NO: 2.

Embodiment 12. The method of any of the above embodiments, wherein the photo-specific binding protein is a first photo-specific binding protein and/or a second photo-specific binding protein; the first photo-specific binding protein is conjugated to an exosome specific marker to form fusion protein I; and the second photo-specific binding protein is conjugated to the NF-κB inhibitor to form fusion protein II.

Embodiment 13. The method of embodiment 12, wherein the fusion protein I and the fusion protein II are linked reversibly through the first photo-specific binding protein and the second photo-specific binding protein.

Embodiment 14. The method of embodiment 12 or 13, wherein the first photo-specific binding protein is conjugated to an exosome specific marker to be located in the direction toward inside of the exosome.

Embodiment 15. The method of any of embodiments 12-14, wherein the first photo-specific binding protein and the second photo-specific binding protein are selected from the group consisting of CIB, CIBN, PhyB, PIF, FKF1, GIGANTEA, CRY and PHR.

Embodiment 16. The method of embodiment 15, wherein the first photo-specific binding protein is CIB or CIBN and the second photo-specific binding protein is CRY or PHR.

Embodiment 17. The method of embodiment 15, wherein the first photo-specific binding protein is CRY or PHR and the second photo-specific binding protein is CIB or CIBN.

Embodiment 18. The method of embodiment 15, wherein the first photo-specific binding protein is PhyB and the second photo-specific binding protein is PIF.

Embodiment 19. The method of embodiment 15, wherein the first photo-specific binding protein is PIF and the second photo-specific binding protein is PhyB.

Embodiment 20. The method of embodiment 15, wherein the first photo-specific binding protein is GIGANTEA and the second photo-specific binding protein is FKF1.

Embodiment 21. The method of embodiment 15, wherein the first photo-specific binding protein is FKF1 and the second photo-specific binding protein is GIGANTEA.

Embodiment 22. The method of embodiments 12-21, wherein the exosome specific marker is selected from the group consisting of CD9, CD63, CD81 and CD82.

Embodiment 23. The method of any of the above embodiments, wherein the exosome has a diameter of between about 50 nm and about 200 nm.

Embodiment 24. The method of any of the above embodiments, wherein the exosome has a diameter of between about 50 nm and about 150 nm.

Embodiment 25. The method of any of the above embodiments, wherein the composition is a pharmaceutical composition further comprising a physiologically acceptable carrier.

Embodiment 26. A composition comprising an exosome comprising an NF-κB inhibitor as described in Embodiments 1-16 for treating AKI.

Embodiment 27. Use of a composition comprising an exosome comprising an NF-κB inhibitor as described in Embodiments 1-16 for treating AKI.

Embodiments for Treating Diseases Caused by Sepsis

Embodiment 1. A method for treating a disease caused by sepsis in a subject in need thereof, comprising: administering an effective amount of a composition comprising an exosome comprising an NF-κB inhibitor to the subject.

Embodiment 2. The method of any of the above embodiments, wherein the disease is selected from the group consisting of pneumonia, cytokine storm syndrome, respiratory distress syndrome, and organ failure. In some embodiments, the disease is pneumonia. In some embodiments, the disease is cytokine storm syndrome. In some embodiments, the disease is respiratory distress syndrome. In some embodiments, the disease is organ failure.

Embodiment 3. The method of any of the above embodiments, wherein the NF-κB inhibitor is selected from the group consisting of a NF-κB inhibitory protein, its fragment, and a mixture thereof.

Embodiment 4. The method of any of the above embodiments, wherein the NF-κB inhibitor is selected from the group consisting of super-repressor (SR)-IκB (srIκB), IκB-α, IκB-β, IκB-ε, BCL-3, a mutant thereof, and a mixture thereof.

Embodiment 5. The method of any of the above embodiments, wherein the NF-κB inhibitor is super-repressor (SR)-IκB (srIκB).

Embodiment 6. The method of any of the above embodiments, wherein the composition of is administered via oral, transdermal, intraperitoneal, intravenous, intramuscular, subcutaneous, or mixed routes.

Embodiment 7. The method of any of the above embodiments, wherein the subject is human.

Embodiment 8. The method of any of the above embodiments, wherein the method further comprises administering an anti-inflammatory agent to the subject.

Embodiment 9. The method of any of the above embodiments, wherein the exosome comprising a NF-κB inhibitor further comprises a photo-specific binding protein.

Embodiment 10. The method of any of the above embodiments, wherein the NF-κB inhibitor comprises an amino acid sequence having at least 85% sequence identity to SEQ ID NO:1 or SEQ ID NO:2.

Embodiment 11. The method of embodiment 10, wherein the NF-κB inhibitor is represented by SEQ ID NO: 1.

Embodiment 12. The method of embodiment 10, wherein the NF-κB inhibitor is represented by SEQ ID NO: 2.

Embodiment 13. The method of any of the above embodiments, wherein the photo-specific binding protein is a first photo-specific binding protein and/or a second photo-specific binding protein; the first photo-specific binding protein is conjugated to an exosome specific marker to form fusion protein I; and the second photo-specific binding protein is conjugated to the NF-κB inhibitor to form fusion protein II.

Embodiment 14. The method of embodiment 13, wherein the fusion protein I and the fusion protein II are linked reversibly through the first photo-specific binding protein and the second photo-specific binding protein.

Embodiment 15. The method of embodiment 13 or 14, wherein the first photo-specific binding protein is conjugated to an exosome specific marker to be located in the direction toward inside of the exosome.

Embodiment 16. The method of any one of embodiments 13-15, wherein the first photo-specific binding protein and the second photo-specific binding protein are selected from the group consisting of CIB, CIBN, PhyB, PIF, FKF1, GIGANTEA, CRY and PHR.

Embodiment 17. The method of embodiment 16, wherein the first photo-specific binding protein is CIB or CIBN and the second photo-specific binding protein is CRY or PHR.

Embodiment 18. The method of any of the above embodiments, wherein the first photo-specific binding protein is CRY or PHR and the second photo-specific binding protein is CIB or CIBN.

Embodiment 19. The method of embodiment 16, wherein the first photo-specific binding protein is PhyB and the second photo-specific binding protein is PIF.

Embodiment 20. The method of embodiment 16, wherein the first photo-specific binding protein is PIF and the second photo-specific binding protein is PhyB.

Embodiment 21. The method of embodiment 16, wherein the first photo-specific binding protein is GIGANTEA and the second photo-specific binding protein is FKF1.

Embodiment 22. The method of embodiment 16, wherein the first photo-specific binding protein is FKF1 and the second photo-specific binding protein is GIGANTEA.

Embodiment 23. The method of any one of embodiments 13-22, wherein the exosome specific marker is selected from the group consisting of CD9, CD63, CD81 and CD82.

Embodiment 24. The method of any of the above embodiments, wherein the exosome has a diameter of between about 50 nm and about 200 nm.

Embodiment 25. The method of any of the above embodiments, wherein the exosome has a diameter of between about 50 nm and about 150 nm.

Embodiment 26. The method of any of the above embodiments, wherein the composition is a pharmaceutical composition further comprising a physiologically acceptable carrier.

Embodiment 27. A composition comprising an exosome comprising an NF-κB inhibitor as described in Embodiments 1-16 for treating a disease caused by sepsis.

Embodiment 28. Use of a composition comprising an exosome comprising an NF-κB inhibitor as described in Embodiments 1-16 for treating a disease caused by sepsis.

Embodiments for Treating Respiratory Diseases

Embodiment 1. A method for treating a respiratory disease in a subject in need thereof, comprising: administering an effective amount of a composition comprising an exosome comprising an NF-κB inhibitor to the subject.

Embodiment 2. The method of any of the above embodiments, wherein the disease is viral respiratory disease. In some embodiment, the viral respiratory disease is caused by coronavirus. In some embodiments, the viral respiratory disease is pneumonia. In some embodiments, the disease is acute respiratory distress syndrome. In some embodiments, the disease is organ failure. In additional embodiments, the organ failure may be sepsis or kidney damage.

Embodiment 3. The method of any of the above embodiments, wherein the NF-κB inhibitor is selected from the group consisting of a NF-κB inhibitory protein, its fragment, and a mixture thereof.

Embodiment 4. The method of any of the above embodiments, wherein the NF-κB inhibitor is selected from the group consisting of super-repressor (SR)-IκB (srIκB), IκB-α, IκB-β, IκB-ε, BCL-3, a mutant thereof, and a mixture thereof.

Embodiment 5. The method of any of the above embodiments, wherein the NF-κB inhibitor is super-repressor (SR)-IκB (srIκB).

Embodiment 6. The method of any of the above embodiments, wherein the composition of is administered via oral, transdermal, intraperitoneal, intravenous, intramuscular, subcutaneous, or mixed routes.

Embodiment 7. The method of any of the above embodiments, wherein the subject is human.

Embodiment 8. The method of any of the above embodiments, wherein the method further comprises administering an anti-inflammatory agent to the subject.

Embodiment 9. The method of any of the above embodiments, wherein the exosome comprising a NF-κB inhibitor further comprises a photo-specific binding protein.

Embodiment 10. The method of any of the above embodiments, wherein the NF-κB inhibitor comprises an amino acid sequence having at least 85% sequence identity to SEQ ID NO:1 or SEQ ID NO:2.

Embodiment 11. The method of embodiment 10, wherein the NF-κB inhibitor is represented by SEQ ID NO: 1.

Embodiment 12. The method of embodiment 10, wherein the NF-κB inhibitor is represented by SEQ ID NO: 2.

Embodiment 13. The method of any of the above embodiments, wherein the photo-specific binding protein is a first photo-specific binding protein and/or a second photo-specific binding protein; the first photo-specific binding protein is conjugated to an exosome specific marker to form fusion protein I; and the second photo-specific binding protein is conjugated to the NF-κB inhibitor to form fusion protein II.

Embodiment 14. The method of embodiment 13, wherein the fusion protein I and the fusion protein II are linked reversibly through the first photo-specific binding protein and the second photo-specific binding protein.

Embodiment 15. The method of embodiment 13 or 14, wherein the first photo-specific binding protein is conjugated to an exosome specific marker to be located in the direction toward inside of the exosome.

Embodiment 16. The method of any one of embodiments 13-15, wherein the first photo-specific binding protein and the second photo-specific binding protein are selected from the group consisting of CIB, CIBN, PhyB, PIF, FKF1, GIGANTEA, CRY and PHR.

Embodiment 17. The method of embodiment 16, wherein the first photo-specific binding protein is CIB or CIBN and the second photo-specific binding protein is CRY or PHR.

Embodiment 18. The method of any of the above embodiments, wherein the first photo-specific binding protein is CRY or PHR and the second photo-specific binding protein is CIB or CIBN.

Embodiment 19. The method of embodiment 16, wherein the first photo-specific binding protein is PhyB and the second photo-specific binding protein is PIF.

Embodiment 20. The method of embodiment 16, wherein the first photo-specific binding protein is PIF and the second photo-specific binding protein is PhyB.

Embodiment 21. The method of embodiment 16, wherein the first photo-specific binding protein is GIGANTEA and the second photo-specific binding protein is FKF1.

Embodiment 22. The method of embodiment 16, wherein the first photo-specific binding protein is FKF1 and the second photo-specific binding protein is GIGANTEA.

Embodiment 23. The method of any one of embodiments 13-22, wherein the exosome specific marker is selected from the group consisting of CD9, CD63, CD81 and CD82.

Embodiment 24. The method of any of the above embodiments, wherein the exosome has a diameter of between about 50 nm and about 200 nm.

Embodiment 25. The method of any of the above embodiments, wherein the exosome has a diameter of between about 50 nm and about 150 nm.

Embodiment 26. The method of any of the above embodiments, wherein the composition is a pharmaceutical composition further comprising a physiologically acceptable carrier.

Embodiment 27. A composition comprising an exosome comprising an NF-κB inhibitor as described in Embodiments 1-16 for treating a respiratory disease, such as a viral respiratory disease.

Embodiment 28. Use of a composition comprising an exosome comprising an NF-κB inhibitor as described in Embodiments 1-16 for treating a respiratory disease, such as a viral respiratory disease.

While the present disclosure has been described and illustrated herein by references to various specific materials, procedures and examples, it is understood that the disclosure is not restricted to the particular combinations of materials and procedures selected for that purpose. Numerous variations of such details can be implied as will be appreciated by those skilled in the art. It is intended that the specification and examples be considered as exemplary only, with the true scope and spirit of the disclosure being indicated by the following claims. All references, patents, and patent applications referred to in this application are herein incorporated by reference in their entirety.

The invention claimed is:

1. A method for treating acute kidney injury (AKI) in a subject in need thereof, comprising: administering an effective amount of a composition comprising an exosome comprising a super-repressor (SR)-IκB to the subject,
wherein the acute kidney injury (AKI) is induced by ischemia-reperfusion injury (IRI) or sepsis.

2. The method of claim 1, wherein the composition is administered via a systemic route.

3. The method of claim 2, wherein the systemic route is an intraperitoneal route or an intravenous route.

4. The method of claim 1, wherein the composition of is administered via oral, transdermal, intraperitoneal, intravenous, intramuscular, subcutaneous, or mixed routes.

5. The method of claim 1, wherein the subject is human.

6. The method of claim 1, further comprising administering an anti-inflammatory agent to the subject.

7. The method of claim 1, wherein the exosome further comprises a photo-specific binding protein.

8. The method of claim 1, wherein the super-repressor (SR)-IκB comprises the amino acid sequence of SEQ ID NO:1.

9. The method of claim 1,
wherein the exosome comprising the super-repressor (SR)-IκB further comprises a first photo-specific binding protein and/or a second photo-specific binding protein,
wherein the first photo-specific binding protein is conjugated to an exosome specific marker to form fusion protein I; and
wherein the second photo-specific binding protein is conjugated to the super-repressor (SR)-IκB to form fusion protein II.

10. The method of claim 9, wherein the fusion protein I and the fusion protein II are linked reversibly through the first photo-specific binding protein and the second photo-specific binding protein.

11. The method of claim 9, wherein the first photo-specific binding protein is conjugated to an exosome specific marker to be located in the direction toward inside of the exosome.

12. The method of claim 9, wherein the first photo-specific binding protein and the second photo-specific binding protein are selected from the group consisting of CIB, CIBN, PhyB, PIF, FKF1, GIGANTEA, CRY and PHR.

13. The method of claim 9, wherein the exosome specific marker is selected from the group consisting of CD9, CD63, CD81 and CD82.

14. The method of claim 1, wherein the exosome has a diameter of between about 50 nm and about 200 nm.

15. The method according to claim 1, wherein the AKI is induced by IRI.

16. The method according to claim 1, wherein the AKI is induced by sepsis.

* * * * *